(12) United States Patent
Miyasaka et al.

(10) Patent No.: US 9,477,018 B2
(45) Date of Patent: Oct. 25, 2016

(54) DIFFRACTIVE OPTICAL ELEMENT AND MEASUREMENT DEVICE

(71) Applicant: ASAHI GLASS COMPANY, LIMITED, Chiyoda-ku (JP)

(72) Inventors: Koji Miyasaka, Fukushima (JP); Takuji Nomura, Fukushima (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 388 days.

(21) Appl. No.: 13/760,831

(22) Filed: Feb. 6, 2013

(65) Prior Publication Data

US 2013/0182327 A1 Jul. 18, 2013

Related U.S. Application Data

(63) Continuation of application No. PCT/JP2011/067685, filed on Aug. 2, 2011.

(30) Foreign Application Priority Data

Aug. 6, 2010 (JP) .................................. 2010-177944

(51) Int. Cl.
  *G02B 5/18* (2006.01)
  *G01B 11/25* (2006.01)
  *G03H 1/02* (2006.01)

(52) U.S. Cl.
  CPC .............. *G02B 5/1861* (2013.01); *G01B 11/25* (2013.01); *G02B 5/18* (2013.01); *G02B 5/1842* (2013.01); *G03H 1/0244* (2013.01)

(58) Field of Classification Search
  CPC .... G02B 5/1861; G02B 5/18; G02B 5/1842; G01B 11/25; G03H 1/0244

USPC .............. 359/558–576, 639, 485.05, 487.03, 359/489.06; 362/19; 363/20
See application file for complete search history.

(56) References Cited

U.S. PATENT DOCUMENTS 5,113,286 A * 5/1992 Morrison ...................... 359/569
5,218,471 A * 6/1993 Swanson et al. ............. 359/565
(Continued)

FOREIGN PATENT DOCUMENTS

CN       101661126 A      3/2010
JP       55-088002 A      7/1980
(Continued)

OTHER PUBLICATIONS

Office Action and Search Report issued on Jul. 21, 2014 in the corresponding Chinese patent Application No. 201180038910.3 (with English Translation of Category of Cited Documents).
(Continued)

*Primary Examiner* — Zachary Wilkes
*Assistant Examiner* — George G King
(74) *Attorney, Agent, or Firm* — Oblon, McClelland, Maier & Neustadt, L.L.P.

(57) ABSTRACT

Disclosed are a diffractive optical element and a measurement device that are capable of reliably suppressing occurrence of a zero-order diffracted light beam and generating light spots in a wide range. The diffractive optical element has concave and convex portions and diffracts incident light in two dimensions to generate diffracted light. When a maximum diffraction angle with reference to an optical axis of the incident light is an angle range θ, the angle range θ is 7.5° or greater, and diffraction efficiency in a zero-order diffracted light beam is 5% or less.

20 Claims, 54 Drawing Sheets

(56) References Cited

U.S. PATENT DOCUMENTS

| | | | |
|---|---|---|---|
| 5,742,262 A | 4/1998 | Tabata et al. | |
| 6,101,269 A | 8/2000 | Hunter et al. | |
| 6,396,635 B2 * | 5/2002 | Kathman | B23K 26/06 355/67 |
| 6,417,940 B1 * | 7/2002 | Sekine | 359/9 |
| 6,562,253 B1 * | 5/2003 | Ogusu | 216/24 |
| 7,440,188 B2 | 10/2008 | Fuse | |
| 7,583,875 B2 | 9/2009 | Yamauchi et al. | |
| 8,599,484 B2 * | 12/2013 | Miyasaka et al. | 359/569 |
| 2006/0001972 A1 * | 1/2006 | Sato et al. | 359/569 |
| 2007/0217013 A1 * | 9/2007 | Schuster et al. | 359/566 |
| 2009/0096783 A1 | 4/2009 | Shpunt et al. | |
| 2012/0038934 A1 | 2/2012 | Miyasaka et al. | |
| 2012/0105855 A1 | 5/2012 | Miyasaka et al. | |
| 2012/0223218 A1 | 9/2012 | Miyasaka | |

FOREIGN PATENT DOCUMENTS

| | | |
|---|---|---|
| JP | 2001-272515 A | 10/2001 |
| JP | 2001-296417 A | 10/2001 |
| JP | 2002-122417 A | 4/2002 |
| JP | 2003-043234 | 2/2003 |
| JP | 2004-191092 A | 7/2004 |
| JP | 2004-264347 | 9/2004 |
| JP | 2005-121938 | 5/2005 |
| JP | 2005-259268 A | 9/2005 |
| JP | 2006-030954 | 2/2006 |
| JP | 2009-531655 | 9/2009 |
| WO | 2007/105205 | 9/2007 |
| WO | WO 2007/116745 A1 | 10/2007 |
| WO | 2009/093228 | 7/2009 |

OTHER PUBLICATIONS

International Search Report issued Nov. 8, 2011 in PCT/JP2011/067685 filed Aug. 2, 2011.

O'Shea Donald C., "Reduction of the zero-order intensity in binary Dammann gratings", Applied Optics, Oct. 1995, vol. 34, No. 28, pp. 6533-6537.

* cited by examiner

FIG. 3
(a)
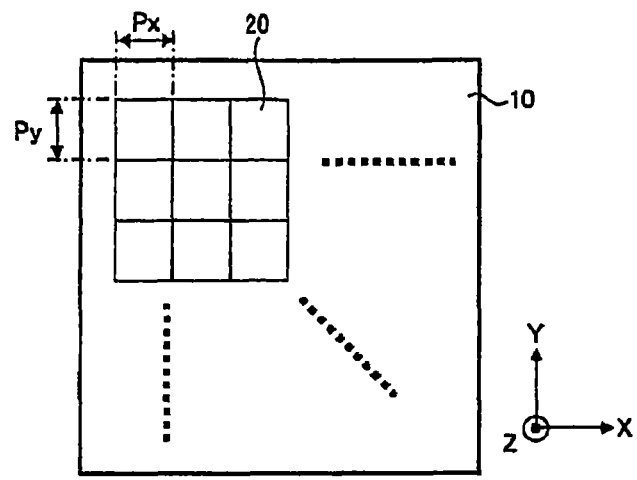
(b)
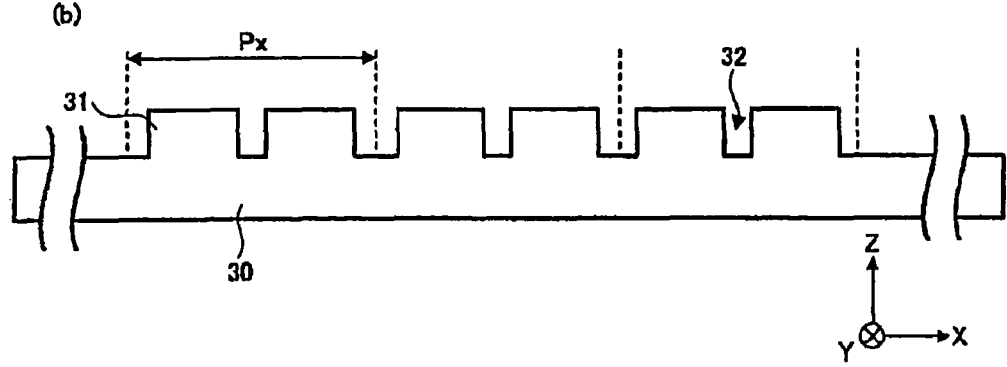
(c)
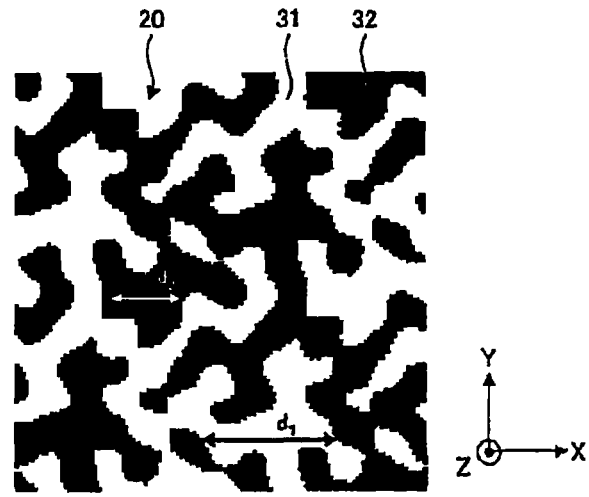

FIG. 5
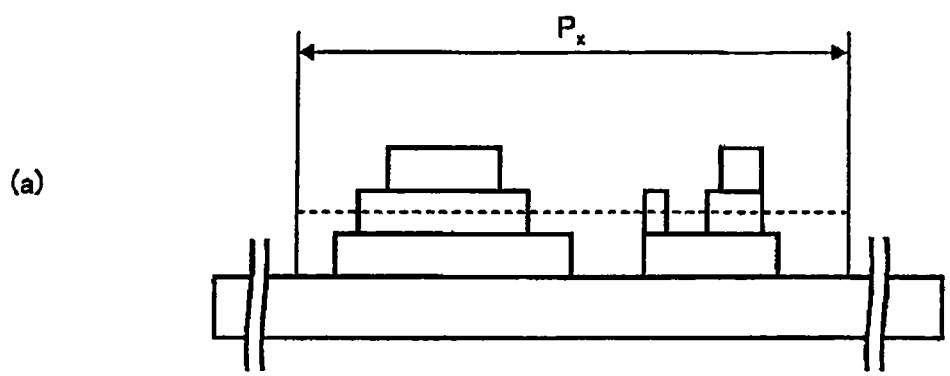
(a)
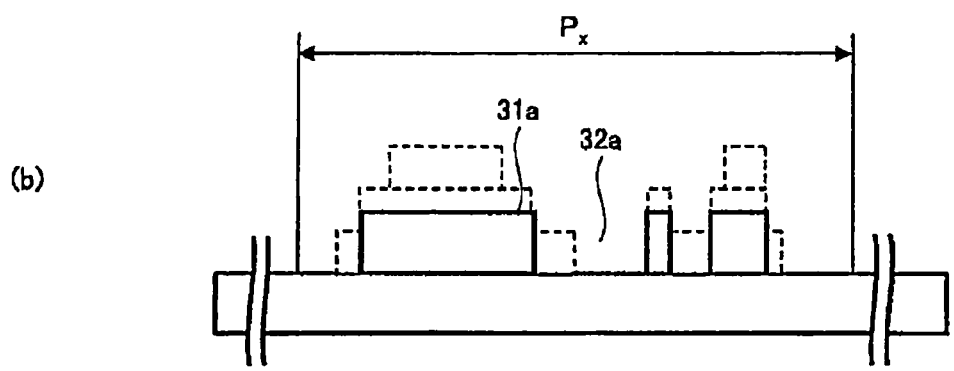
(b)

FIG. 9
(a) 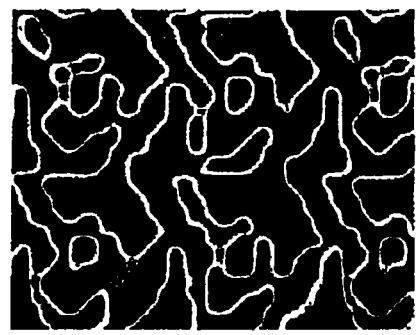 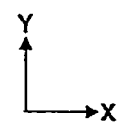
(b) 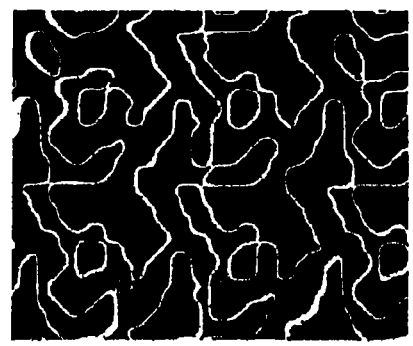 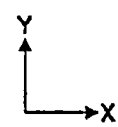
(c) 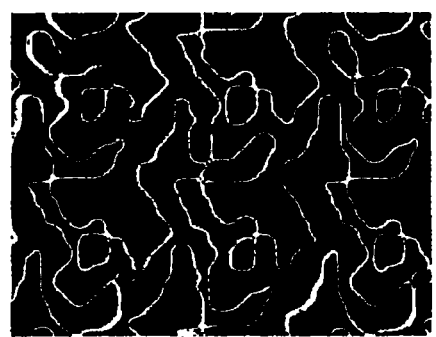 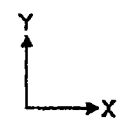

FIG. 14
(a)
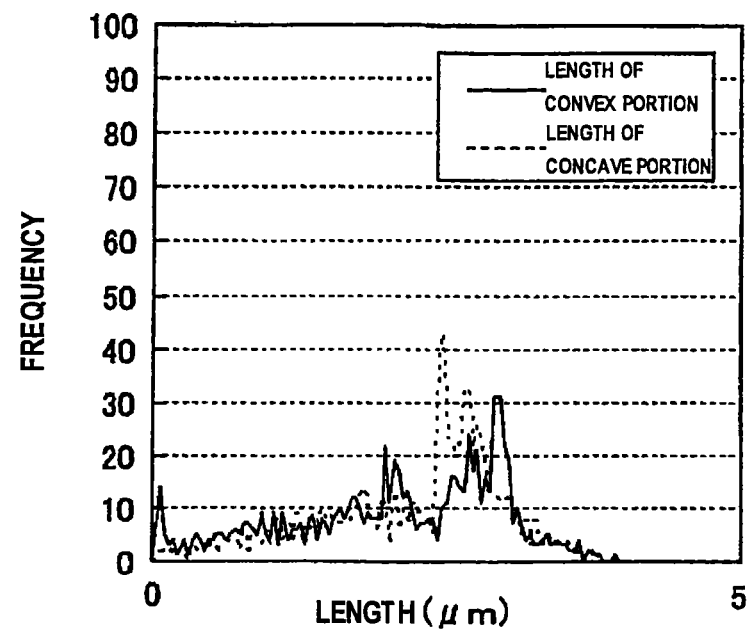
(b)
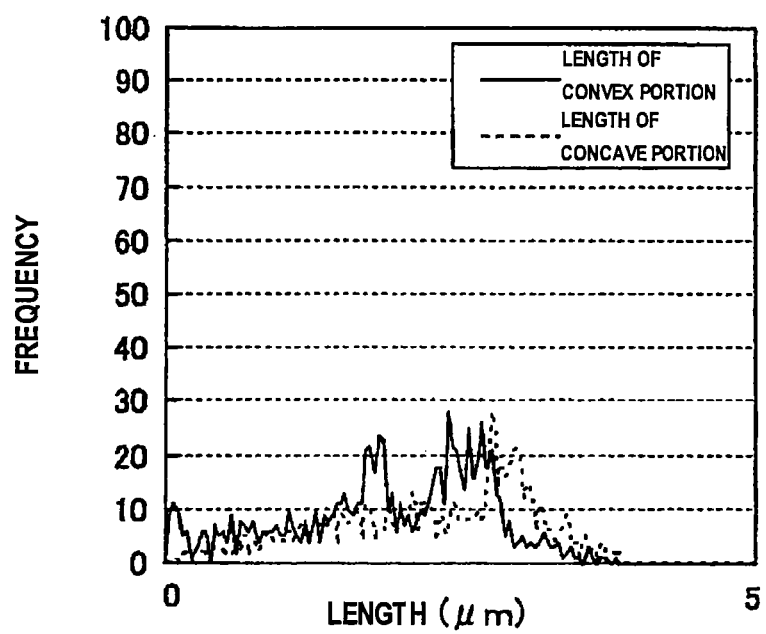

FIG. 17
(a)
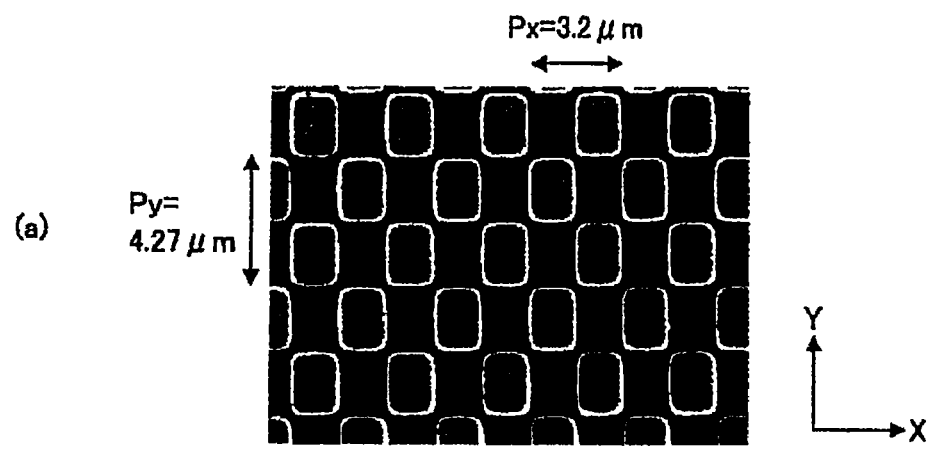
(b)
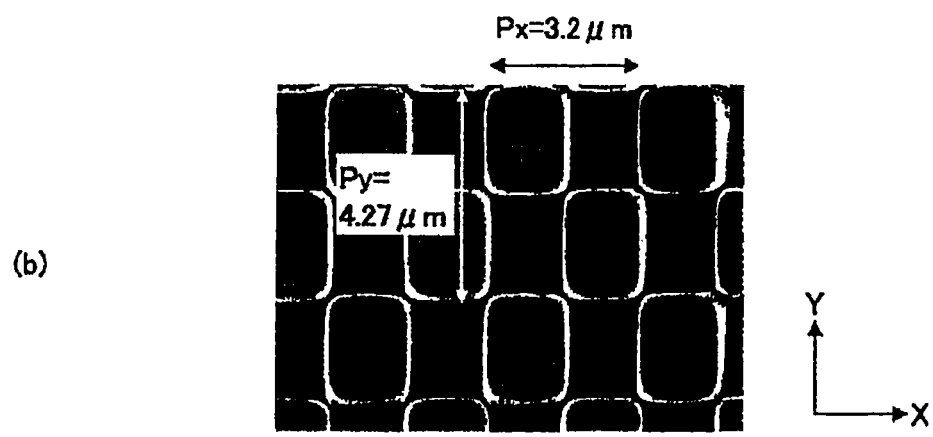
(c)
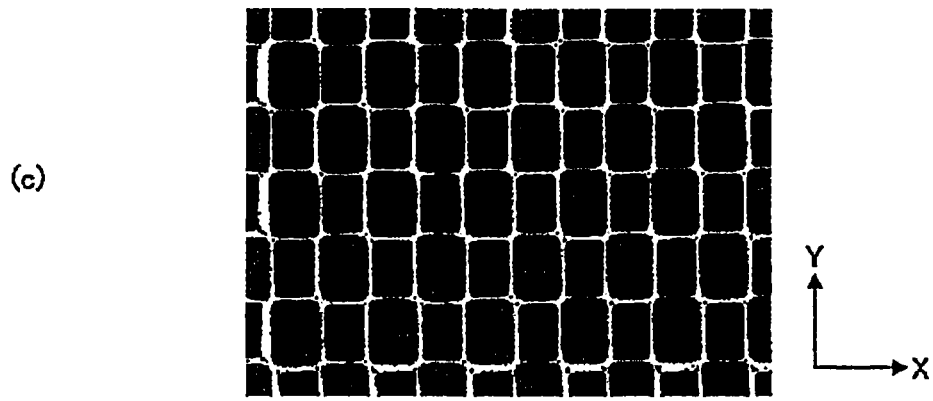

FIG. 26
(a)
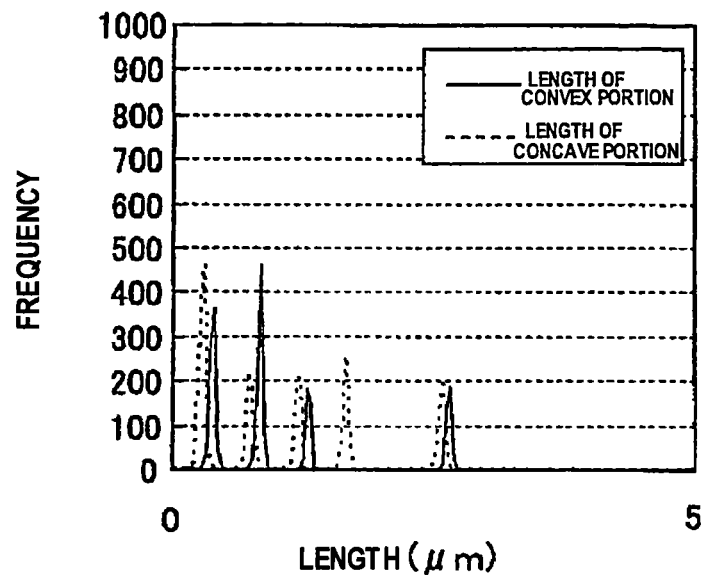
(b)
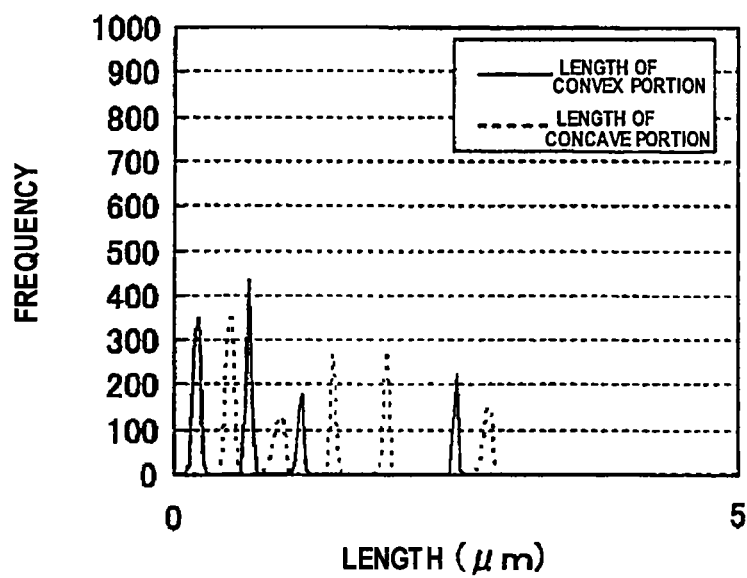

FIG. 29
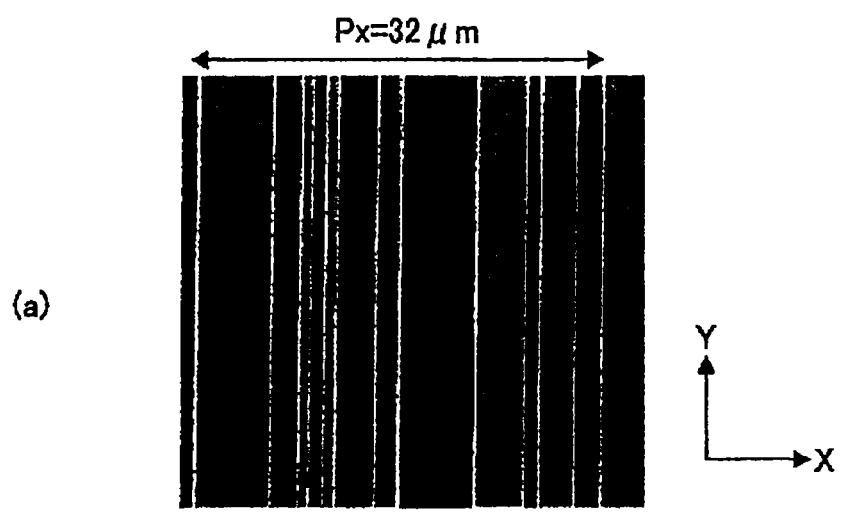
(a)
(b)

FIG. 30
(a)
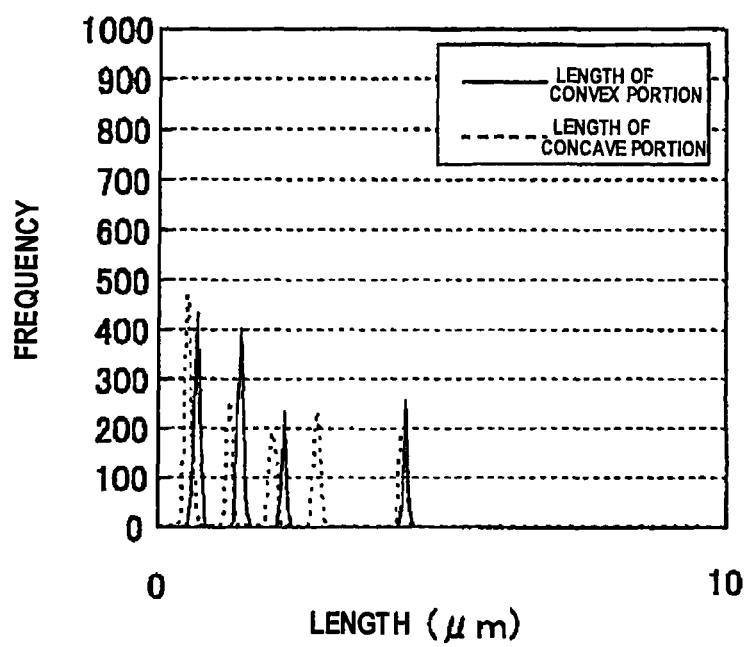
(b)
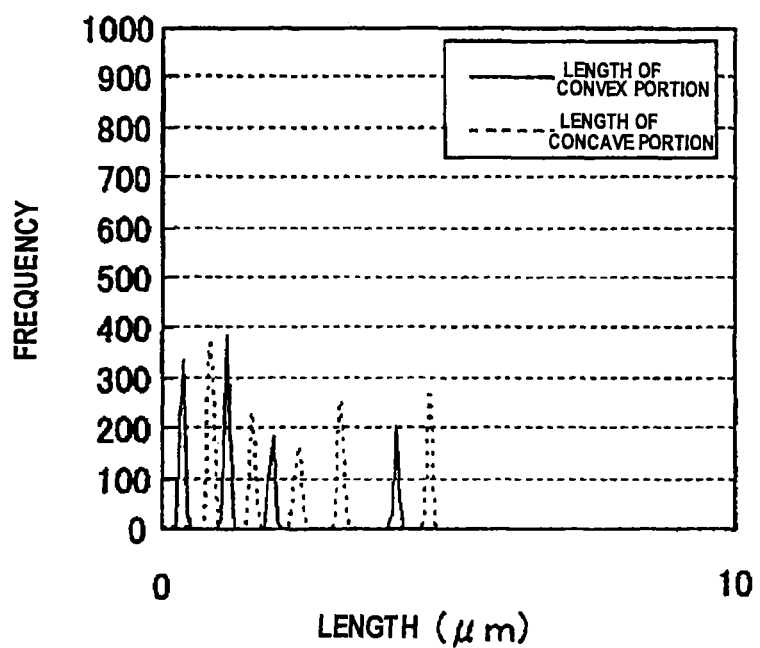

FIG. 34
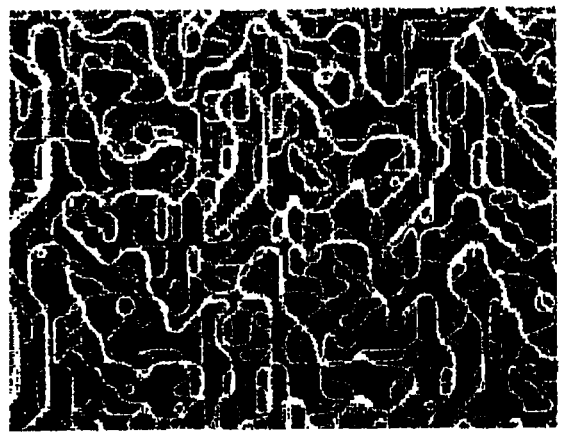
(a)
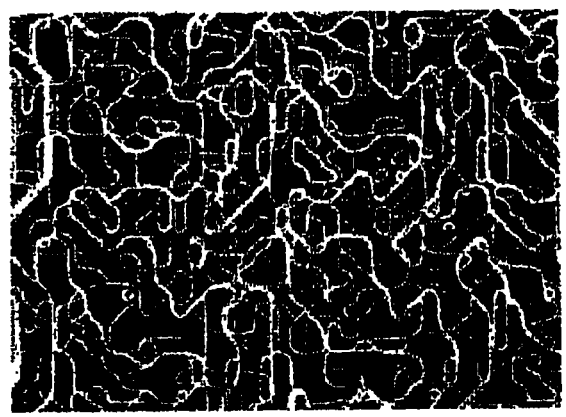
(b)
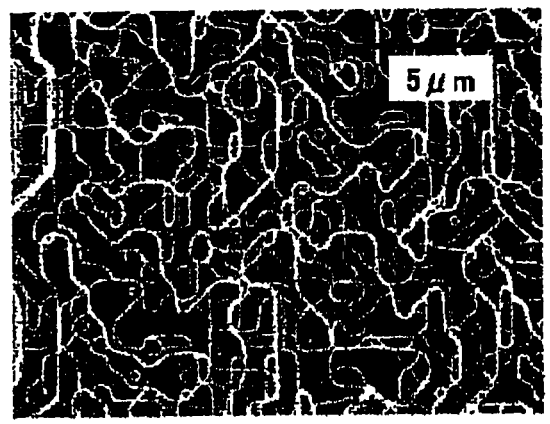
(c)

FIG. 35
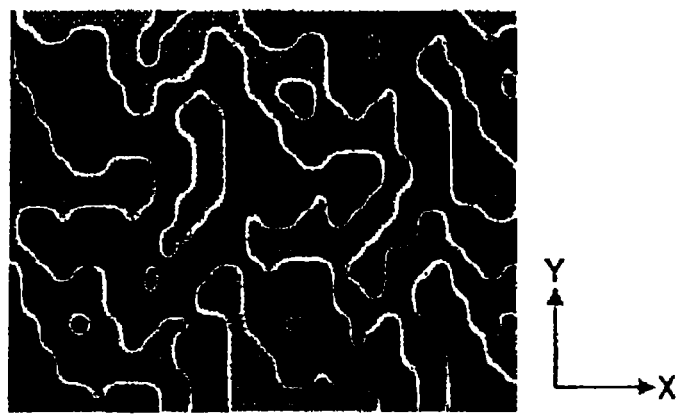
(a)
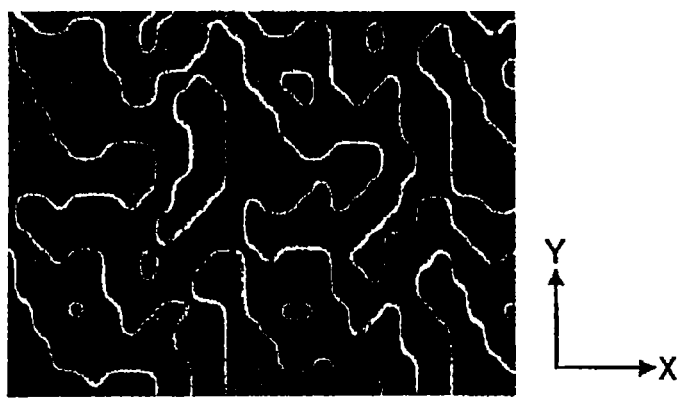
(b)
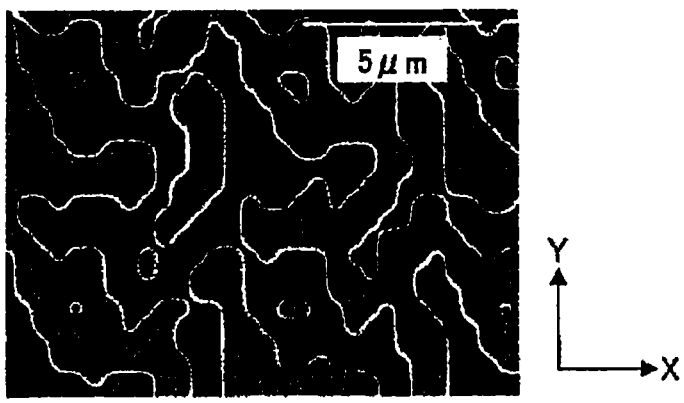
(c)

FIG. 39
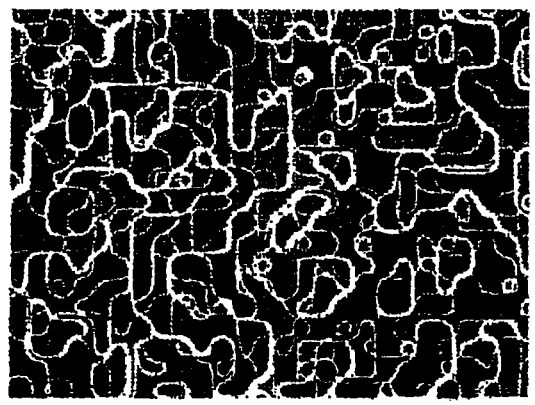
(a)
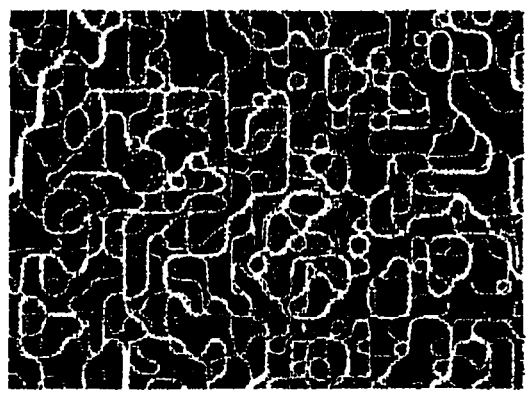
(b)
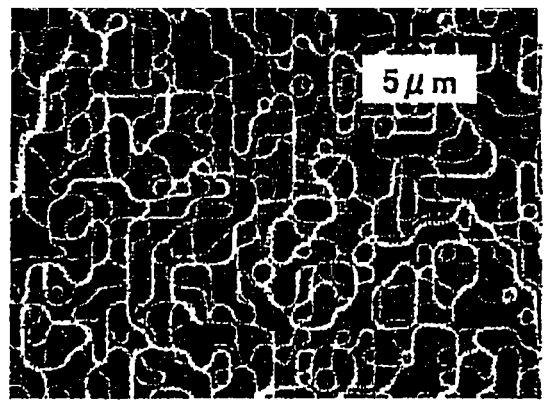
(c)

FIG. 40
(a) 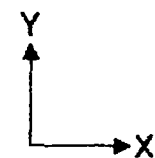
(b) 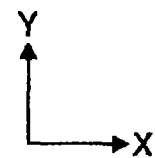
(c) 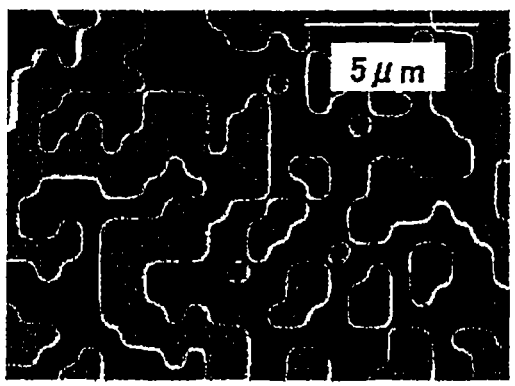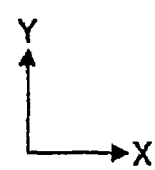

FIG. 44
(a)
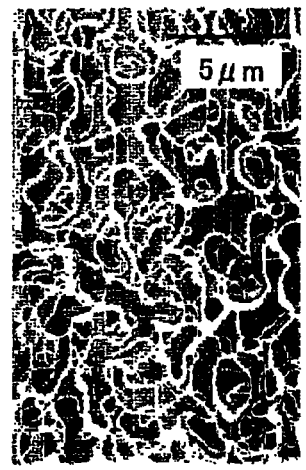
(b)
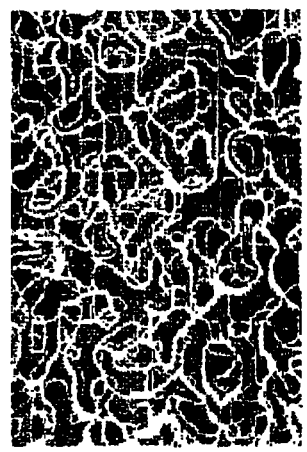
(c)
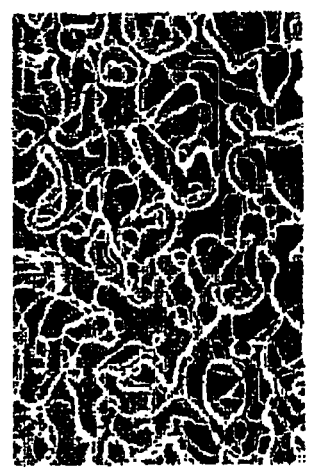

FIG. 45
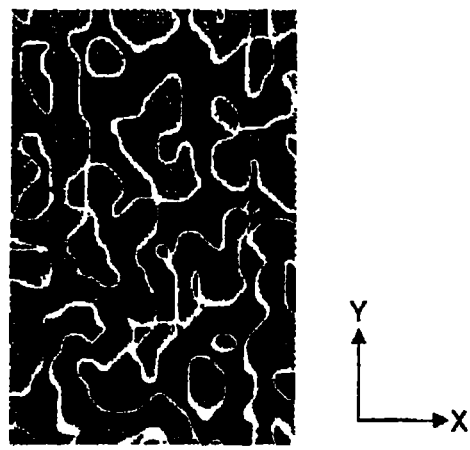
(a)
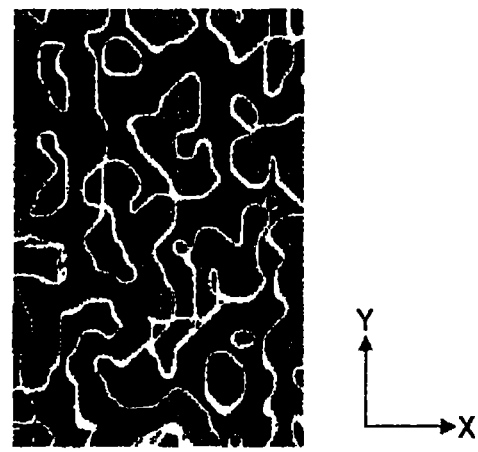
(b)
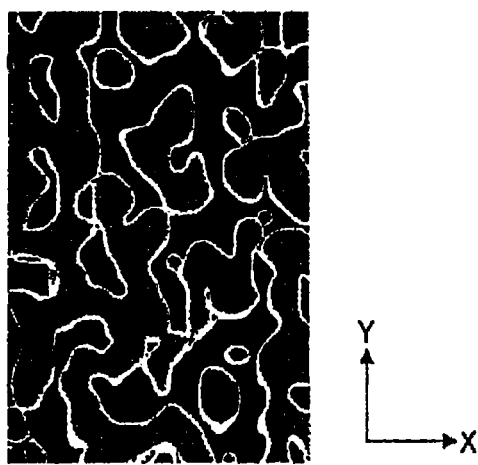
(c)

FIG. 49
(a)
(b)
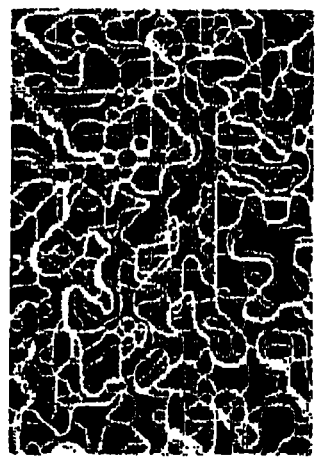
(c)
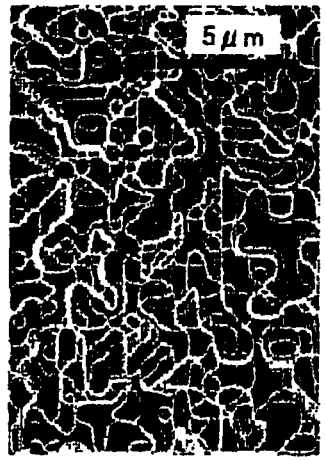

FIG. 50
(a) 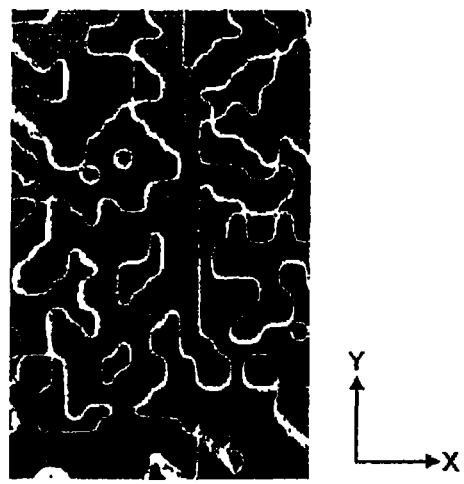
(b) 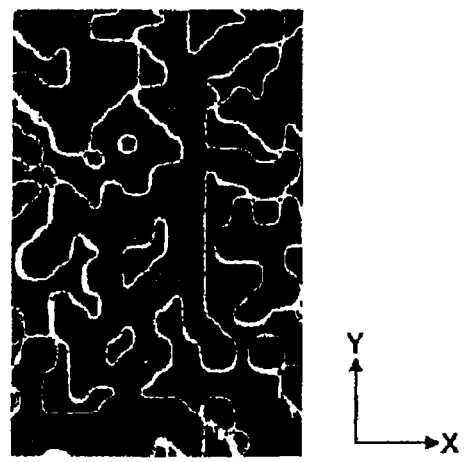
(c) 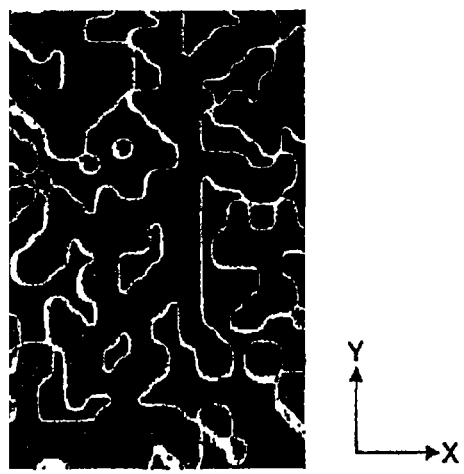

FIG. 57
(a)
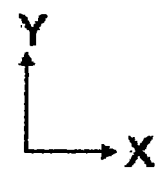
1 μm
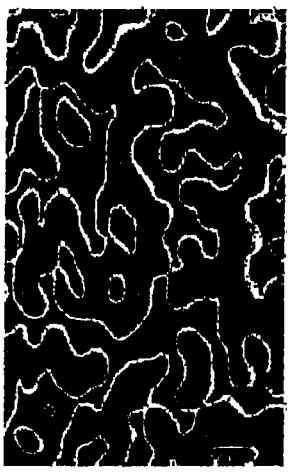
(b)
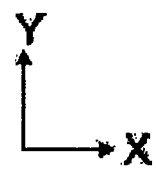
(c)
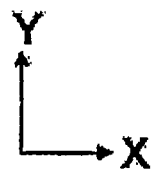

FIG. 58
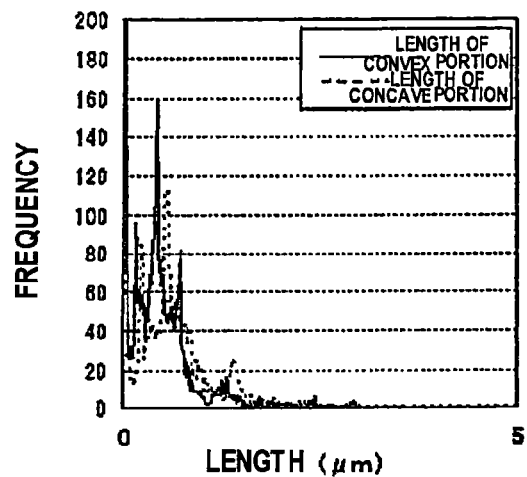
(a)
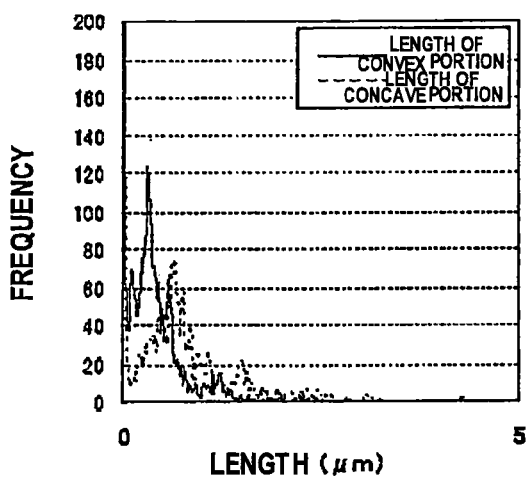
(b)
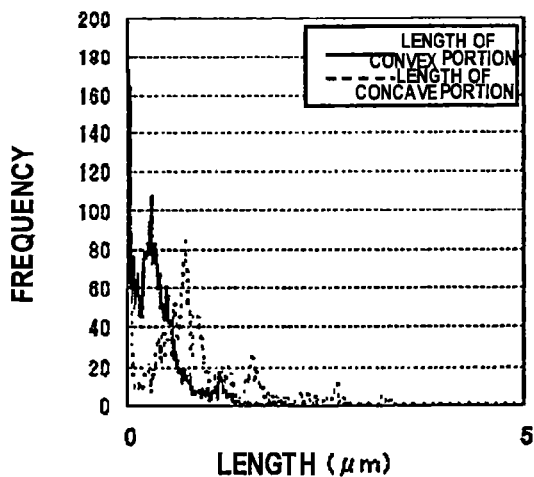
(c)

FIG. 62
(a) 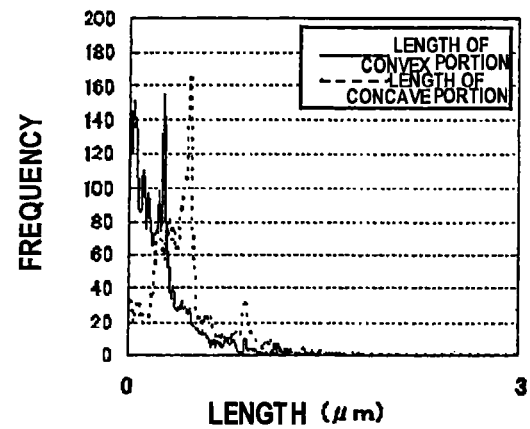
(b) 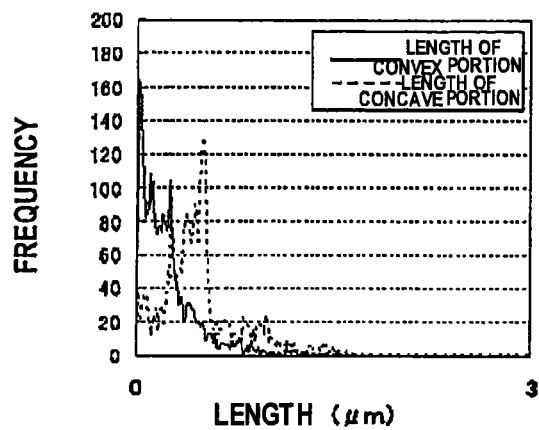
(c) 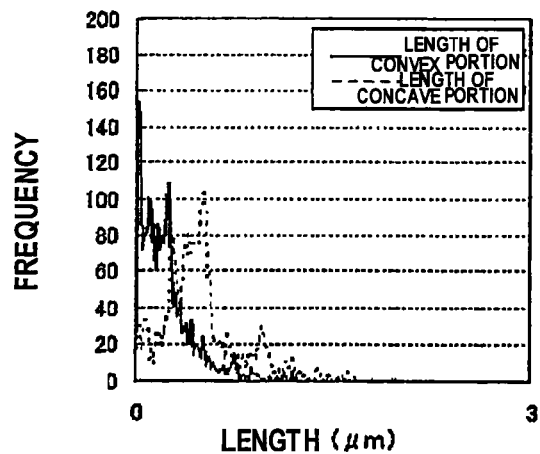

FIG. 66
(a) 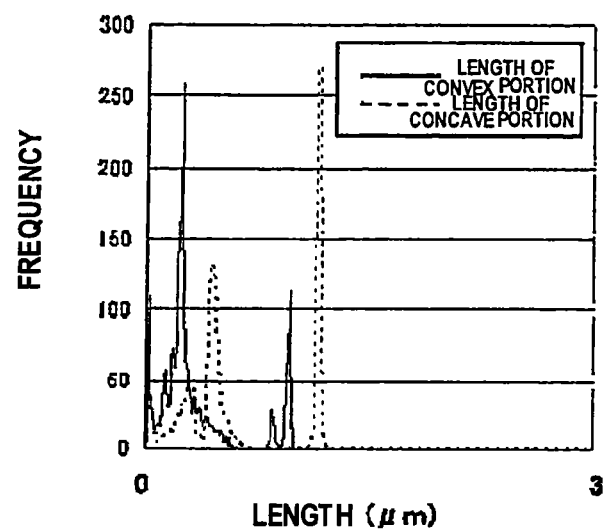
(b) 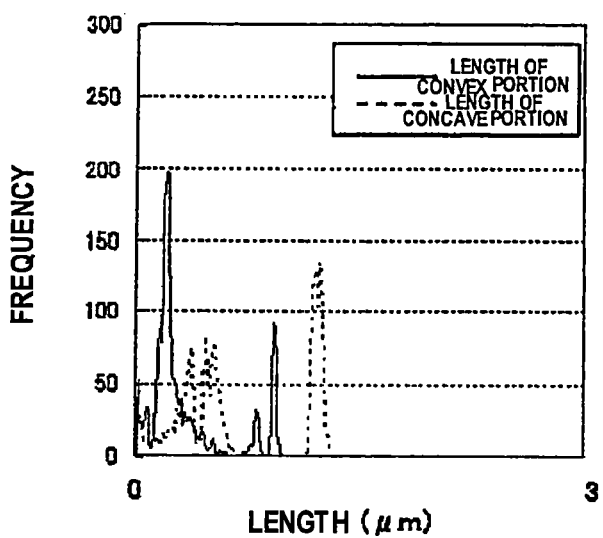

DIFFRACTIVE OPTICAL ELEMENT AND MEASUREMENT DEVICE

TECHNICAL FIELD

The present invention relates to a diffractive optical element and a measuring device that uses the diffractive optical element.

BACKGROUND ART

A diffractive optical element that diffracts at least a part of incident light is used in various kinds of optical apparatuses, optical devices or the like. As an example of such an optical device that uses the diffractive optical element, a measuring device may be considered that projects a specific light pattern obtained by diffraction in the diffractive optical element onto a measurement object and measures the shape or the like of the measurement object. A three-dimensional measuring device that measures the three-dimensional shape or the like of a measurement object, and that is an example of such a measuring device, is known as a measuring device that detects a change in a pattern of irradiated light or the like and acquires three-dimensional information (refer to the patent document 1).

Further, if such a measuring device can perform a predetermined measurement even in a case where the distance between the measuring device and the measurement object is short, it is possible to decrease the size of a measuring optical system and to shorten the length of an optical path in a light receiving system, and thus, it is possible to obtain high measurement sensitivity. Thus, in a case where the diffractive optical element is used in such a measuring device, it is preferable that a diffraction angle be large. However, if the pitch of the diffractive optical element is narrowed to generate diffracted light having a large diffraction angle, zero-order diffracted light is generated. Further, if the number of light spots generated by diffractive lights is large, the amount of light of the zero-order diffracted light becomes a value that is relatively larger than the amount of light of the other diffracted lights.

In such a case, there are problems that automatic gain adjustment is set to be low in an imaging device used in the measuring device and it is difficult to recognize light spots generated by the other diffracted lights that are relatively weaker than the zero-order diffracted light. Further, even in a case where a gain is adjusted to be high, there are problems that a blur or the like occurs in the periphery of a light spot generated by the zero-order diffracted light and it is difficult to recognize the light spots generated by the other diffracted lights in the periphery of the light spot generated by the zero-order diffracted light. Thus, in the case of being applied to the three-dimensional measuring device, it is difficult to perform measurement of a three-dimensional shape with high accuracy.

As a configuration for suppressing the occurrence of such a zero-order diffracted light, for example, a configuration in which plural diffractive optical elements are stacked is known, as disclosed in the patent document 2. Further, the non patent document 1 discloses a Dammann diffractive grating that adjusts the light amount of a zero-order diffracted light by adjusting concave and convex shapes formed on a surface of a diffractive optical element.

PRIOR ART REFERENCES

Patent Documents

[Patent Document 1] JP-T-2009-531655
[Patent Document 2] PCT International Publication No. 2009/093228

Non Patent Document

[Non Patent Document 1] Donald C. O'Shea, "Reduction of the zero-order intensity in binary Dammann gratings", APPLIED OPTICS, 34, 6533 (1955)

SUMMARY OF THE INVENTION

Problems to be Solved by the Invention

However, since the method disclosed the patent document 2 uses a configuration in which the plural diffractive optical elements are stacked, a problem occurs in the alignment of the stacks. Further, for example, since there is a limit to a projected pattern, there is a problem that it is difficult to freely set the pattern.

Further, the Dammann diffractive grating disclosed in the non patent document 1 is able to reduce the zero-order diffracted light in the case of a specific shape. However, as described below, in a case where the scalar theory is not applied, that is, in a case where the pitch is narrow and the diffraction angle is large, it is difficult to apply the Dammann diffractive grating. Thus, in a case where the scalar theory is not applied, it is generally difficult to apply the Dammann diffractive grating for a purpose to reduce the zero-order diffracted light.

The zero-order diffracted light occurring in the diffractive grating will be described. The diffractive optical element performs an optical action due to a diffraction phenomenon of light. Such an optical action may be calculated using Fraunhofer approximation based on the scalar diffraction theory, in a location that is sufficiently distant from the diffraction optical element. This is based on the assumption that a diffraction surface in the diffractive optical element is sufficiently thin, and is approximated using a formula shown in Expression 1, where a scalar function immediately after being output from the diffraction optical element is $u(x_1, y_1)$, a scalar function of an electric field in a measurement point is $u(x_0, y_0)$, a distance from the diffraction surface in the diffraction optical element to the measurement point in an optical axis direction is $z$, and the number of waves is $k$. Here, $dS = dx_1 dy_1$, and $\Sigma$ represents a region through which light flux passes.

$$u(x_0, y_0) \propto \iint_\Sigma u(x_1, y_1) e^{-i(k/z)(x_0 x_1 + y_0 y_1)} dS \quad \text{Expression 1}$$

In particular, in a case where the diffractive optical element has a periodic structure of a pitch $P_x$ and a pitch $P_y$ in the x and y directions, the light flux of the diffracted light output from the diffractive optical element has a strong light intensity in a certain order. Further, in a case where m and n are integers and the order thereof is (m, n)-th order, a diffraction efficiency $\eta_{mn}$ of the (m, n)-th order is represented as a formula shown in Expression 2. According to the formula shown in Expression 2, the diffraction efficiency $\eta_{mn}$ does not depend on the pitches $P_x$ and $P_y$.

$$\eta_{mn} \propto |\int_0^{P_x} \int_0^{P_y} u'(x_1, y_1) \, e^{-i(2\pi m x_1/P_x + 2\pi n y_1/P_y)} dS|^2 \quad \text{Expression 2}$$

In this regard, diffraction angles $\theta_{xout}$ and $\theta_{yout}$ of the (m, n)-th order diffracted light beam output from the diffractive optical element are represented as formula shown in Expression 3, where incident angles of incident light in the x and y directions are $\theta_{xin}$ and $\theta_{yin}$. Here, the incident angles $\theta_{xin}$ and $\theta_{yin}$ and the diffraction angles $\theta_{xout}$ and $\theta_{yout}$ are angles with reference to a normal direction of the diffraction surface.

$$\sin \theta_{xout} = \sin \theta_{xin} + m \times \lambda / P_x$$

$$\sin \theta_{yout} = \sin \theta_{yin} + n \times \lambda / P_y \quad \text{Expression 3}$$

A case where the light flux is normally incident on the diffraction surface of the diffractive optical element ($\theta_{xin}=\theta_{yin}=0$) may be considered. In this case, in the formulas shown in Expression 3, if values of $m\times\lambda/P_x$ and $n\times\lambda/P_y$ are large, the diffraction angles $\theta_{xout}$ and $\theta_{yout}$ of the output light become large values. Since the Fraunhofer approximation is effective only in a paraxial region, in a case where the diffraction angle is large, the actual intensity of the diffracted light in the diffractive optical element and a value of the intensity of the diffracted light calculated according to the scalar diffraction theory are different from each other. The diffraction angle may be referred to as the angle of diffraction.

As an example thereof, a calculation result when the diffractive optical element is a simple diffractive grating having a first-order periodic structure as shown in FIG. 1 will be described. FIG. 1 is a cross-sectional view schematically illustrating a diffractive grating. The diffractive grating has a structure in which a convex portion 312 is formed on the upper surface of a quartz substrate 311. A concave portion 313 that is a region where the convex portion 312 is not formed is a portion into which air is introduced. Here, the height of the convex portion 312 is set to 0.735 µm and the width ratio of the convex portion 312 and the concave portion 313 on the upper surface of the quartz substrate 311 is set to 1:1. The RCWA (Rigorous Coupled Wave Analysis) method and the scalar diffraction theory that provide a strict solution, for solving the Maxwell equation in a vectorial manner, are used for calculation. FIG. 2(a) illustrates the relationship between the order of diffracted light beams and diffraction efficiency in a case where the pitch P in the diffractive grating is 10 µm and the wavelength of the light is 0.66 µm. Here, the refractive index of the quartz substrate with respect to the light having the wavelength of 0.66 µm is calculated as being about 1.46. As shown in FIG. 2(a), the light output from the diffractive optical element is mostly occupied by ±first-order diffracted light beams.

Further, FIG. 2(b) illustrates the relationship between diffraction efficiency and wavelength in a zero-order diffracted light beam that is a rectilinearly transmitting component of light flux output from the diffractive optical element shown in FIG. 1. In the calculation according to the scalar diffraction theory, in a case where the wavelength is 0.66 µm, the diffraction efficiency in the zero-order diffracted light beam is about 0%. On the other hand, in the strict calculation according to the RCWA method, as the pitch P becomes narrow, the diffraction efficiency in a wavelength in which the diffraction efficiency of the zero-order diffracted light beam is lowest tends to be increased, and there is a tendency that the difference with the result obtained by the calculation according to the scalar theory is increased.

FIG. 2(c) illustrates the relationship between a value of zero-order diffraction efficiency and a diffraction angle in a first-order diffracted light beam, in each pitch in FIG. 2(b). As shown in FIG. 2(c), the diffraction efficiency of the zero-order diffracted light beam tends to increase as the diffraction angle is increased. Further, such a tendency is similarly applied to a diffractive grating having a different cross-sectional shape, and thus, the difference with the result obtained by the scalar theory is increased as the diffraction angle is increased. Thus, even in the case of a design in which the zero-order diffracted light beam does not occur in the calculation result according to the scalar theory, the zero-order diffracted light beam may actually occur. The Dammann diffractive grating disclosed in the non patent document 1 is not capable of suppressing the zero-order diffracted light beam even in a case where the pitch is narrow and the diffraction angle is large, to which the scalar theory is not applied.

Hence, it is desirable to provide a diffractive optical element that is capable of reliably suppressing occurrence of a zero-order diffracted light beam and generating light spots in a wide diffraction angle range, and a measurement device that is capable of performing measurement with high accuracy using such a diffractive optical element.

Means for Solving the Problems

According to an aspect of the invention, there is provided a diffractive optical element that has concave and convex portions and diffracts incident light in two dimensions to generate diffracted light, wherein when a maximum diffraction angle with reference to an optical axis of the incident light is an angle range θ, the angle range θ is 7.5° or greater, and diffraction efficiency in a zero-order diffracted light beam is 5% or less.

Further, in the diffractive optical element according to the aspect of the invention, the concave and convex portions are formed in the shape of two steps.

Further, in the diffractive optical element according to the aspect of the invention, the concave and convex portions are formed in the shape of three steps or greater.

Further, in the diffractive optical element according to the aspect of the invention, the concave and convex portions are formed in the shape of $2^m$ steps (m is an integer of 2 or greater).

Further, in the diffractive optical element according to the aspect of the invention, in the convex and concave portions, when an average value of the length of the convex portion and an average value of the length of the concave portion, that are within the range of λ/8 to 6λ where the wavelength of the light is λ, in the length of the convex portion and the length of the concave portion in a predetermined axis direction different from the height direction of the convex and concave portions, are respectively $\mu_1$ and $\mu_2$, the diffraction angle θ and a value of $D=\mu_1/(\mu_1+\mu_2)$ are as follows:

7.5°<θ<90°, and

0<D<0.5 and

−0.02θ+0.6<D<−0.0013θ+0.5233

(here, 7.5°<θ<36.3°) or

−0.02θ+0.6<D<0.475

(here, 36.3°<θ<90°).

In the diffractive optical element according to the aspect of the invention, the diffraction angle θ and the value of D are as follows:

7.5°<θ<90°, and

0<D<0.475 and

D>−0.02θ+0.625.

In the diffractive optical element according to the aspect of the invention, in the convex and concave portions, in a case wherewith reference to the height of an intermediate portion between the convex portion and the concave portion, a portion higher than the height of the intermediate portion is the convex portion and a portion lower than the height of the intermediate portion is the concave portion, when an average value of the length of the convex portion and an average value of the length of the concave portion, that are within the range of $\lambda/8$ to $6\lambda$ where the wavelength of the light is $\lambda$, in the length of the convex portion and the length of the concave portion in a predetermined axis direction different from the height direction of the convex and concave portions, are respectively $\mu_1$ and $\mu_2$, the diffraction angle $\theta$ and a value of $D=\mu_1/(\mu_1+\mu_2)$ are as follows:

$7.5°<\theta<90°$, and $0<D<0.55$ and $D>-0.02\theta+0.65$.

In the diffractive optical element according to the aspect of the invention, the diffraction angle $\theta$ and the value of D are as follows:

$7.5°<\theta<90°$, and $0<D<0.525$ and $D>-0.02\theta+0.675$.

In the diffractive optical element according to the aspect of the invention, the diffraction efficiency in the zero-order diffraction that occurs in the diffractive optical element is 3% or less.

In the diffractive optical element according to the aspect of the invention, the diffractive optical element includes a reflection layer made of a material that reflects light.

According to another aspect of the invention, there is provided a measurement device including: a light source that emits light; the diffractive optical element according to the above-described aspect of the invention where the light is incident and diffracted light is output; and an imaging unit that captures an image of a measurement object to which the diffracted light is irradiated.

Effects of the Invention

According to the invention, it is possible to achieve a diffractive optical element that is capable of reliably suppressing occurrence of a zero-order diffracted light beam and generating light spots over a wide range. Further, it is possible to achieve a measurement device that is capable of performing measurement with high accuracy.

BRIEF DESCRIPTION OF THE DRAWINGS

FIG. 3 is a structure diagram of a diffractive optical element having two steps according to a first embodiment.

FIG. 5 is a (first) structure diagram of a diffractive optical element having three or more steps according to the first embodiment.

FIG. 9 is a diagram schematically illustrating concave portions and convex portions on the surfaces of diffractive optical elements A1, A2 and A3.

FIG. 14 is a histogram illustrating the lengths of the concave portions and the convex portions in the diffractive optical elements B1 and B2.

FIG. 17 is a diagram schematically illustrating concave portions and convex portions on the surfaces of diffractive optical elements C1, C2 and C3.

FIG. 26 is a histogram illustrating the lengths of the concave portions and the convex portions in the diffractive optical elements E1 and E2.

FIG. 29 is a diagram schematically illustrating concave portions and convex portions on the surfaces of diffractive optical elements F1 and F2.

FIG. 30 is a histogram illustrating the lengths of the concave portions and the convex portions in the diffractive optical elements F1 and F2.

FIG. 34 is a diagram illustrating SEM images on the surfaces of diffractive optical elements G1, G2 and G3.

FIG. 35 is a diagram schematically illustrating concave portions and convex portions on the surfaces of diffractive optical elements G1, G2 and G3.

FIG. 39 is a diagram illustrating SEM images on the surfaces of diffractive optical elements H1, H2 and H3.

FIG. 40 is a diagram schematically illustrating concave portions and convex portions on the surfaces of diffractive optical elements H1, H2 and H3.

FIG. 44 is a diagram illustrating SEM images on the surfaces of diffractive optical elements I1, I2 and I3.

FIG. 45 is a diagram schematically illustrating concave portions and convex portions on the surfaces of diffractive optical elements I1, I2 and I3.

FIG. 49 is a diagram illustrating SEM images on the surfaces of diffractive optical elements J1, J2 and J3.

FIG. 50 is a diagram schematically illustrating concave portions and convex portions on the surfaces of diffractive optical elements J1, J2 and J3.

FIG. 57 is a diagram schematically illustrating concave portions and convex portions on the surfaces of diffractive optical elements K1, K2 and K3.

FIG. 58 is a histogram illustrating the lengths of the concave portions and the convex portions in the diffractive optical elements K1, K2 and K3.

FIG. 62 is a histogram illustrating the lengths of the concave portions and the convex portions in the diffractive optical elements L1, L2 and L3.

FIG. 66 is a histogram illustrating the lengths of the concave portions and the convex portions in the diffractive optical elements M1 and M2.

MODES FOR CARRYING OUT THE INVENTION

Figure 1:
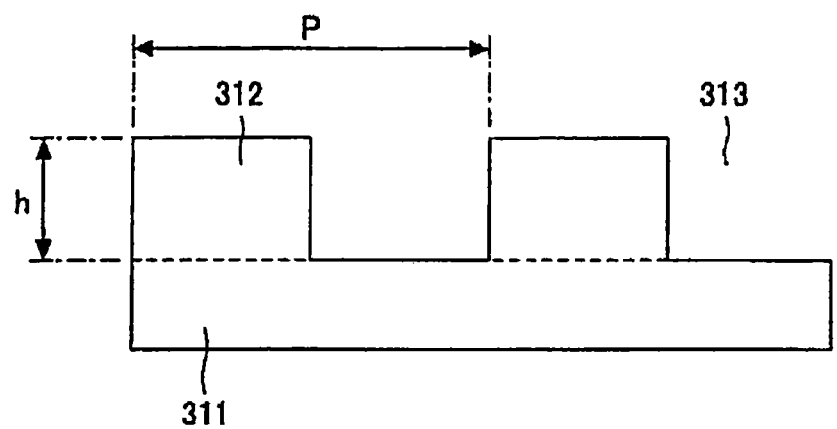
FIG. 1 is a cross-sectional view of a diffractive optical element.
Figure 2:
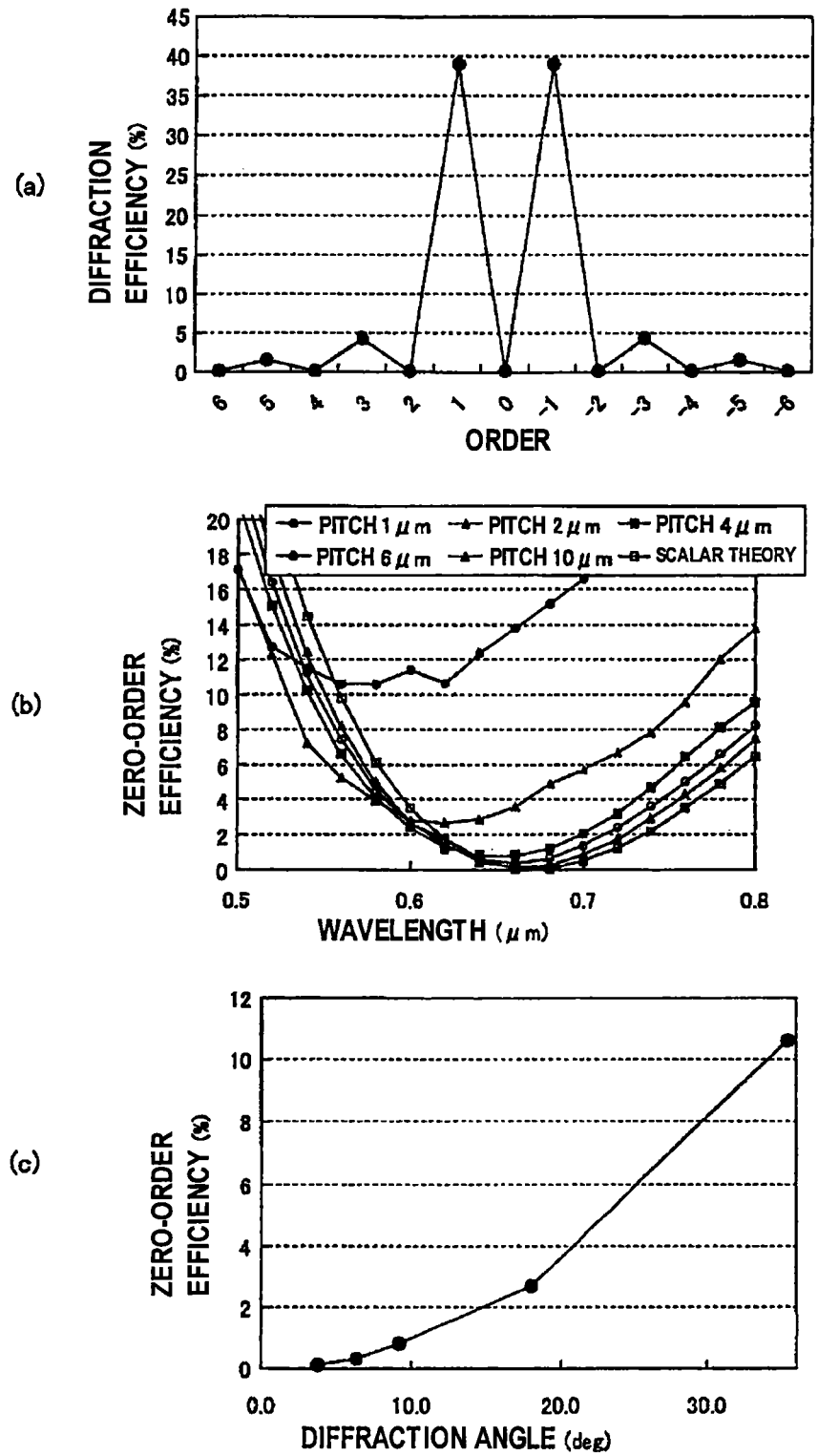
FIG. 2 is a diagram illustrating diffracted light generated by a diffractive optical element.

Hereinafter, embodiments of the invention will be described. The same reference numerals are given to the same members or the like, and description thereof will be omitted.

[First Embodiment]
(Diffractive Optical Element Having Two Steps)

A diffractive optical element according to a first embodiment will be described with reference to FIG. 3. A diffractive optical element 10 in the present embodiment has a configuration in which basic units 20 are two-dimensionally arranged, as shown in the plan view of FIG. 3(a). The basic unit 20 is formed to have a pitch Px in the X axis direction and a pitch Py in the Y axis direction. The basic units 20 that are two-dimensionally arranged in the diffractive optical element 10 have all the same patterns. As the pattern in the basic unit 20 of the diffractive optical element 10, a convex portion 31 and a concave portion 32 are formed on the surface of a substrate 30 that is a transparent substrate such as glass that transmits light. That is, the concave portion 32 in this case refers to a portion other than a portion where the convex portion 31 is formed. The convex portion 31 may be formed of the same material as that of the substrate 30, or may be formed of a material different from that of the substrate 30.

For example, in the former case, it is possible to obtain the convex portion 31 and the concave portion 32 by directly forming a concave and convex pattern on the surface of the substrate 30. Further, in the latter case, by forming a transparent film having a uniform thickness (not shown) on the surface of the substrate 30 and removing part of the transparent film, it is possible to form a portion where the transparent film is present on the substrate 30 and a portion where the transparent film is not present on the substrate 30. The portion where the transparent film formed in this way is present corresponds to the convex portion 31, and the portion where the transparent film is not present corresponds to the concave portion 32.

The transparent substrate 30 may be formed of various materials such as a resin plate or a resin film as long as the materials are transparent to the incident light. However, if an optically isotropic material such as glass or quartz is used, an influence of birefringence is not imparted to the transmitted light, which is preferable. Further, in the transparent substrate 30, for example, if an antireflection film formed of a multilayer film is provided in an interface with respect to air, a light reflection loss caused by Fresnel reflection may be reduced.

In the diffractive optical element 10, the concave portion 32 formed on the surface of the substrate 30 is filled with air since the substrate 30, the transparent film or the like is not present in this case. On the other hand, since the convex portion 31 is formed by the substrate 30 or the transparent film (not shown), the convex portion 31 has the same value as the refractive index of the substrate 30 or the transparent film. Here, when the refractive index of the convex portion 31 is $N_1$ and the refractive index of the concave portion 32 is $N_2$, in this case, the relationship of $N_1 > N_2$ is established in a wavelength region to be used. Further, the concave portion 32 may be filled with a material having a refractive index value lower than the refractive index $N_1$ of the material that forms the substrate 30 or the like, in addition to air. That is, it is sufficient if a phase difference is given to the incident light flux due to the concave portion and the convex portion of the diffractive optical element 10, and thus, the concave portion and the convex portion are not limited to a configuration where the concave portion and the convex portion are physically present as a surface shape. Further, in a case where the concave portion 32 is air, the refractive index $N_2$ is approximately 1.0. Thus, for example, it is possible to increase the difference with the refractive index of the glass, transparent film or the like that forms the substrate 30, that is, $N_1 - N_2$. Thus, it is possible to decrease the height of the convex portion 31 (depth of the concave portion 32) in order to assign a predetermined diffraction effect, and for example, to expect reduction in a machining process. Various materials to be described later may be used as the material of the transparent film.

Further, the number of steps formed by the convex portion 31 and the concave portion 32 on the surface of the substrate 30 is not limited to two steps, and as described later, may be three or more steps. Further, a side surface of the convex portion 31 is not limited to the case of being formed to be approximately perpendicular to the surface of the substrate 30 as shown in FIG. 3(b), and may be formed in a tapered shape having a slope with respect to the surface of the substrate 30. Further, the side surface of the convex portion 31 may be formed in a smooth shape without a step in the interface portion between the concave portion 32 and the convex portion 31. In the diffractive optical element according to the present embodiment, the bottom of the concave portion and the convex portion is defined as a first step, and an upper surface of the convex portion 31 corresponds to a second step in the case of the diffractive optical element 10. Further, it is assumed that the bottom is also defined as the first step in subsequent embodiments.

Next, the concave and convex pattern of the basic units 20 will be described. Specifically, in the diffractive optical element 10 according to the present embodiment, an example of a pattern formed by the convex portion 31 and the concave portion 32 in the basic units 20 is shown in FIG. 3(c). In FIG. 3(c), a region that corresponds to the convex portion 31 is shown as white, and a region that corresponds to the concave portion 32 is shown as black.

Figure 4:
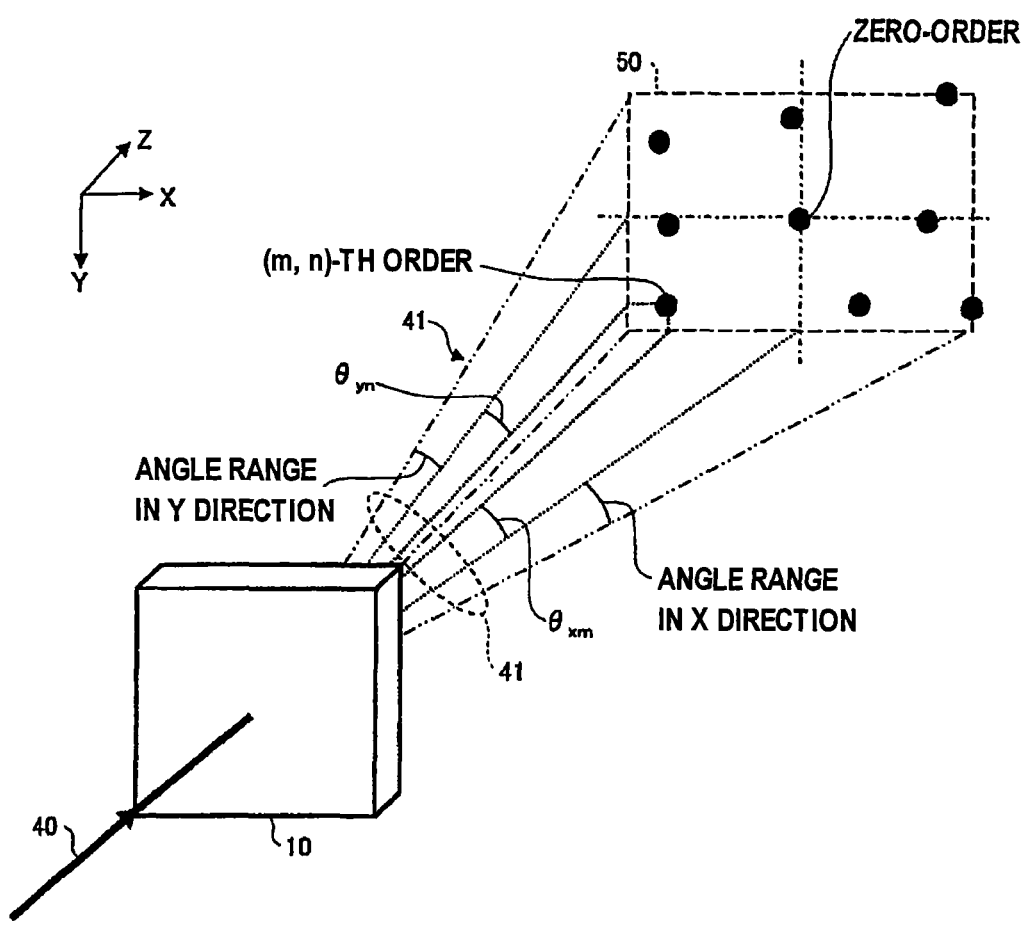
FIG. 4 is a diagram illustrating the diffractive optical element according to the first embodiment.

Here, in a case where light flux having a wavelength of $\lambda$ is incident onto the diffractive optical element 10 in which the basic units 20 shown in FIG. 3(c) are two-dimensionally arranged, an (m, n)-th order diffracted light beam having a diffraction angle $(\theta_{xm}, \theta_{yn})$ according to the formulas shown in Expression 3 is generated. Here, $\theta_{xm}$ means a diffraction angle of an m-th order diffracted light beam in the X axis direction, and $\theta_{yn}$ means a diffraction angle of an n-th order diffracted light beam in the Y axis direction. Further, a state where the incident light flux is diffracted is schematically shown in FIG. 4. Specifically, FIG. 4 shows a state where a light flux 40 is incident onto the diffractive optical element 10 and diffracted light beams 41 that is output from the diffractive optical element 10 are projected to a projection surface 50, according to the present embodiment. The output light beam that rectilinearly advances to the projection surface 50 with respect to the light flux 40 that is the incident light is a zero-order diffracted light beam. As described above, in the diffractive optical element 10, in a case where the diffraction angle of the diffracted light is large, the scalar theory is not established. However, as a first approximation, the (m, n)-th order diffracted light beam obtained by calculating phase distribution in the basic units 20 using the formula shown in Expression 2 is generated, and is irradiated onto the projection surface 50 as light spots.

An angle range in the diffracted light generated at this time is defined as follows. The maximum value with reference to an optical axis of the incident light flux in the range where the light flux having a diffraction order that is strong in intensity is distributed in the generated diffracted light is defined as the angle range of the diffracted light. In this regard, in a case where particular description is not present, the angle range will be expressed as an absolute value. In the diffractive optical element, diffracted light beams are generated in which the intensity of the diffracted light is not 0 on the basis of the formulas shown in Expression 3, in addition to the light flux that is strong in intensity. In this case, for example, on the basis of the light intensity of the diffracted light beam that is the strongest in intensity, diffracted light beams having a light intensity of ¼ or less of the maximum light intensity are not used as a target diffracted light beam. In other words, the angle range in the diffracted light is defined on the basis of the diffracted light beams having a light intensity that is larger than ¼ of the maximum light intensity. By determining the reference of the target light intensity in this way, a range where the amount of light is concentrated may be set as the angle range. Further, in a case where contrast of the amount of light with the periphery is obviously seen, the boundary may be defined the angle range.

Further, in a case where the number of light spots in the generated diffracted light is 100 or more and distribution of the light amount in each light spot is also wide, assuming that a histogram of the intensity of light shows normal distribution, a range where light spots having a light intensity of a range that is equal to or higher than a value obtained by subtracting a standard deviation $\sigma$ from an average value are present is defined as the angle range in the diffracted light. This definition is also used to set a range where the amount of light is concentrated as the angle range. Further, in a case where an obvious peak is seen, the range where light spots having the amount of light that is equal to or higher than a value obtained by subtracting $2\sigma$ from the average value are distributed may be set as the angle range. Further, when the histogram is made, if the entire diffracted light that is weak but visible is measured, the average value of the amount of light of the diffracted light is reduced. Thus, in a case where an obvious peak appears in the histogram of the amount of light, the diffracted light having an extremely small amount of light is not included in the calculation of the average value and the standard deviation. At this time, in a case where 100 or more light spots (diffracted light beams) are generated, since the light amount of each diffracted light is 1% or less, even in a case where the diffraction efficiency of the zero-order diffracted light beam is several percent, the zero-order diffracted light beam may have an influence on the histogram. In such a case, the zero-order diffracted light beam may not be included in the histogram. In the diffractive optical element 10 according to the present embodiment, in a case where the wavelength of light flux to be used is $\lambda$, the angle range in the X direction or in the Y direction is formed to be 7.5° or greater.

Next, the concave and convex pattern (distribution) of the basic units 20 will be described in detail. The basic units 20 have the convex portions 31 and the concave portions 32 in order to assign a predetermined phase distribution with respect to the incident light flux. Here, assuming that the surface having the concave portions and convex portions is represented as the X-Y plane, when a set of the lengths of the convex portions 31 in the case of being scanned in the X axis direction is $d_1$ and a set of the lengths of the concave portions 32 in the case of being scanned in the X axis direction is $d_2$, the distribution state of the convex portions 31 and the concave portions 32 may be expressed on the basis of $d_1$ and $d_2$. In this case, an average value $\mu(d)$ may be defined as $\mu(d)=(\Sigma d_i \times N_i)/(\Sigma N_i)$ in the set of the lengths d. Here, $d_i$ is the respective lengths included in the set d, and $N_i$ is the frequency that $d_i$ appears.

In the diffractive optical element according to the present embodiment, when the range of $d_i$ for calculation of the average value $\mu(d)$ is set to $6\lambda$ from $\lambda/8$ on the basis of the wavelength $\lambda$ of the light flux incident onto the diffractive optical element, the basic units 20 are formed so that an average $\mu(d_1)$ of the lengths based on the set $d_1$ of the lengths of the convex portions 31 and an average $\mu(d_2)$ of the lengths based on the set $d_2$ of the lengths of the concave portions 32 have the relationship of $\mu(d_1)<\mu(d_2)$. However, at this time, in a case where a statistical problem may occur according to a range where $d_i$ can be obtained, for example, in a case where a long peak is obviously present due to a structure of the diffractive optical element, $6\lambda$ that is the upper limit of the range may be changed into the range of $6\lambda\pm2\lambda$. Further, the range where $d_i$ can be obtained may be set to $\lambda/8$ to $4\lambda\pm\lambda$, or may be set to 0 to $2\lambda\pm\lambda$.

Further, as a result of inspection for the various concave and convex patterns in the basic units 20, it was found that as a condition of a range where $\mu(d_1)$ and $\mu(d_2)$ are satisfied, when D that satisfies $D=\mu(d_1)/\{\mu(d_1)+\mu(d_2)\}$ is given, D is preferably $0<D<0.5$.

Further, by satisfying the conditions of formulas shown in Expression 4, the diffraction efficiency in the zero-order diffracted light beam is preferably 5% or less, and more preferably 3% or less. The value at this time may be a value in a case where light loss of a diffraction grating due to reflection, absorption, scattering or the like is included.

$7.5°<\theta<90°$ $0<D<0.5$ $-0.02\theta+0.6<D<-0.00133\theta+0.5233$ (here, $7.5°<\theta<36.3°$)

$-0.02\theta+0.6<D<0.475$ (here, $36.3°\leq\theta<90°$) [Expression 4]

Further, by satisfying conditions of formulas shown in Expression 5, it is possible to reduce the diffraction efficiency in the zero-order diffracted light beam to 1.5% or less, which is more preferable.

$7.5°<\theta<90°$ $0<D<0.475$ $D>-0.02\theta+0.625$ [Expression 5]

In the formulas shown in Expressions 4 and 5, $\theta(°)$ represents the angle range of diffraction. Further, it is sufficient if the relational formulas of $\theta$ and D are satisfied in at least one direction where the diffracted light is generated. This is because for example, even in a case where the relational formulas of $\theta$ and D are satisfied in the X direction and the relational formula of $\theta$ or D is not satisfied in the Y direction, the zero-order light beam can be reduced by the diffraction result in the X direction.

In such an evaluation of D, it is possible to perform calculation by acquiring a plan view of the diffractive optical element and using image processing, for example. It is preferable that the calculation range of D be a region including the basic units 20, but in a case where the basic units 20 of the diffractive optical element 10 are large, the calculation range of D may be a region that includes a part of the basic units 20. However, in this case, since the evaluation is statistically performed, it is preferable that the calculation range of D be a sufficiently wide region.

Further, in other words, it can be said that, when the area ratio of the convex portions 31 and the concave portions 32 is calculated, the area that the convex portions 31 occupy on the plane of the diffractive optical element is smaller than the area that the concave portions 32 occupy. In comparison of the above-mentioned average values, it is not possible to directly compare the area of the convex portions 31 and the area of the concave portions 32 on the plane of the diffractive optical element from $\mu(d_1)<\mu(d_2)$ by comparing the average values of the lengths $d_1$ in the range of $\lambda/8$ to $6\lambda$, but the following consideration is obtainable. That is, if the diffraction angle formed by the diffractive optical element is increased and the number of light spots caused by the diffracted light generated by the diffractive optical element is increased, the ratio of the structure included in the range where the respective lengths occupying in the entire diffractive optical element are in the range of $\lambda/8$ to $6\lambda$ is increased. Accordingly, in the diffractive optical element that satisfies the above-mentioned conditions, when the average lengths of the convex portions 31 and the concave portions 32 are compared, the area of the convex portions 31 becomes smaller than the area of the concave portions 32. Here, on the basis of the definition of D, $\mu(d_1)/\mu(d_2)=D/(1-D)$, and the area ratio is considered to be proportional to the square of $\mu(d_1)/\mu(d_2)$. Thus, it is preferable that the ratio of the area of the convex portions 31 to the area of the concave portions 32 be larger than 0 and smaller than 1.

(Diffractive Optical Element Having Three or More Steps)

Next, in the diffractive optical element according to the present embodiment, a diffractive optical element having three or more steps will be described. The diffractive optical element according to the present embodiment may include a diffractive optical element having three or more steps, for example, $2^M$ steps (integer of $M\geq2$), or a diffractive optical element in which its surface is formed in a smooth shape and the number of steps cannot be specified. Even in such a case, with reference to an intermediate portion between the highest position and the lowest position of the diffractive optical element, for ease of description, by considering a portion higher than the height of the intermediate portion that is the reference as the convex portion and considering a portion lower than the height of the intermediate portion that is the reference as the concave portion, it is possible to perform definition in a similar way to the above-described case.

Specifically, as shown in FIG. 5(a), for example, in a diffractive optical element in which the number of steps N (integer of N≥3) is even, the height of the intermediate portion is present between the (N/2)-th step and the ((N/2)+1)-th step. That is, in a diffractive optical element having four steps, the height of the intermediate portion is present between the second step and the third step. In this case, as shown in FIG. 5(b), the third step and higher steps may be defined as the convex portions 31a, and the second step and the lower step may be defined as the concave portions 32a.

Figure 6:
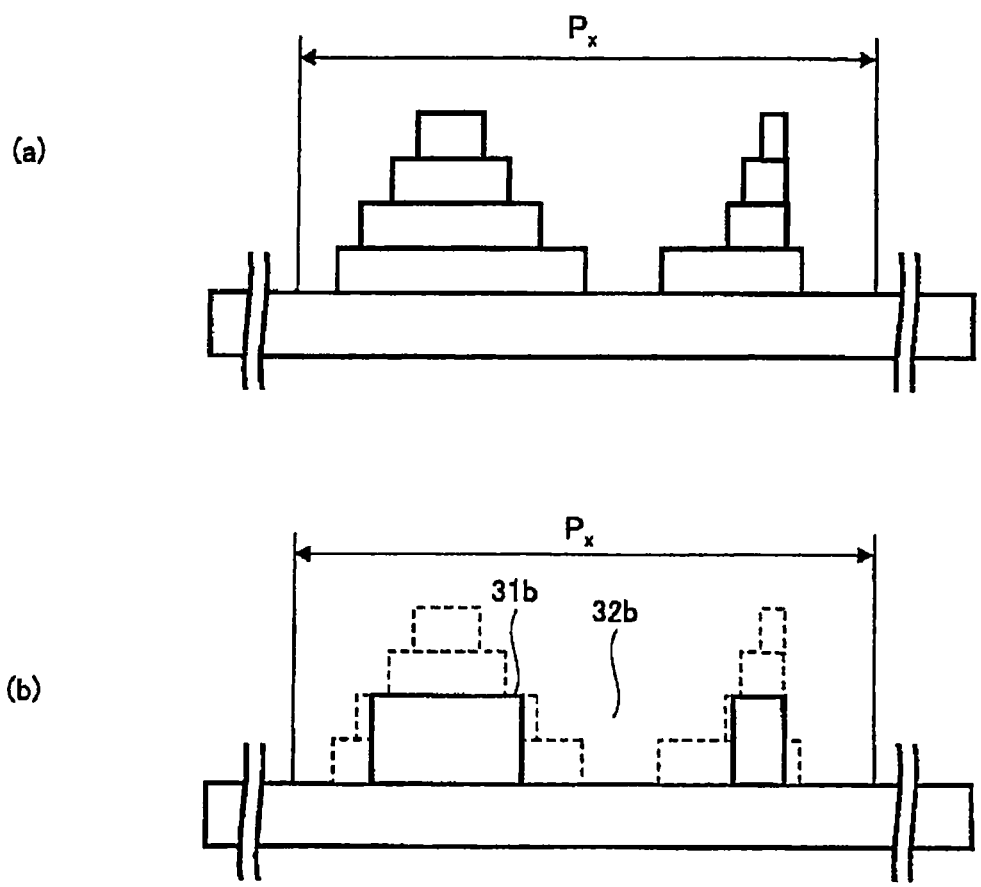
FIG. 6 is a (second) structure diagram of a diffractive optical element having three or more steps according to the first embodiment.

Further, as shown in FIG. 6(a), in a diffractive optical element in which the number of steps N (integer of N≥3) is odd, since the ((N/2)+1/2)-th step corresponds to the height of the intermediate portion, in the height of the intermediate portion. Thus, in a diffractive optical element having five steps, the third step corresponds to the height of the intermediate portion. In this case, as shown in FIG. 6(b), a convex portion 31b and a concave portion 32b are defined to be present so that a boundary is present in an intermediate portion of opposite ends in the third step, that is, in an intermediate portion between a portion that connects the second step to the third step and a portion that connects the third step to the fourth portion.

In the above description, it is assumed that the step difference between the steps is formed to be a regular interval, but in a case where the step difference is formed to be an irregular interval, or in a case where the concave portions and the convex portions are formed in the smooth shape, with reference to the height of the intermediate portion between the highest position and the lowest position on the surface of the diffractive optical element, a portion higher than the height of the intermediate portion is defined as the convex portion and a portion lower than the height of the intermediate portion is defined as the concave portion.

Further, as a result of inspection for the diffractive optical element having three or more steps, it was found that compared with the above-described diffractive optical element having two steps, even in a case where the value of D is increased by about 0.05, the diffraction efficiency of the zero-order diffracted light beam is reduced. That is, in the case of the diffractive optical element having three or more steps, it was found that it is preferable that 0<D<0.55.

Further, it is preferable to satisfy the conditions of formulas shown in Expression 6, and it is more preferable to satisfy the conditions of formulas shown in Expression 7.

$7.5°<\theta<90°$ $0<D<0.55$ $D>-0.02\theta+0.65$ [Expression 6]

$7.5°<\theta<90°$ $0<D<0.525$ $D>-0.02\theta+0.675$ [Expression 7]

In the formulas shown in Expressions 6 and 7, θ(°) represents the angle range of diffraction. Further, it is sufficient if the relational formulas of θ and D are satisfied in at least one direction where the diffracted light is generated. This is because for example, even in a case where the relational formulas of θ and D are satisfied in the X direction and the relational formula of θ or D is not satisfied in the Y direction, the zero-order light beam can be reduced by the diffraction result in the X direction.

In such an evaluation of D, it is possible to perform calculation by acquiring a plan view of the diffractive optical element and using image processing, for example. It is preferable that the calculation range of D be a region including the basic units 20, but in a case where the basic units 20 of the diffractive optical element 10 are large, the calculation range of D may be a part of the basic units 20. However, in this case, since the evaluation is statistically performed, it is preferable that the calculation range of D be a sufficiently wide region.

Further, in other words, it can be said that, when the area ratio of the convex portions 31 and the concave portions 32 is calculated, the area that the convex portions 31 occupy on the plane of the diffractive optical element is smaller than the area that the concave portions 32 occupy. In comparison of the above-mentioned average values, it is not possible to directly compare the area of the convex portions 31 and the area of the concave portions 32 on the plane of the diffractive optical element from $\mu(d_1)<\mu(d_2)$ by comparing the average values of the lengths $d_i$ in the range of λ/8 to 6λ, but the following consideration is obtainable. That is, if the diffraction angle formed by the diffractive optical element is increased and the number of light spots caused by the diffracted light generated by the diffractive optical element is increased, the ratio of the structure included in the range where the respective lengths occupying in the entire diffractive optical element are in the range of λ/8 to 6λ is increased. Accordingly, in the diffractive optical element that satisfies the above-mentioned conditions, when the average lengths of the convex portions 31 and the concave portions 32 are compared, the area of the convex portions 31 becomes smaller than the area of the concave portions 32. Here, on the basis of the definition of D, $\mu(d_1)/\mu(d_2)=D/(1-D)$, and the area ratio is considered to be proportional to the second power of $\mu(d_1)/\mu(d_2)$. Thus, in a case where the maximum value of D is 0.55, the ratio of the area of the convex portions 31 to the area of the area of the concave portions 32 is 1.49, but as a result of inspection, it was found that it is preferable that the ratio of the area of the convex portions 31 to the area of the concave portions 32 be larger than 0 and smaller than 1.38.

(Machining Method and Configuration Material of Diffractive Optical Element)

The concave and convex shape of the diffractive optical element 10 may be formed using cutting, electron beam machining, lithography processing, mold injection or the like. Further, resin, inorganic material, organic-inorganic composite material, birefringent material or the like may be used as the material of the convex portion, and resin, inorganic resin, organic-inorganic composite material, birefringent material, air or the like may be used as the material of the concave portion, as long as it is a material having a low refractive index compared with that of the convex portion. $SiO_2$, $SnO_2$, $Ta_2O_5$, $TiO_2$, $HfO_2$, $ZrO_2$, $Al_2O_5$, $Si_3N_4$, HfON, SiON, or composite material thereof or the like may be used as the inorganic material.

Further, in addition to the above-described method, a method of coating a resin monomer on a planar substrate, curing the resin monomer by ultraviolet rays, heat or the like after interposing the resin monomer with a mold substrate having a concave portion and a convex portion, and then releasing the mold substrate, or a method of injecting a resin monomer in a gap generated by causing the planar substrate and the mold substrate to face each other, may be used as the method of machining the concave and convex shape. In order to facilitate mold release characteristics, mold release may be performed for the mold substrate. However, if a resin that includes a monomer containing fluorine is used, it is not necessary to perform mold release for the mold substrate, which is preferable. A resin that includes a surfactant containing fluorine or a polymer containing fluorine may be used, instead of the monomer containing fluorine. Hereinafter, available resin monomers will be described.

The resin monomer is not particularly limited as long as it is a monomer having a polymerizable group. For example, a monomer having an arcryloyl group or a metacryloyl group, a monomer having a vinyl group, a monomer having an allyl group or a monomer having an oxiranyl group are preferably used, and a monomer having an arcryloyl group or a metarcryloyl group are more preferably used. The number of polymerizable groups in the main component monomer is preferably 1 to 4, more preferably 1 or 2, and most preferably 1.

As the monomer having the polymerizable group, (meta) acrylic acid, (meta)acrylate, (meta)acrylamide, vinyl ether, vinyl ester, aryl ether, aryl ester, or a styrene-based compound is preferably used, and (meta)acrylate is more preferably used. Here, in the present specification, the acrylic acid and the metacrylic acid are collectively referred to as (meta)acrylic acid, the acrylate and the metacrylate are collectively referred to as (meta) acrylate, and the acrylamide and the metacrylamide are collectively referred to as (meta) acrylamide.

As a specific example of the (meta) acrylate, the following compound may be used. Mono (meta) acrylate such as phenoxyethyl (meta) acrylate, benzyl (meta) acrylate, stearyl (meta) acrylate, lauryl (meta) acrylate, 2-ethylhexyl (meta) acrylate, ethoxyethyl (meta) acrylate, methoxyethyl (meta) acrylate, glycidyl (meta) acrylate, tetra-hydrofurfuril (meta) acrylate, allyl (meta) acrylate, 2-hydroxyethyl (meta) acrylate, 2-hydroxypropyl (meta) acrylate, N, N-diethylaminoethyl (meta) acrylate, N,N-dimethylaminoethyl (meta) acrylate, dimethylamonoethyl (meta) acrylate, methyladamantyl (meta) acrylate, ethyladamantyl (meta) acrylate, hydroxyadamantyl (meta) acrylate, adamantyl (meta) acrylate or isobonyl (meta) acrylate may be used.

Further, di (meta) acrylate such as 1,3-butan diol di (meta) acrylate, 1,4-butan diol di (meta) acrylate, 1, 6-hexane diol di (meta) acrylate, diethylene glycol di (meta) acrylate, triethylene glycol di (meta) acrylate, tetraethylene glycol di (meta) acrylate, neopentyl glycol di (meta) acrylate, polyoxyethylene glycol di (meta) acrylate or tripropylene glycol di (meta) acrylate may be also used. Further, (meta) acrylate having four or more polymerizable groups such as dipentaerythritol hexa (meta) acrylate may be also used.

As a specific example of vinyl ether, alkyvinyl ether such as ethylinyl ether, propylvinyl ether, isobutylvinyl ether, 2-ethylhexylvinyl ether or cyclohexylvinyl ether, or (hydroxyalkyl)vinyl such as 4-hydrocyclobutyl ether may be used. As a specific example of vinyl esther, vinyl ether such as vinyl acetate, vinyl propionate, (iso) vinyl butyrate, vinyl valerate, cyclohexane carboxylic acid vinyl or vinyl benzoate may be used.

As a specific example of allyl ether, alkyl ally ether such as ethyl allyl ether, propyl allyl ether, (iso) butyl allyl ether or cyclohexyl allyl ether may be used. As a monomer having the oxiranyl group, a monomer having an epoxy group, a monomer having an oxetane group or a monomer having an oxazoline group may be used.

The monomer containing fluorine is not particularly limited as long as it is a monomer containing fluorine having a polymerizable group. For example, a monomer containing fluorine having an acryloyl group or a metacryloyl group, a monomer containing fluorine having a vinyl group, a monomer containing fluorine having a fluorovinyl group, a monomer containing fluorine having an allyl group or a monomer containing fluorine having an oxiranyl group is preferably used. The number of polymerizable groups in the monomer containing fluorine is preferably 1 to 4, and more preferably 1 or 2, and most preferably 1.

Further, the monomer containing fluorine is preferably (A) a compound expressed as a formula "$CF_2=CR^1$-Q-$CR^2=CH_2$" (here, $R^1$ and $R^2$ independently represent a hydrogen atom, a fluorine atom, an alkyl group carbon number of which is 1 to 3, or a fluoroalkyl group carbon number of which is 1 to 3, respectively, and Q represents a bivalent organic group that may have an oxygen atom, a group expressed as a formula "—$NR^3$—" ($R^3$ represents a hydrogen atom, an alkyl group carbon number of which is 1 to 6, an alkylcarbonyl group or a tosyl group) or a functional group. The same hereinafter.), or (B) a compound expressed as a formula "$(CH_2=CXCOO)_nR^F$" (here, n represents an integer of 1 to 4, X represents a hydrogen atom, a fluorine atom, a methyl group or a trifluoromethyl group, and $R^F$ represents a functional group containing n-atomic fluorine carbon number of which is 1 to 30).

In a case where Q in the compound expressed as the formula "$CF_2=CR^1$-Q-$CR^2=CH_2$" is the bivalent organic group, a group is preferably used in which a group selected from a group including methylene, dimethylene, trimethylene, tetramethylene, oxymethylene, oxydimethylene, oxytrimethylene and dioxymethylene is used as a main chain and a hydrogen atom in the main chain is replaced with a group selected from a fluorine atom, a hydroxyl group, an alkyl group carbon number of which is 1 to 6, a hydroxyalkyl group carbon number of which is 1 to 6 and a hydroxyalkyl group carbon number of which is 1 to 6 in which an ether-related oxygen atom is inserted into between carbon atoms, and a group is preferably used in which one or more hydrogen atoms that form carbon atom and hydrogen atom bonding in the group is replaced with a fluorine atom. Here, —$CF_2C(CF_3)(OH)CH_2$—, —$CF_2C(CF_3)(OH)$—, —$CF_2C(CF_3)(OCH_2OCH_3)CH_2$—, —$CH_2CH(CH_2C(CF_3)_2(OH)CH_2$— or —$CH_2CH(CH_2C(CF_3)OH)$— is particularly preferable. Here, the direction of the group means that the left side is bonded to $CF_2=CR^1$—.

As a specific example of the compound expressed as the formula "$CF_2=CR^1$-Q-$CR^2=CH_2$", $CF_2=CFCH_2CH(C(CF_3)_2OH)CH_2CH=CH_2$, $CF_2=CFCH_2CH(C(CF_3)_2OH)CH=CH_2$, $CF_2=CFCH_2CH(C(CF_3)_2OH)CH_2CH_2CH=CH_2$, $CF_2=CFCH_2CH(CH_2C(CF_3)_2OH)CH_2CH_2CH=CH_2$, $CF_2=CFCH_2C(CH_3)(CH_2SO_2F)_2CH_2CH=CH_2$, $CF_2=CFCF_2C(CF_3)(OCH_2OCH_2)CH_2CH=CH_2$, $CF_2=CFCF_2C(CF_3)(OH)CH=CH_2$, $CF_2=CFCF_2C(CF_3)(OH)CH_2CH=CH_2$, $CF_2=CFCF_2C(CF_3)(OCH_2OCH_2CF_3)CH_2CH=CH_2$, $CF_2=CFCF_2C(CF_3)(OCH_2OCH_3)CH_2CH=CH_2$, $CF_2=CFOCF_2CF(O(CF_2)_3OC_2H_5)CH_2CH=CH_2$, $CF_2=CFOCF_2CF(OCF_2CF_2CH_2NH_2)CH_2CH=CH_2$, $CF_2=CFOCF_2CF(O(CF_2)_3CN)CH=CH_2$, $CF_2=CFOCF_2CF(OCF_2CF_2SO_2F)CH_2CH=CH_2$, $CF_2=CFOCF_2CF(O(CF_2)_3PO(OC_2H_5)_2)CH_2CH=CH_2$, or $CF_2=CFOCF_2CF(OCF_2CF_2SO_2F)CH_2CH=CH_2$ may be used.

It is preferable that "n" in the compound expressed as the formula "$(CH_2=CXCOO)_nR^F$" be 1 or 2. It is preferable that X be a hydrogen atom or a methyl group. Particularly, it is preferable that the carbon number of $R^F$ be 4 to 24.

In a case where n is 1, $R^F$ is an organic group containing univalent fluorine. The organic group containing the univalent fluorine is preferably an organic group containing univalent fluorine having a polyfluoroalkyl group in which an ether-related oxygen atom may be inserted between carbon atoms. Such an organic group containing the univalent fluorine is more preferably a group expressed as a formula "—$(CH_2)_{f1}R^{F1}$", "—$SO_2NR^4(CH_2)_{f1}R^{F1}$" or "—$(C=O)NR^4(CH_2)_{f1}R^{F1}$" (here, f1 represents an integer of 1 to 3, $R^{F1}$ represents a polyfluoroalkyl group carbon number of which is 4 to 16 in which an ether-related oxygen atom may be inserted into between carbon atoms, and $R^4$ represents a hydrogen atom, a methyl group or an ethyl group.). The polyfluoroalkyl group ($R^{F1}$) is preferably a perfluoroalkyl group, and more preferably a straight chain perfluoroalkyl group.

In a case where n is 2, $R^F$ is an organic group containing bivalent fluorine. The organic group containing the bivalent fluorine is preferably a polyfluoroalkylene group in which an ether-related oxygen atom may be inserted into between carbon atoms, and more preferably a group expressed as a formula "—$(CH_2)_{f2}R^{F2}(CH_2)_{f3}$" (here, f2 and f3 respectively represent an integer of 1 to 3, and $R^{F2}$ represents a polyfluoroalkyl group carbon number of which is 4 to 16 in which an ether-related oxygen atom may be inserted into between carbon atoms.). The polyfluoroalkylene group ($R^{F2}$) is preferably a perfluoroalkylene group, and more preferably a straight chain perfluoroxyalkylene group and a perfluoroxyalkylene group in which an ether-related oxygen atom is inserted into between carbon atoms and that has a trifluoromethyl group on a side chain.

Further, as a specific example of the compound expressed as the formula "$(CH_2=CXCOO)_nR^F$", $CH_2=CHCOO_2(CH_2)_2(CF_2)_8F$, $CH_2=CHCOO_2(CH_2)_2(CF_2)_6F$, $CH_2=C(CH_3)COO_2(CH_2)_2(CF_2)_8F$, $CH_2=C(CH_3)COO_2(CH_2)_2(CF_2)_6F$, $CH_2=CHCOOCH_2(CF_2)_7F$, $CH_2=C(CH_3)COOCH_2(CF_2)_7F$, $CH_2=CHCOOCH_2CF_2CF_2H$, $CH_2=CHCOOCH_2(CF_2CF_2)_4H$, $CH_2=C(CH_3)COOCH_2CF_2CF_2H$, $CH_2=C(CH_3)COOCH_2(CF_2CF_2)_4H$, $CH_2=CHCOOCH_2CF_2OCF_2CF_2OCF_3$, $CH_2=CHCOOCH_2CF_2O(CF_2CF_2O)_3CF_3$, $CH_2=C(CH_3)COOCH_2CF_2OCF_2CF_2OCF_3$, $CH_2=C(CH_3)COOCH_2CF_2O(CF_2CF_2O)_3CF_3$, $CH_2=CHCOOCH_2(CF_3)O(CF_2CF(CF_3)O)_2(CF_2)_3CF$, $CH_2=C(CH_3)COOCH_2CF(CF_3)O(CF_2CF(CF_3)O)_2(CF_2)_3CF$, $CH_2=CHCOOCH_2CF_2O(CF_2CF_2O)_6CF_2CH_2OCOCH=CH_2$, $CH_2=C(CH_3)COOCH_2CF_2O(CF_2CF_2O)_6CF_2CH_2OCOC(CH_3)=CH_2$, $CH_2=CHCOOCH_2(CF_2)_4CH_2OCOCH=CH_2$ or $CH_2=C(CH_3)COOCH_2(CF_2)_4CH_2OCOC(CH_3)=CH_2$ may be used.

Further, the surfactant containing fluorine is preferably a surfactant containing fluorine in which the fluorine content is 10 to 70 mass %, and more preferably a surfactant containing fluorine in which the fluorine content is 20 to 40 mass %. The surfactant containing fluorine may be aqueous or fat-soluble.

The surfactant containing fluorine is preferably an anionic surfactant containing fluorine, a cationic surfactant containing fluorine, an amphiprotic surfactant containing fluorine or a nonionic surfactant containing fluorine. From the view point of favorable dispersibility, particularly, the nonionic surfactant containing fluorine is preferably used.

The anionic surfactant containing fluorine is preferably polyfluoroalkyl carboxylate, polyfluoroalkyl phosphate ester or polyfluoroalkyl sulfonate. As a specific example of these sulfactants, Surflon S-111 (trademark, made by AGC Seimi Chemical Co., Ltd.), Fluorad FC-143 (trademark, made by 3M Corporation), Megafac F-120 (trademark, made by Dai Nippon Printing Co., Ltd.) or the like may be used.

The cationic surfactant containing fluorine is preferably a trimethyl ammonium salt of polyfluoroalkyl carboxylate or a trimethyl ammonium salt of polyfluoroalkyl sulfonate amide. As a specific example of these sulfactants, Surflon S-121 (trademark, made by AGC Seimi Chemical Co., Ltd.), Fluorad FC-134 (trademark, made by 3M Corporation), Megafac F-450 (trademark, made by Dai Nippon Printing Co., Ltd.) or the like may be used.

The amphiprotic surfactant containing fluorine is preferably polyfluoroalkyl betaine. As a specific example of this surfactant, Surflon S-132 (trademark, made by AGC Seimi Chemical Co., Ltd.), Fluorad FX-172 (trademark, made by 3M Corporation) or the like may be used.

As the nonionic surfactant containing fluorine, polyfluoroalkyl amine oxide, polyfluoroalkyl-alkylene oxide additives, oligomer or polymer that includes a monomer unit based on a monomer having a fluoroalkyl group, or the like may be used. The fluoroalkyl group is preferably the polyfluoroalkyl group ($R^{F1}$). The nonionic surfactant containing fluorine is preferably oligomer or a polymer that includes a monomer unit based on a monomer having the fluoroalky group (mass mean molecular weight is 1000 to 8000). The monomer having the fluoroalkyl group is preferably fluoro(meta)acrylate, and more preferably fluoroalkyl(meta)acrylate. The fluoroalkyl(meta)acrylate is preferably a compound in which n is 1 and X is a hydrogen atom or a methyl group in the compound expressed as the formula "$(CH_2=CXCOO)_nR^F$".

Further, as a specific example of the nonionic surfactants containing fluorine, Surflon S-145 (trademark, made by AGC Seimi Chemical Co., Ltd.), Surflon S-393 (trademark, made by AGC Seimi Chemical Co., Ltd.), Surflon KH-40 (trademark, made by AGC Seimi Chemical Co., Ltd.), Fluorad FC-170 (trademark, made by 3M Corporation), Fluorad FC-430 (trademark, made by 3M Corporation), Megafac F-444 (trademark, made by Dai Nippon Printing Co., Ltd.), Megafac F-479 (trademark, made by Dai Nippon Printing Co., Ltd.) or the like may be used.

As the polymer containing fluorine, a polymer containing fluorine obtained by polymerizing the compound expressed as the formula "$CF_2=CR^1-Q-CR^2=CH_2$" or a polymer containing fluorine obtained by polymerizing $CF_2=CF_2$ and $CH_2=CHOCOCH_3$ may be used. As a specific example of the compound expressed as the formula "$CF_2=CR^1-Q-CR^2=CH_2$", the above-mentioned compound may be used.

The polymer containing fluorine is preferably a polymer containing fluorine obtained by polymerizing the compound expressed as the formula "$CF_2=CR^1-Q-CR^2=CH_2$". Particularly, it is preferable that $R^1$ be a fluorine atom, $R^2$ be a hydrogen atom, and Q be a group selected from —$CF_2C(CF_3)(OH)CH_2$—, —$CF_2C(CF_3)(OH)$—, —$CF_2C(CF_3)(OCH_2OCH_3)CH_2$—, —$CH_2CH(CH_2C(CF_3)_2(OH)CH_2$— and —$CH_2CH(CH_2C(CF_3)OH)$—.

According to the above-described configuration, in the diffractive optical element according to the present embodiment, it is possible to reduce the diffraction efficiency of the zero-order diffracted light beam.

Hereinafter, with regard to examples of the diffractive optical element, characteristics of Example 1 to Example 13 of the diffractive optical element are collectively shown in Table 1. Table 1 shows the number of light spots of the respective diffractive optical elements from Example 1 to Example 13 of the diffractive optical element, the number of steps of the concave portions and convex portions that form each diffractive optical element, a wavelength in which the zero-order diffraction efficiency is a minimum value when light is incident onto each diffractive optical element and the zero-order diffraction efficiency at this time, pitches of the basic units of each diffractive optical element in the X direction and the Y direction, and the number of orders in which an absolute value of the number of diffractions generated in the X direction and the Y direction in the light spots generated from each diffractive optical element is maximum, and a diffraction angle range of the light spots generated from each diffractive optical element in the X direction and the Y direction, and an angle range of diffracted light in which the diffraction angle is maximum. Further, Table 1 also shows a value of D calculated from an image of a planar structure of the basic unit shown in Example 1 to Example 13 of the diffractive optical element, and a value (area ratio) obtained by calculating the area of the convex portions with respect to the area of the concave portions in the image of the planar structure of the basic unit shown in Example 1 to Example 13 of the diffractive optical element.

by using a quartz substrate as a substrate, coating a photoresist on the surface of the substrate, performing exposure and development using an exposure device to form a resist pattern, and by etching the surface of the substrate in a region where the resist pattern is not formed by RIE or the like. Then, the resist pattern is removed.

In the diffractive optical elements A1, A2 and A3, basic units are formed as a region having a pitch Px=Py=12.8 μm, and the basic units are arranged in parallel in the range of 4.5 mm×4.5 mm. The order (m, n) of diffraction generated in each diffractive optical element corresponds to m=−7, −5, −3, −1, 1, 3, 5 and 7 in the X direction and n=−5, −3, −1, 1, 3 and 5 in the Y direction. The diffractive optical element A1 is a diffractive optical element of two steps in which the height of the convex portion is 0.91 μm. In the diffractive optical elements A2 and A3, the height of the convex portion is 0.96 μm.

Figure 7:
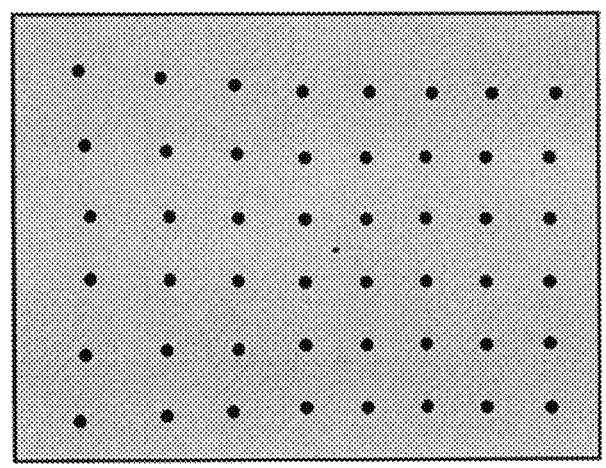
FIG. 7 is a diagram illustrating light spots generated by diffracted light of a diffractive optical element A3.

Further, FIG. 7 shows that light spots generated by diffracted light are displayed as black in a case where light flux having a wavelength of 0.66 μm is incident, in the diffractive optical element A3, as an example. The diffractive optical element A3 that provides such light spots may be designed by the repetitive Fourier transform or the like.

TABLE 1

| Example | Element | Number of light spots | Number of steps | Zero-order diffraction efficiency minimum value | | Pitch (μm) | | Order | | Diffraction angle range (°) | | | D | Area ratio |
|---|---|---|---|---|---|---|---|---|---|---|---|---|---|---|
| | | | | Wavelength (μm) | Zero-order efficiency (%) | Px | Py | X | Y | X | Y | MAX | | |
| 1 | A1 | 48 | 2 | 0.760 | 9.7 | 12.8 | 12.8 | 7 | 5 | 24.6 | 17.3 | 30.7 | 0.555 | 1.348 |
| | A2 | | | 0.755 | 1.1 | 12.8 | 12.8 | 7 | 5 | 24.4 | 17.2 | 30.5 | 0.473 | 0.854 |
| | A3 | | | 0.740 | 0.1 | 12.8 | 12.8 | 7 | 5 | 23.9 | 16.8 | 29.8 | 0.435 | 0.688 |
| 2 | B1 | 12 | 2 | 0.790 | 1.9 | 12.8 | 12.8 | 3 | 2 | 10.7 | 7.1 | 12.9 | 0.492 | 0.893 |
| | B2 | | | 0.790 | 0.0 | 12.8 | 12.8 | 3 | 2 | 10.7 | 7.1 | 12.9 | 0.467 | 0.773 |
| 3 | C1 | 4 | 2 | 0.775 | 10.5 | 3.2 | 4.27 | 1 | 1 | 14.0 | 10.5 | 17.6 | 0.547 | 1.368 |
| | C2 | | | 0.760 | 2.0 | 3.2 | 4.27 | 1 | 1 | 13.7 | 10.3 | 17.3 | 0.475 | 0.895 |
| | C3 | | | 0.740 | 0.5 | 3.2 | 4.27 | 1 | 1 | 13.4 | 10.0 | 16.8 | 0.450 | 0.677 |
| 4 | D1 | 8 | 2 | 0.800 | 6.1 | 12.8 | — | 7 | — | 25.9 | — | 25.9 | 0.500 | — |
| | D2 | | | 0.785 | 0.9 | 12.8 | — | 7 | — | 25.4 | — | 25.4 | 0.419 | — |
| | D3 | | | 0.765 | 0.2 | 12.8 | — | 7 | — | 24.7 | — | 24.7 | 0.326 | — |
| 5 | E1 | 8 | 2 | 0.790 | 1.8 | 19.2 | — | 7 | — | 16.7 | — | 16.7 | 0.487 | — |
| | E2 | | | 0.820 | 0.2 | 19.2 | — | 7 | — | 17.4 | — | 17.4 | 0.419 | — |
| 6 | F1 | 8 | 2 | 0.820 | 0.4 | 32 | — | 7 | — | 10.3 | — | 10.3 | 0.485 | — |
| | F2 | | | 0.840 | 0.2 | 32 | — | 7 | — | 10.6 | — | 10.6 | 0.475 | — |
| 7 | G1 | 48 | 8 | 0.600 | 5.1 | 64 | 64 | 35 | 25 | 19.2 | 13.6 | 23.8 | 0.572 | 1.384 |
| | G2 | | | 0.620 | 1.1 | 64 | 64 | 35 | 25 | 19.8 | 14.0 | 24.6 | 0.503 | 1.008 |
| | G3 | | | 0.625 | 0.1 | 64 | 64 | 35 | 25 | 20.0 | 14.1 | 24.8 | 0.463 | 0.841 |
| 8 | H1 | 30000 | 8 | 0.630 | 4.2 | 330 | 330 | 199 | 149 | 22.3 | 16.5 | 28.3 | 0.587 | 1.734 |
| | H2 | | | 0.630 | 1.2 | 330 | 330 | 199 | 149 | 22.3 | 16.5 | 28.3 | 0.525 | 1.244 |
| | H3 | | | 0.640 | 0.2 | 330 | 330 | 199 | 149 | 22.7 | 16.8 | 28.8 | 0.488 | 1.036 |
| 9 | I1 | 30000 | 8 | 0.760 | 0.5 | 481.3 | 456.7 | 300 | 225 | 28.3 | 22.0 | 37.1 | 0.469 | 0.754 |
| | I2 | | | 0.745 | 0.1 | 481.3 | 456.7 | 300 | 225 | 27.7 | 21.5 | 36.3 | 0.445 | 0.680 |
| | I3 | | | 0.730 | 0.0 | 481.3 | 456.7 | 300 | 225 | 27.1 | 21.1 | 36.5 | 0.424 | 0.593 |
| 10 | J1 | 30000 | 8 | 0.675 | 0.6 | 320.5 | 304.1 | 200 | 150 | 24.9 | 19.4 | 32.5 | 0.402 | 0.644 |
| | J2 | | | 0.655 | 0.1 | 320.5 | 304.1 | 200 | 150 | 24.1 | 18.8 | 31.4 | 0.365 | 0.517 |
| | J3 | | | 0.660 | 0.0 | 320.5 | 304.1 | 200 | 150 | 24.3 | 19.0 | 31.7 | 0.357 | 0.502 |
| 11 | K1 | 24212 | 2 | 0.756 | 1.6 | 512 | 520.2 | 319 | 256 | 28.1 | 21.8 | 33.7 | 0.436 | 0.759 |
| | K2 | | | 0.711 | 0.1 | 512 | 520.2 | 319 | 256 | 26.3 | 20.5 | 31.8 | 0.365 | 0.527 |
| | K3 | | | 0.703 | 0.9 | 512 | 520.2 | 319 | 256 | 26.0 | 20.2 | 31.4 | 0.323 | 0.406 |
| 12 | L1 | 24914 | 2 | 0.796 | 2.5 | 409.6 | 358.4 | 399 | 300 | 50.8 | 41.8 | 56.6 | 0.407 | 0.565 |
| | L2 | | | 0.779 | 1.4 | 409.6 | 358.4 | 399 | 300 | 49.4 | 40.7 | 55.4 | 0.373 | 0.452 |
| | L3 | | | 0.781 | 0.2 | 409.6 | 358.4 | 399 | 300 | 49.5 | 40.8 | 55.5 | 0.363 | 0.416 |
| 13 | M1 | 16 | 2 | 0.806 | 0.9 | 4.1 | 4.6 | 3 | 3 | 36.4 | 31.7 | 43.9 | 0.362 | 0.565 |
| | M2 | | | 0.800 | 0.1 | 4.1 | 4.6 | 3 | 3 | 36.1 | 31.4 | 43.6 | 0.332 | 0.448 |

(Example 1 of Diffractive Optical Element)

Figure 8:
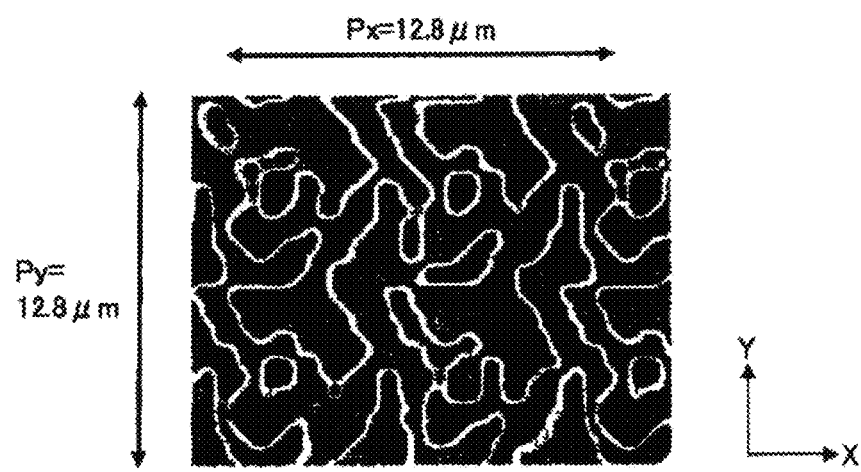
FIG. 8 is a diagram illustrating an SEM image on the surface of a diffractive optical element A1.

Diffractive optical elements A1, A2 and A3 to be initially illustrated are diffractive optical elements of two steps, capable of generating light spots of 8×6 points that are regularly arranged. The diffractive optical element is formed FIG. 8 shows an image (SEM image) obtained by observing a planar structure in the basic units of the diffractive optical element A1 using a scanning electron microscope (SEM). Further, FIG. 9(a) shows that convex portions are displayed as black, concave portions are displayed as gray, and tapered portions of boundary portions between the concave portions and the convex portions are displayed as white, on the basis of the SEM image. When the concave portions and the convex portions are actually determined, observation may be performed using the SEM in a state where the diffractive optical element is inclined in an oblique direction. This is also similarly applied to the diffractive optical elements A2 and A3. FIG. 9(b) shows the case of the diffractive optical element A2, and FIG. 9(c) shows the case of the diffractive optical element A3.

Figure 10:
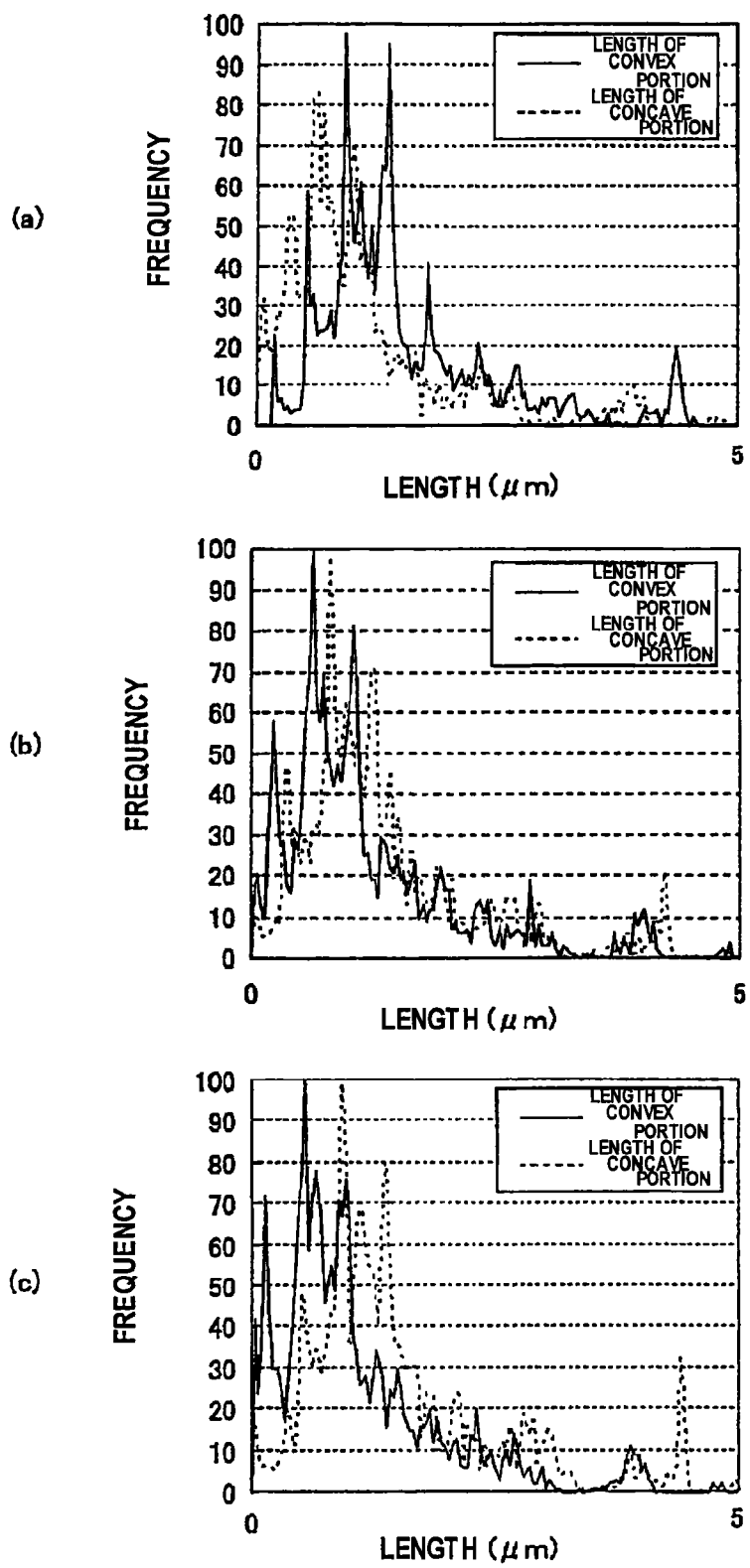
FIG. 10 is a histogram illustrating the lengths of the concave portions and the convex portions in the diffractive optical elements A1, A2 and A3.

FIGS. 10(a), 10(b) and 10(c) are histograms illustrating the lengths of a concave portion and a convex portion in the X axis direction, with respect to the diffractive optical elements A1, A2 and A3 shown in FIGS. 9(a), 9(b) and 9(b), respectively. Specifically, the histogram of the X axial length of the convex portion is obtained by scanning and measuring the X axial length of the region displayed as black, and the histogram of the concave portion in the X axial length is obtained by scanning and measuring the X axial length of the region displayed as gray, respectively, in FIGS. 9(a), 9(b) and 9(c).

As a result, in a case where the wavelength λ of light flux incident onto each diffractive optical element is 0.75 μm, that is, in order to obtain $\mu(d_1)$ and $\mu(d_2)$, a range where the length $d_i$ can be obtained is set to a range of λ/8 to λ6, that is, a range of 0.094 μm to 4.5 μm. At this time, the value of D in the diffractive optical element A1 is 0.555, the value of D in the diffractive optical element A2 is 0.473, and the value of D in the diffractive optical element A3 is 0.435.

Figure 11:
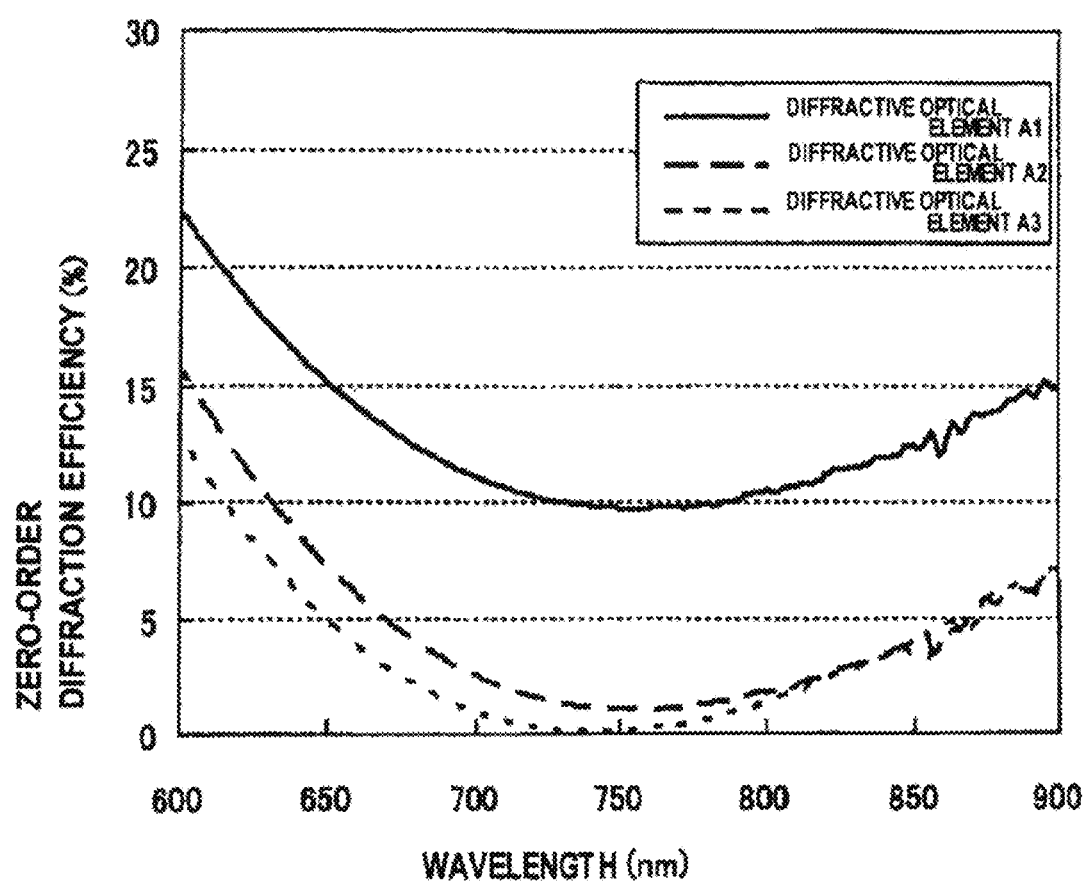
FIG. 11 is a diagram illustrating the relationship between wavelengths and diffraction efficiencies in the diffractive optical elements A1, A2 and A3.

FIG. 11 shows a result obtained by measuring wavelength dependency of diffraction efficiency of a zero-order diffracted light beam (hereinafter, referred to as "zero-order diffraction efficiency") in the diffractive optical elements A1, A2 and A3 using a spectroscope. Here, in the diffractive optical element A1, the zero-order diffraction efficiency is the lowest value at a wavelength of 0.760 μm. At this time, the zero-order diffraction efficiency is 9.7%, and the diffraction angle range in the X direction is 24.6°. Further, in the diffractive optical element A2, the zero-order diffraction efficiency is the lowest value at a wavelength of 0.755 μm. At this time, the zero-order diffraction efficiency is 1.1%, and the diffraction angle range in the X direction is 24.4°. Further, in the diffractive optical element A3, the zero-order diffraction efficiency is the lowest value in a wavelength of 0.740 μm. At this time, the zero-order diffraction efficiency is 0.1%, and the diffraction angle range in the X direction is 23.9°.

(Example 2 of Diffractive Optical Element)

Next, diffractive optical elements B1 and B2 to be illustrated are diffractive optical elements of two steps, capable of generating light spots of 4×3 points that are regularly arranged. The diffractive optical element is formed by using a quartz substrate as a substrate, and a pattern thereof is formed on the basis of the same manufacturing method as that of Example 1.

In the diffractive optical elements B1 and B2, basic units are formed as a region having a pitch Px=Py=12.8 μm, and the basic units are arranged in parallel in the range of 4.5 mm×4.5 mm. The order (m, n) of diffraction generated in each diffractive optical element corresponds to m=−3, −1, 1 and 3 in the X direction and n=−2, 0 and 2 in the Y direction. Further, in the diffractive optical elements B1 and B2, the height of the convex portion is 0.91 μm.

Figure 12:
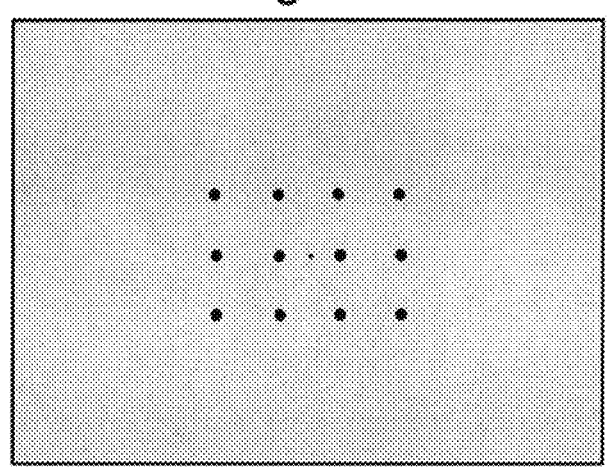
FIG. 12 is a diagram illustrating light spots generated by diffracted light of a diffractive optical element B1.

Further, FIG. 12 shows that light spots generated by diffracted light are displayed as black in a case where light flux having a wavelength of 0.66 μm is incident, in the diffractive optical element 81. The diffractive optical element B1 that provides such light spots may be designed by the repetitive Fourier transform or the like.

Figure 13:
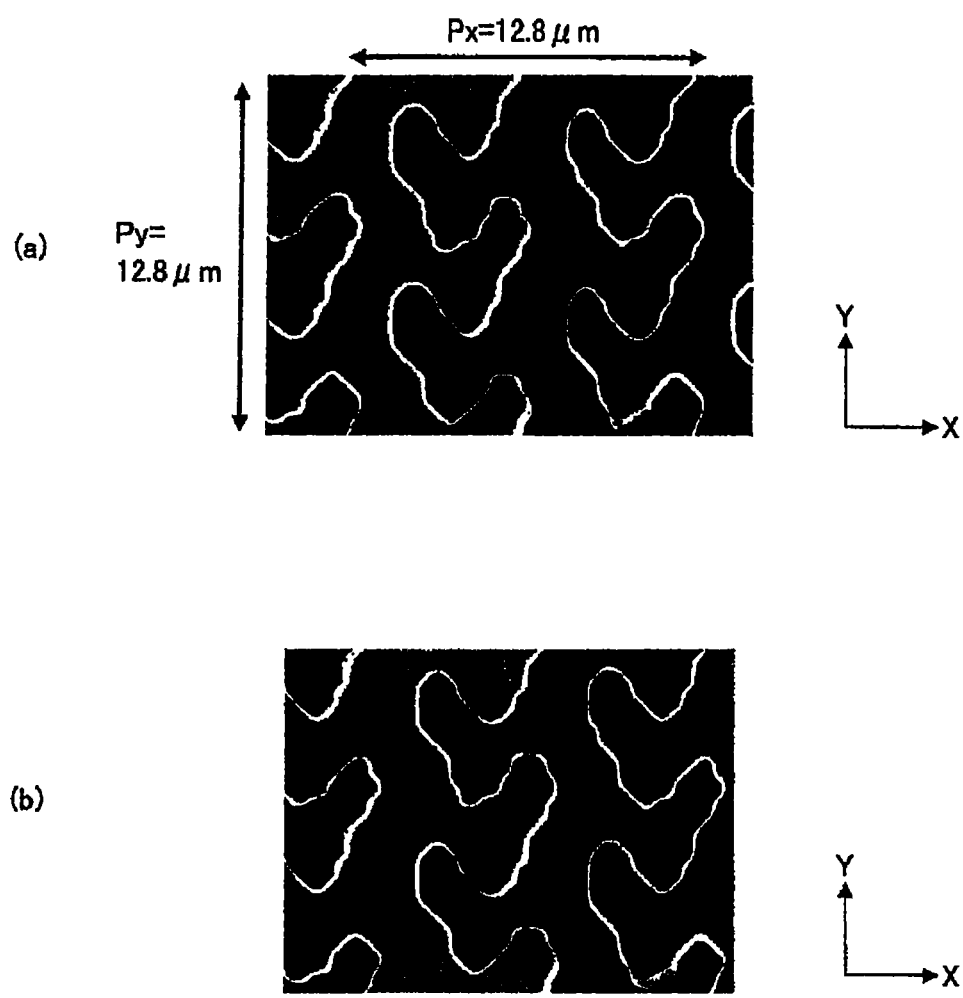
FIG. 13 is a diagram schematically illustrating concave portions and convex portions on the surfaces of diffractive optical elements B1 and B2.

Further, FIG. 13 shows that convex portions are displayed as black, concave portions are displayed as gray, and tapered portions of boundary portions between the concave portions and the convex portions are displayed as white, with respect to SEM images observed in the diffractive optical elements B1 and B2. Specifically, FIG. 13(a) shows the case of the diffractive optical element B1, and FIG. 13(b) shows the case of the diffractive optical element B2.

Further, FIG. 14 shows histograms illustrating the lengths of a concave portion and a convex portion in the X axis direction, with respect to the diffractive optical elements B1 and B2. Specifically, FIG. 14(a) is the histogram of the diffractive optical element B1, and FIG. 14(b) is the histogram of the diffractive optical element B2.

As a result, in a case where the wavelength λ of light flux incident onto each diffractive optical element is 0.790 μm, that is, in order to obtain $\mu(d_1)$ and $\mu(d_2)$, a range where the length $d_i$ can be obtained is set to a range of λ/8 to λ6, that is, a range of 0.098 μm to 4.74 μm. At this time, the value of D in the diffractive optical element B1 is 0.492, and the value of D in the diffractive optical element B2 is 0.467.

Figure 15:
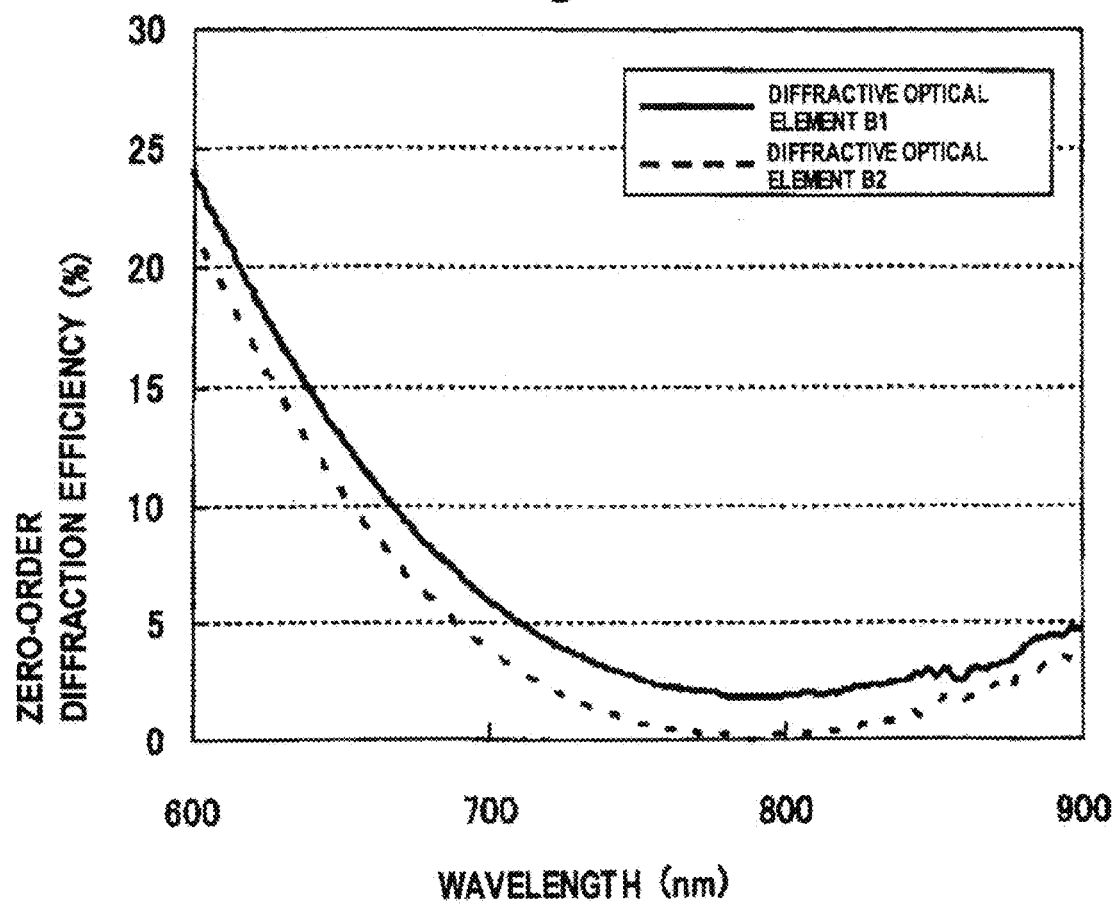
FIG. 15 is a diagram illustrating the relationship between wavelengths and diffraction efficiencies in the diffractive optical elements B1 and B2.

FIG. 15 shows a result obtained by measuring wavelength dependency of the zero-order diffraction efficiency in the diffractive optical elements B1 and B2 using a spectroscope. In the diffractive optical element B1, the zero-order diffraction efficiency is the lowest value at a wavelength of 0.790 μm. At this time, the zero-order diffraction efficiency is 1.9%, and the diffraction angle range in the X direction is 12.9°. Further, in the diffractive optical element B2, the diffraction efficiency of the zero-order diffracted light beam is the lowest value at a wavelength of 0.790 μm. At this time, the zero-order diffraction efficiency is 0.0%, and the diffraction angle range in the X direction is 12.9°.

(Example 3 of Diffractive Optical Element)

Next, diffractive optical elements C1, C2 and C3 to be illustrated are diffractive optical elements of two steps, capable of generating light spots of 2×2 points that are regularly arranged. The diffractive optical element is formed by using a quartz substrate as a substrate, and a pattern thereof is formed on the basis of the same manufacturing method as that of Example 1.

In the diffractive optical elements C1, C2 and C3, basic units are formed as a region having a pitch of Px=3.2 μm and Py=4.27 μm, and the basic units are arranged in parallel in the range of 4.5 mm×4.5 mm. The order (m, n) of diffraction generated in each diffractive optical elements corresponds to m=−1 and 1 in the X direction and n=−1 and 1 in the Y direction. The diffractive optical element C1 is a diffractive optical element of two steps in which the height of the convex portion is 0.91 μm. In the diffractive optical elements C2 and C3, the height of the convex portion is 0.96 μm.

Figure 16:
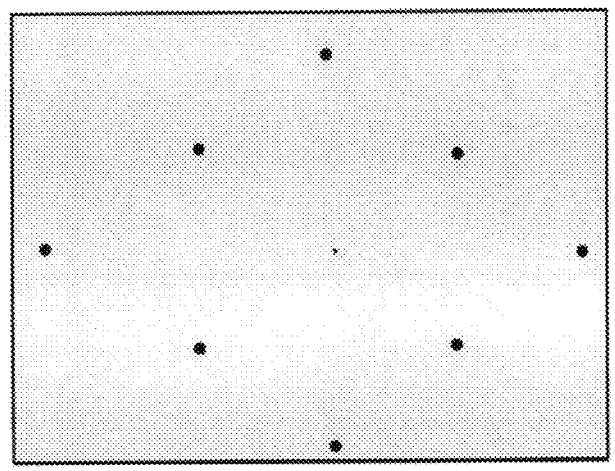
FIG. 16 is a diagram illustrating light spots generated by diffracted light of a diffractive optical element C3.

Further, FIG. 16 shows that light spots are displayed as black in a case where light flux having a wavelength of 0.66 μm is incident, in the diffractive optical element C3. The diffractive optical element C3 that provides such light spots may be designed by the repetitive Fourier transform or the like.

Further, FIG. 17 shows that convex portions are displayed as black, concave portions are displayed as gray, and tapered portions of boundary portions between the concave portions and the convex portions are displayed as white, with respect to SEM images observed in the diffractive optical elements C1, C2 and C3. Specifically, FIG. 17(a) shows the case of the diffractive optical element C1, FIG. 17(b) shows the case of the diffractive optical element C2, and FIG. 17(c) shows the case of the diffractive optical element C3.

Figure 18:
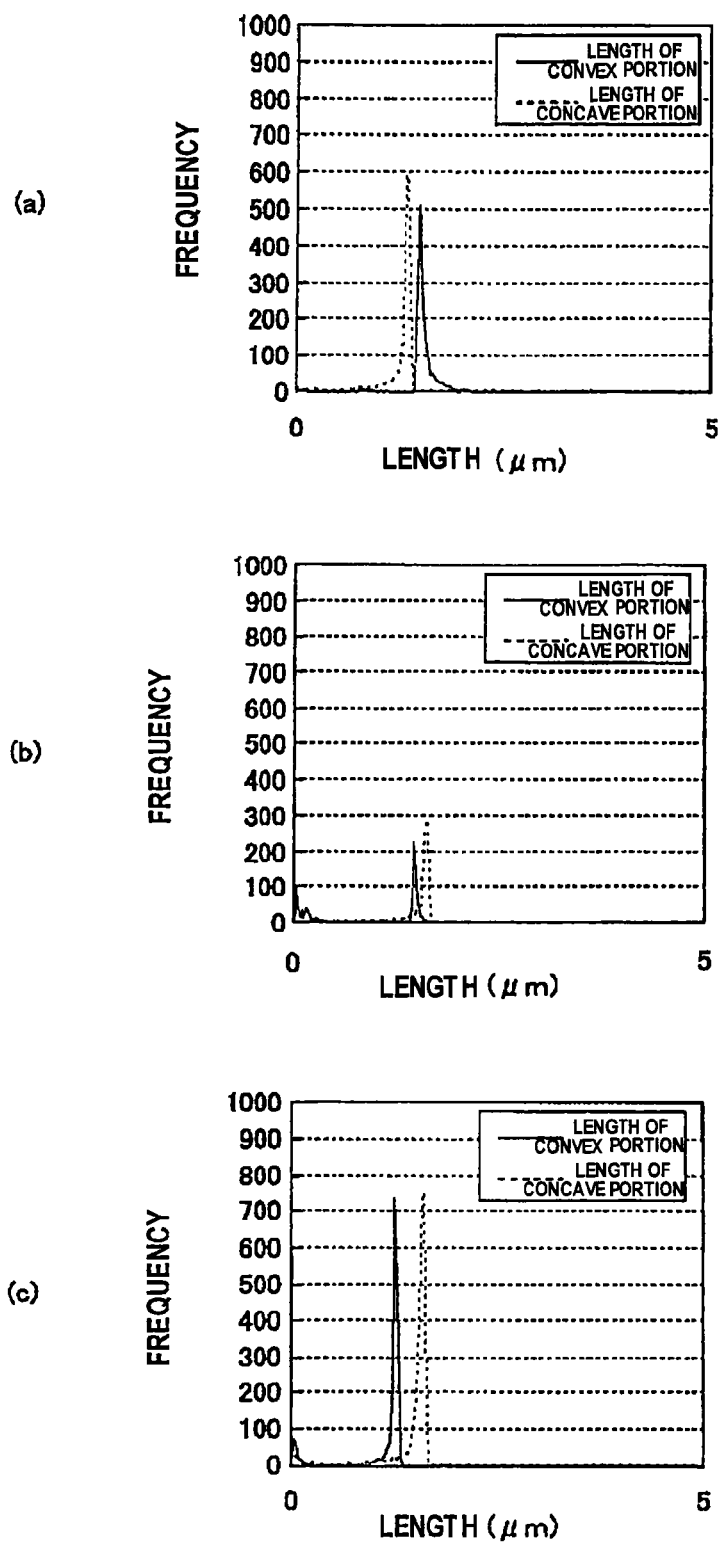
FIG. 18 is a histogram illustrating the lengths of the concave portions and the convex portions in the diffractive optical elements C1, C2 and C3.

Further, FIG. 18 shows histograms illustrating the lengths of a concave portion and a convex portion in the X axis direction, with respect to the diffractive optical elements C1, C2 and C3. Specifically, FIG. 18(a) is the histogram of the diffractive optical element C1, FIG. 18(b) is the histogram of the diffractive optical element C2, and FIG. 18(c) is the histogram of the diffractive optical element C3.

As a result, in a case where the wavelength λ of light flux incident onto each diffractive optical element is 0.76 μm, that is, in order to obtain $\mu(d_1)$ and $\mu(d_2)$, a range where the length $d_i$ can be obtained is set to a range of λ/8 to λ6, that is, a range of 0.095 μm to 4.56 μm. At this time, the value of D in the diffractive optical element C1 is 0.547, the value of D in the diffractive optical element C2 is 0.475, and the value of D in the diffractive optical element C3 is 0.45.

Figure 19:
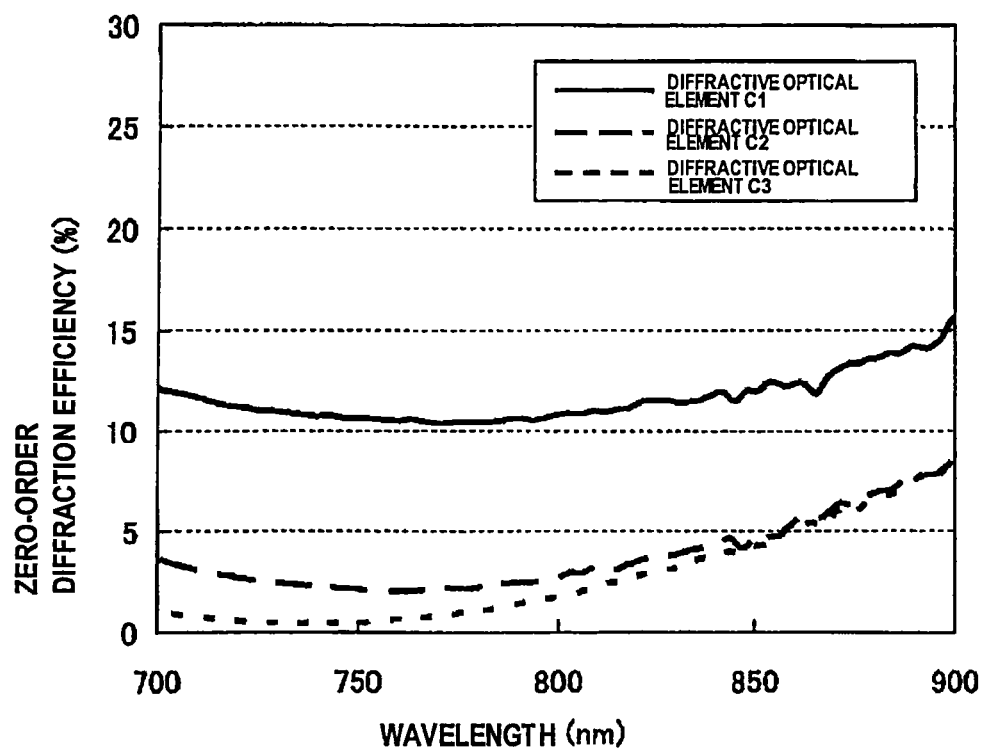
FIG. 19 is a diagram illustrating the relationship between wavelengths and diffraction efficiencies in the diffractive optical elements C1, C2 and C3.

FIG. 19 shows a result obtained by measuring wavelength dependency of the zero-order diffraction efficiency in the diffractive optical elements C1, C2 and C3 using a spectroscope. Here, in the diffractive optical element C1, the zero-order diffraction efficiency is the lowest value at a wavelength of 0.775 μm. At this time, the zero-order diffraction efficiency is 10.5%, and the diffraction angle range in the X direction is 17.6°. Further, in the diffractive optical element C2, the zero-order diffraction efficiency is the lowest value at a wavelength of 0.760 μm. At this time, the zero-order diffraction efficiency is 2.04%, and the diffraction angle range in the X direction is 17.3°. Further, in the diffractive optical element C3, the zero-order diffraction efficiency is the lowest value at a wavelength of 0.740 μm. At this time, the zero-order diffraction efficiency is 0.5%, and the diffraction angle range in the X direction is 16.8°.

(Example 4 of Diffractive Optical Element)

Next, diffractive optical elements D1, D2 and D3 to be illustrated are one-dimensional diffractive optical elements in which the diffraction direction is one-dimensional, and are diffractive optical elements of two steps, capable of generating light spots of 8 points that are regularly arranged. Similarly, examples 5 and 6 to be described later relate to one-dimensional diffractive optical elements, but may be developed to a basic unit patterns that diffracts in two dimensions on the basis of a basic unit pattern with respect to the one-dimensional diffraction direction. That is, by calculating the zero-order diffraction efficiency and diffraction angle range in the basic unit pattern of the diffractive optical element that achieves the one-dimensional diffraction, it is possible to obtain an index for designing the basic units having concave portions and convex portions in two dimensions. Thus, it is important to evaluate the zero-order diffraction efficiency and the value of the diffraction angle range obtained by the one-dimensional diffractive optical element. Further, the diffractive optical element is also formed by using a quartz substrate as a substrate, and a pattern thereof is formed on the basis of the same manufacturing method as that of Example 1.

In the diffractive optical elements D1, D2 and D3, basic units are formed to have a pitch Px=12.8 μm, and the basic units are arranged in parallel in the range of 4.5 mm×4.5 mm. The order m of diffraction generated in each diffractive optical element corresponds to m=−7, −5, −3, −1, 1, 3, 5 and 7 in the X direction. The diffractive optical element D1 is a diffractive optical element of two steps in which the height of the convex portion is 0.91 μm. In the diffractive optical elements D2 and D3, the height of the convex portion is 0.96 μm.

Figure 20:
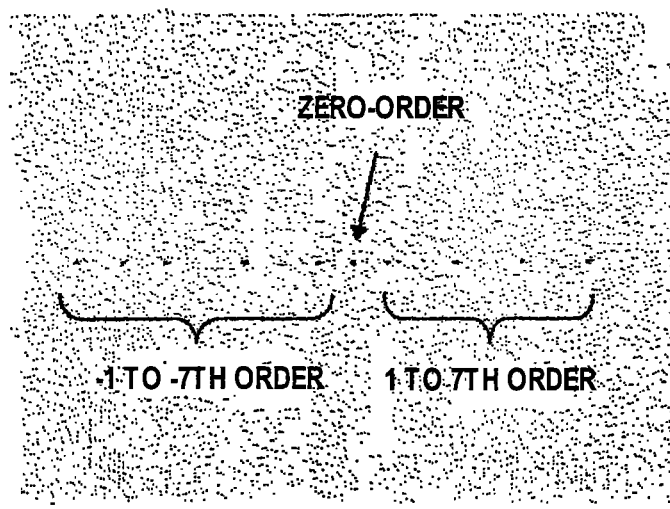
FIG. 20 is a diagram illustrating light spots generated by diffracted light from a diffractive optical element D1.

Here, FIG. 20 shows that light spots are displayed as black in a case where light flux having a wavelength of 0.66 μm is incident, in the diffractive optical element D1. The diffractive optical element D1 that provides such light spots may be designed by the repetitive Fourier transform or the like.

Figure 21:
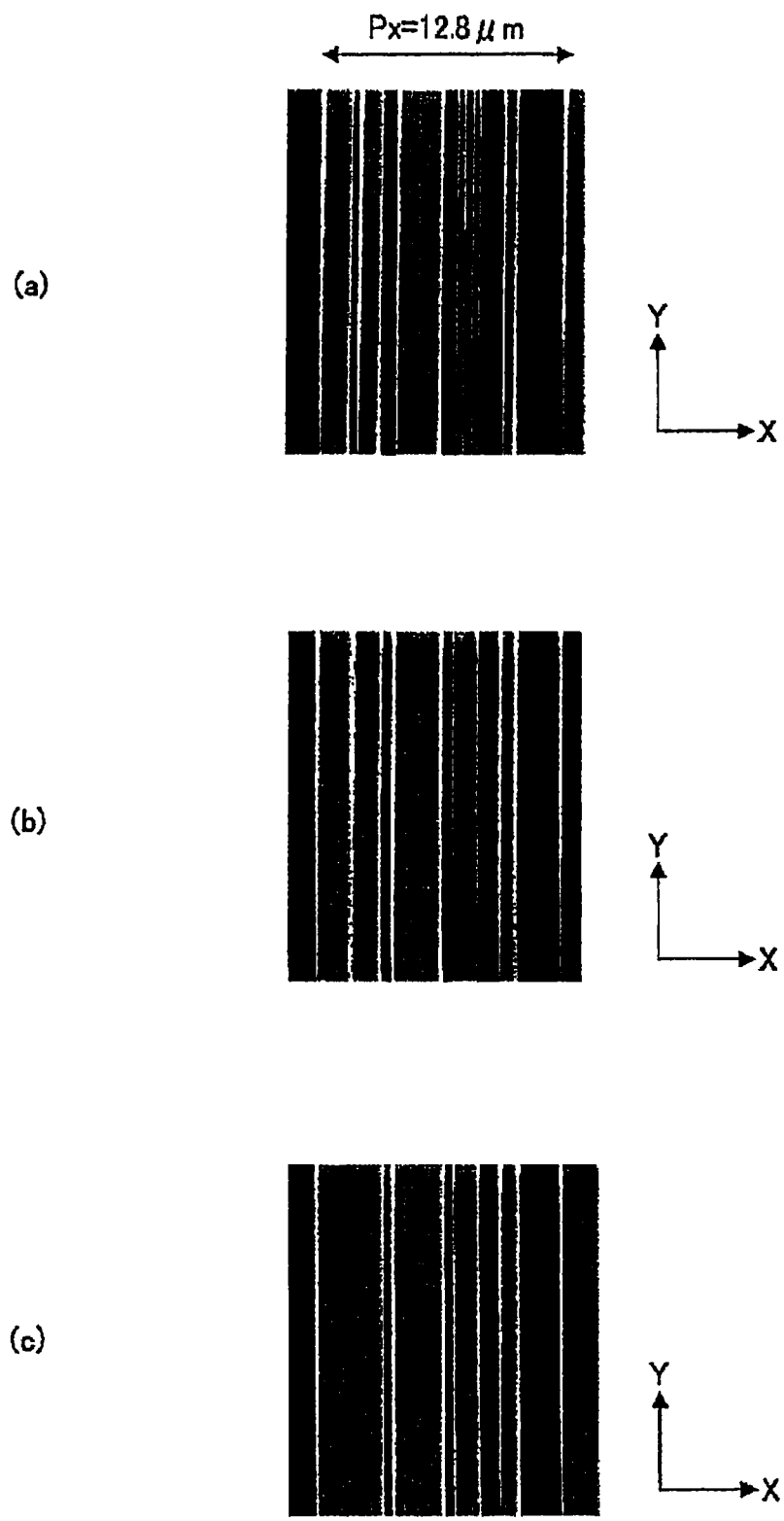
FIG. 21 is a diagram schematically illustrating concave portions and convex portions on the surfaces of diffractive optical elements D1, D2 and D3.

Further, FIG. 21 shows that convex portions are displayed as black, concave portions are displayed as gray, and tapered portions of boundary portions between the concave portions and the convex portions are displayed as white, with respect to SEM images observed in the diffractive optical elements D1, D2 and D3. Specifically, FIG. 21(a) shows the case of the diffractive optical element D1, FIG. 21(b) shows the case of the diffractive optical element D2, and FIG. 21(c) shows the case of the diffractive optical element D3.

Figure 22:
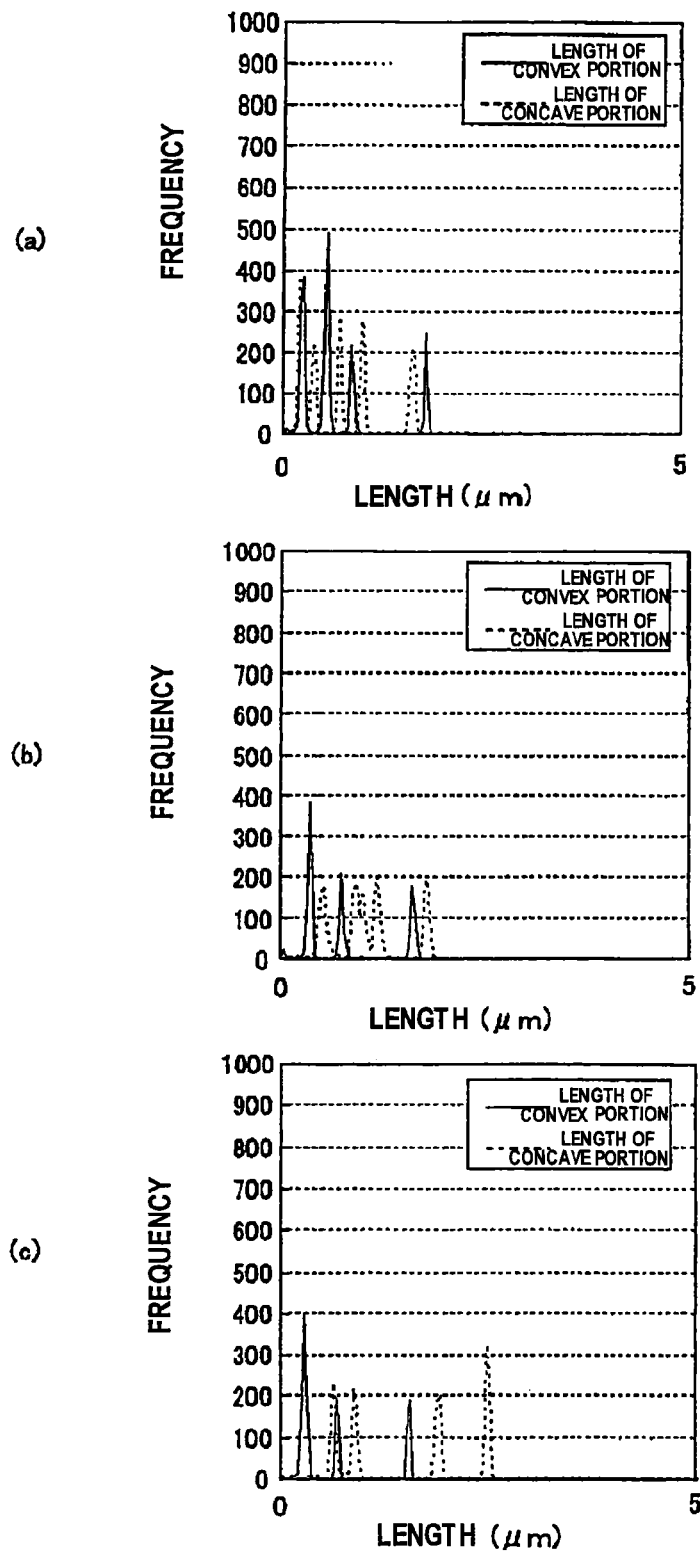
FIG. 22 is a histogram illustrating the lengths of the concave portions and the convex portions in the diffractive optical elements D1, D2 and D3.

Further, FIG. 22 shows histograms illustrating the lengths of a concave portion and a convex portion in the X axis direction, with respect to the diffractive optical elements D1, D2 and D3. Specifically, FIG. 22(a) is the histogram of the diffractive optical element D1, FIG. 22(b) is the histogram of the diffractive optical element D2, and FIG. 22(c) is the histogram of the diffractive optical element D3.

As a result, in a case where the wavelength λ of light flux incident onto each diffractive optical element is 0.78 μm, that is, in order to obtain $\mu(d_1)$ and $\mu(d_2)$, a range where the length $d_i$ can be obtained is set to a range of λ/8 to λ6, that is, a range of 0.098 μm to 4.68 μm. At this time, the value of D in the diffractive optical element D1 is 0.5, the value of D in the diffractive optical element D2 is 0.419, and the value of D in the diffractive optical element D3 is 0.326.

Figure 23:
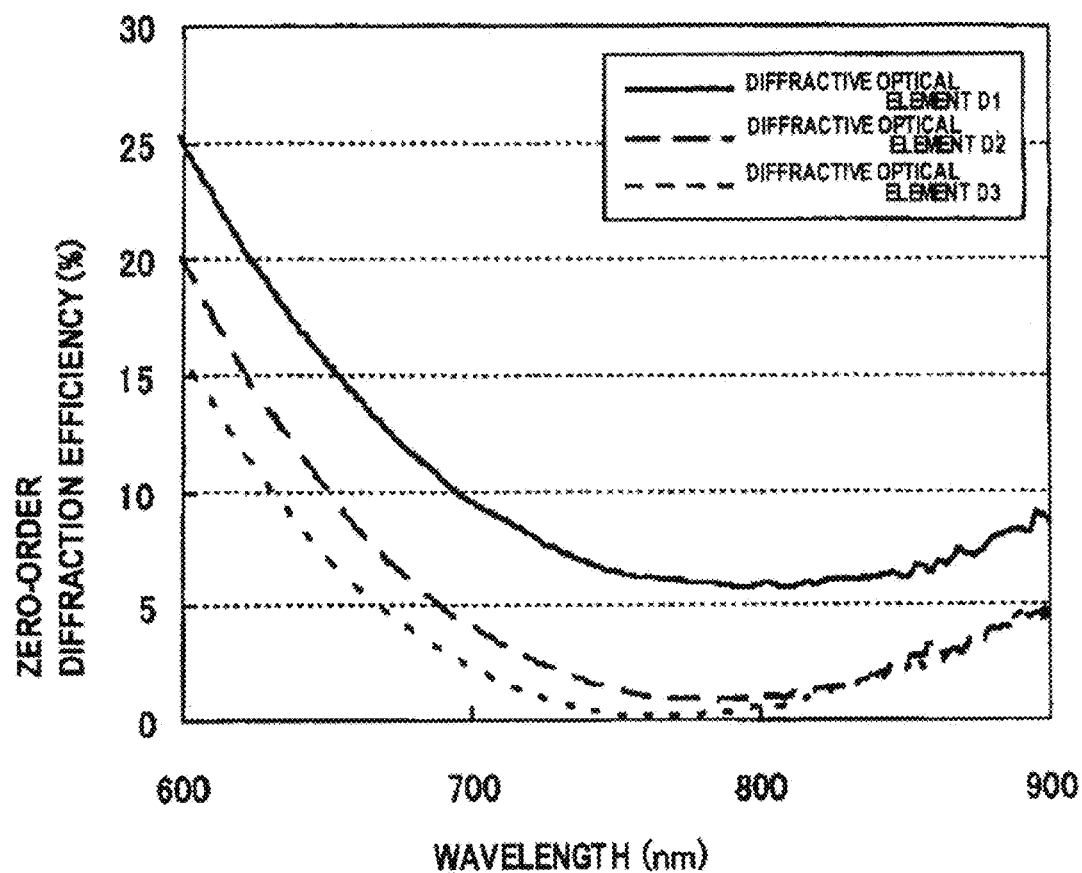
FIG. 23 is a diagram illustrating the relationship between wavelengths and diffraction efficiencies in the diffractive optical elements D1, D2 and D3.

FIG. 23 shows a result obtained by measuring wavelength dependency of the zero-order diffraction efficiency in the diffractive optical elements D1, D2 and D3 using a spectroscope. Here, in the diffractive optical element D1, the diffraction efficiency of the zero-order diffracted light beam is the lowest value at a wavelength of 0.800 μm. At this time, the zero-order diffraction efficiency is 6.1%, and the diffraction angle range in the X direction is 25.9°. Further, in the diffractive optical element D2, the diffraction efficiency of the zero-order diffracted light beam is the lowest value at a wavelength of 0.785 μm. At this time, the zero-order diffraction efficiency is 0.9%, and the diffraction angle range in the X direction is 25.4°. Further, in the diffractive optical element D3, the diffraction efficiency of the zero-order diffracted light beam is the lowest value at a wavelength of 0.765 μm. At this time, the zero-order diffraction efficiency is 0.2%, and the diffraction angle range in the X direction is 24.7°.

(Example 5 of Diffractive Optical Element)

Next, diffractive optical elements E1 and E2 to be illustrated are also one-dimensional diffractive optical elements, and are diffractive optical elements of two steps, capable of generating light spots of 8 points that are regularly arranged. The diffractive optical element is formed by using a quartz substrate as a substrate, and a pattern thereof is formed on the basis of the same manufacturing method as that of Example 1.

In the diffractive optical elements E1 and E2, basic units are formed to have a pitch Px=19.2 μm, and the basic units are arranged in parallel in the range of 4.5 mm×4.5 mm. The order m of diffraction generated in each diffractive optical element corresponds to m=−7, −5, −3, −1, 1, 3, 5 and 7 in the X direction. Further, the diffractive optical element E1 is a diffractive optical element of two steps in which the height of the convex portion is 0.91 μm. In the diffractive optical element E2, the height of the convex portion is 0.96 μm.

Figure 24:
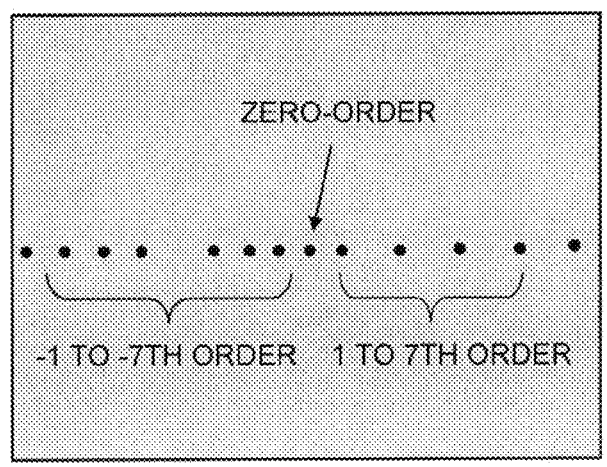
FIG. 24 is a diagram illustrating light spots generated by diffracted light from a diffractive optical element E2.

Here, FIG. 24 shows that light spots are displayed as black in a case where light flux having a wavelength of 0.66 μm is incident, in the diffractive optical element E2. The diffractive optical element E2 that provides such light spots may be designed by the repetitive Fourier transform or the like.

Figure 25:
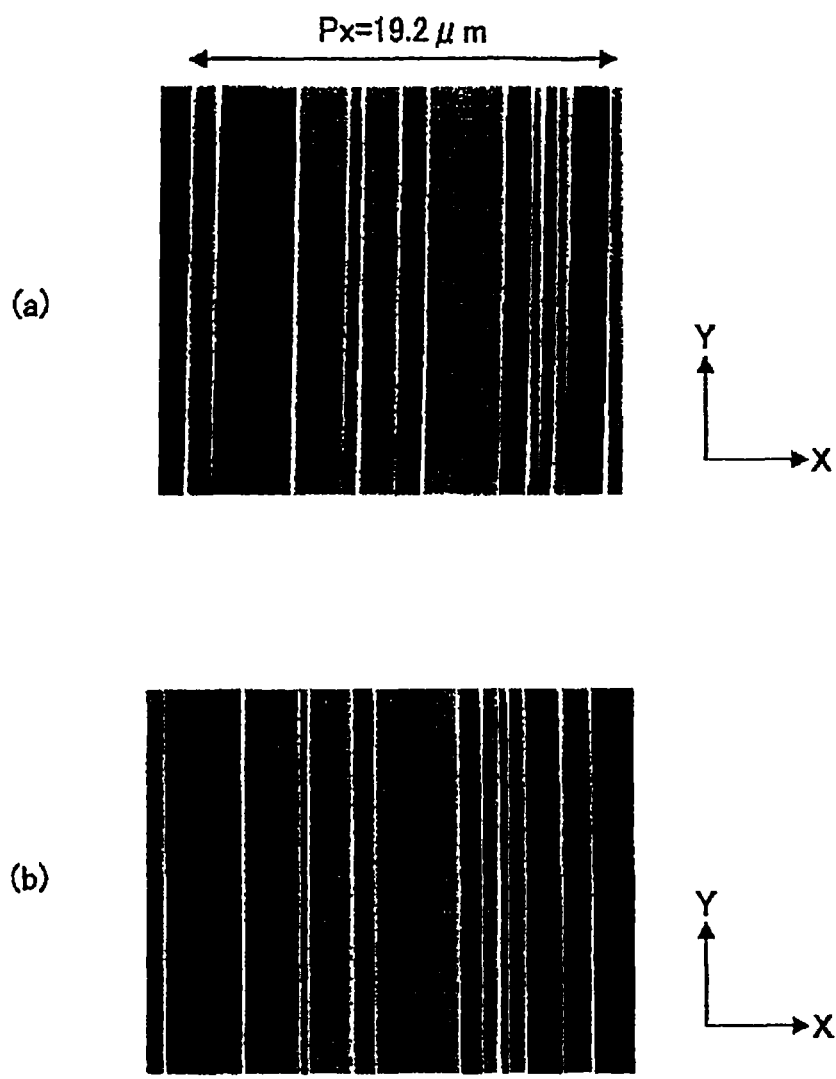
FIG. 25 is a diagram schematically illustrating concave portions and convex portions on the surfaces of diffractive optical elements E1 and E2.

Further, FIGS. 25A and 25B show that convex portions are displayed as black, concave portions are displayed as gray, and tapered portions of boundary portions between the concave portions and the convex portions are displayed as white, with respect to SEM images observed in the diffractive optical elements E1 and E2. Specifically, FIG. 25(a) shows the case of the diffractive optical element E1, and FIG. 25(b) shows the case of the diffractive optical element E2.

Further, FIG. 26 shows histograms illustrating the lengths of a concave portion and a convex portion in the X axis direction, with respect to the diffractive optical elements E1 and E2. Specifically, FIG. 26(a) is the histogram of the diffractive optical element E1, and FIG. 26(b) is the histogram of the diffractive optical element E2.

As a result, in a case where the wavelength λ of light flux incident onto each diffractive optical element is 0.8 μm, that is, in order to obtain $\mu(d_1)$ and $\mu(d_2)$, a range where the length $d_i$ can be obtained is set to a range of λ/8 to λ6, that is, a range of 0.1 μm to 4.8 μm. At this time, the value of D in the diffractive optical element E1 is 0.487, and the value of D in the diffractive optical element E2 is 0.419.

Figure 27:
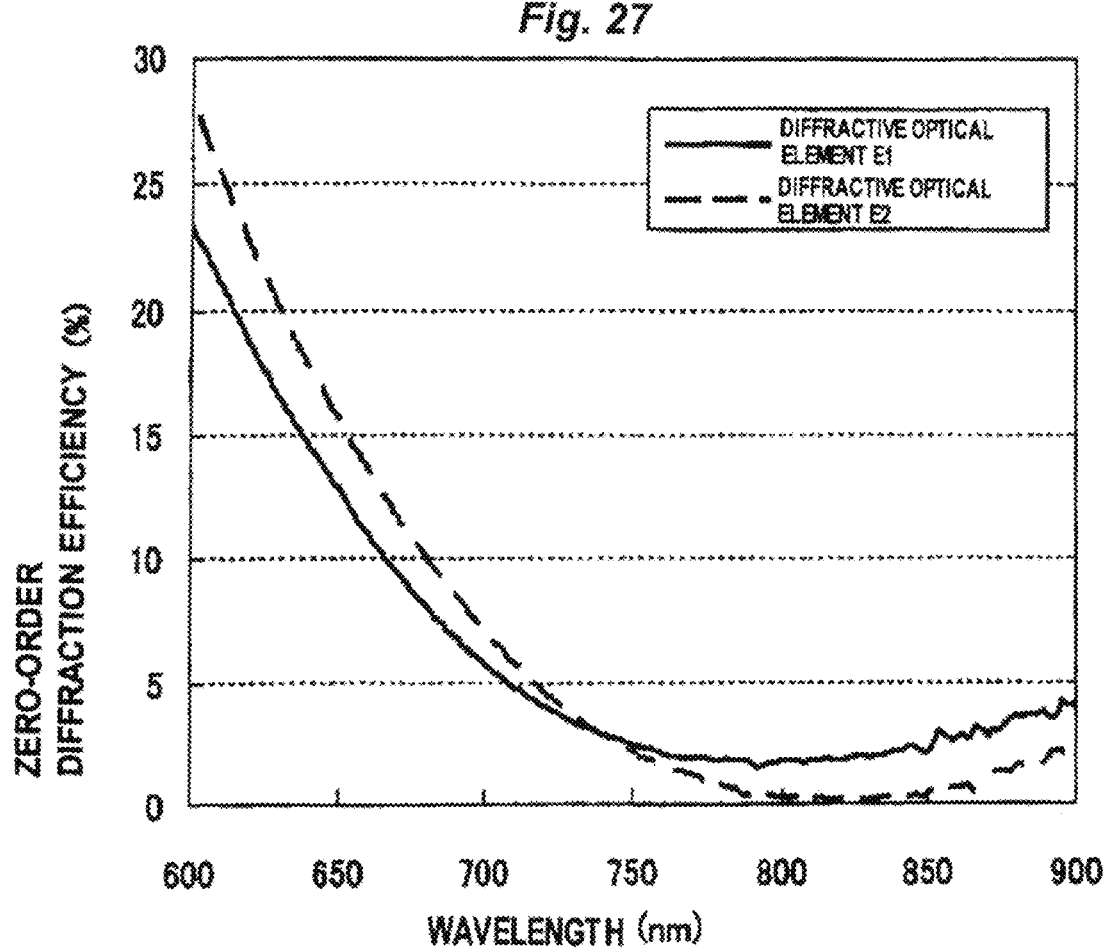
FIG. 27 is a diagram illustrating the relationship between wavelengths and diffraction efficiencies in the diffractive optical elements E1 and E2.

FIG. 27 shows a result obtained by measuring wavelength dependency of the zero-order diffraction efficiency in the diffractive optical elements E1 and E2 using a spectroscope. Here, in the diffractive optical element E1, the zero-order diffraction efficiency is the lowest value at a wavelength of 0.790 μm. At this time, the zero-order diffraction efficiency is 1.8%, and the diffraction angle range in the X direction is 16.7°. Further, in the diffractive optical element E2, the zero-order diffraction efficiency is the lowest value at a wavelength of 0.820 μm. At this time, the zero-order diffraction efficiency is 0.2%, and the diffraction angle range in the X direction is 17.4°.

(Example 6 of Diffractive Optical Element)

Next, diffractive optical elements F1 and F2 to be illustrated are also one-dimensional diffractive optical elements, and are diffractive optical elements of two steps, capable of generating light spots of 8 points that are regularly arranged. The diffractive optical element is formed by using a quartz substrate as a substrate, and a pattern thereof is formed on the basis of the same manufacturing method as that of Example 1.

In the diffractive optical elements F1 and F2, basic units are formed to have a pitch Px=32 μm, and the basic units are arranged in parallel in the range of 4.5 mm×4.5 mm. The order m of diffraction generated in each diffractive optical element corresponds to m=−7, −5, −3, −1, 1, 3, 5 and 7 in the X direction. The diffractive optical element F1 is a diffractive optical element of two steps in which the height of the convex portion is 0.91 μm. In the diffractive optical element F2, the height of the convex portion is 0.96 μm.

Figure 28:
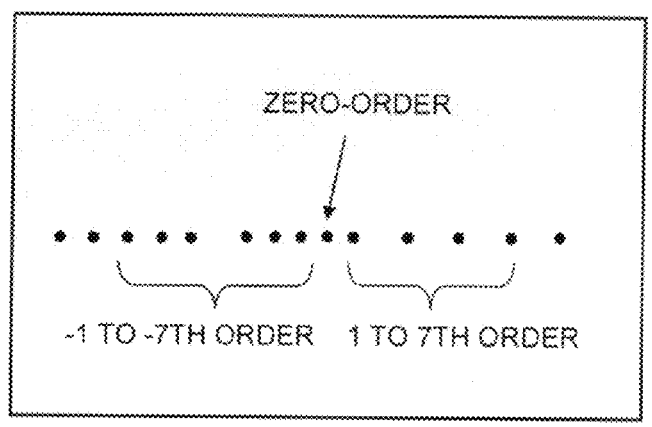
FIG. 28 is a diagram illustrating light spots generated by diffracted light from a diffractive optical element F1.

Here, FIG. 28 shows that light spots are displayed as black in a case where light flux having a wavelength of 0.66 μm is incident, in the diffractive optical element F1. The diffractive optical element F1 that provides such light spots may be designed by the repetitive Fourier transform or the like.

Further, FIG. 29 shows that convex portions are displayed as black, concave portions are displayed as gray, and tapered portions of boundary portions between the concave portions and the convex portions are displayed as white, with respect to SEM images observed in the diffractive optical elements F1 and F2. Specifically, FIG. 29(a) shows the case of the diffractive optical element F1, and FIG. 29(b) shows the case of the diffractive optical element F2.

Further, FIG. 30 shows histograms illustrating the lengths of a concave portion and a convex portion in the X axis direction, with respect to the diffractive optical elements F1 and F2. Specifically, FIG. 30(a) is the histogram of the diffractive optical element F1, and FIG. 30(b) is the histogram of the diffractive optical element F2.

As a result, in a case where the wavelength λ of light flux incident onto each diffractive optical element is 0.8 μm that is, in order to obtain $\mu(d_1)$ and $\mu(d_2)$, a range where the length $d_1$ can be obtained is set to a range of λ/8 to λ6, that is, a range of 0.1 μm to 4.8 μm. At this time, the value of D in the diffractive optical element F1 is 0.485, and the value of D in the diffractive optical element F2 is 0.475.

Figure 31:
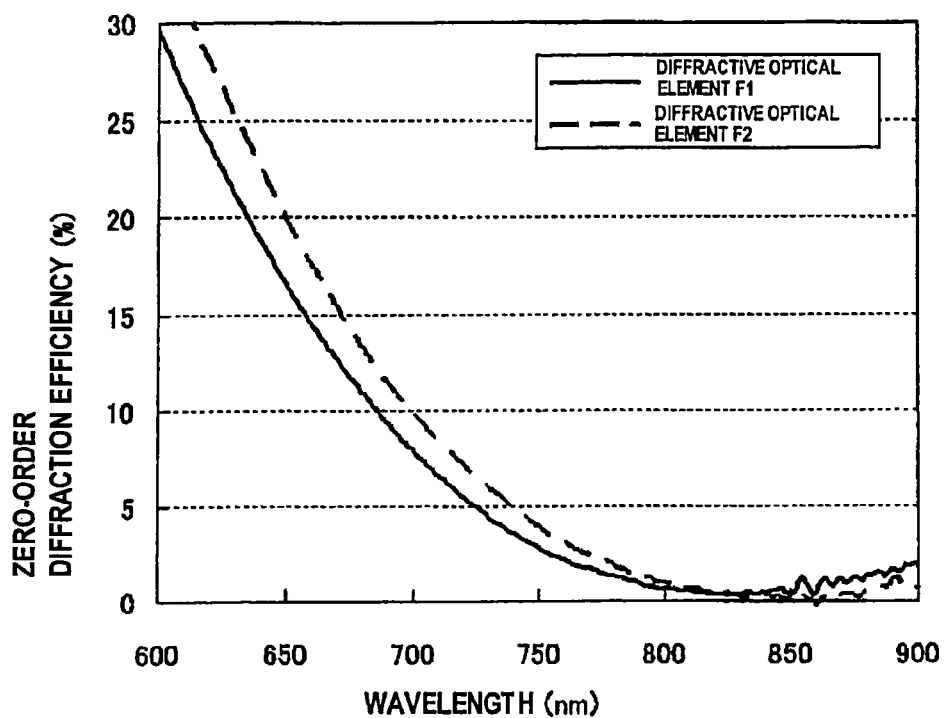
FIG. 31 is a diagram illustrating the relationship between wavelengths and diffraction efficiencies in the diffractive optical elements F1 and F2.

FIG. 31 shows a result obtained by measuring wavelength dependency of the zero-order diffraction efficiency in the diffractive optical elements F1 and F2 using a spectroscope. Here, in the diffractive optical element F1, the zero-order diffraction efficiency is the lowest value at a wavelength of 0.820 μm. At this time, the zero-order diffraction efficiency is 0.4%, and the diffraction angle range in the X direction is 10.3°. Further, in the diffractive optical element F2, the zero-order diffraction efficiency is the lowest value at a wavelength of 0.840 μm. At this time, the zero-order diffraction efficiency is 0.2%, and the diffraction angle range in the X direction is 10.6°.

(Example 7 of Diffractive Optical Element)

Next, diffractive optical elements G1, G2 and G3 to be illustrated are diffractive optical elements of eight steps (diffractive optical elements of three or more steps), capable of generating light spots of 8×6 points that are regularly arranged. The diffractive optical element is formed by using a quartz substrate as a substrate, coating a photoresist on the surface of the substrate, performing exposure and development using an exposure device to form a resist pattern, and by etching the surface of the substrate in a region where the resist pattern is not formed by RIE or the like. Then, the resist pattern is removed. By repeating this process, it is possible to form a diffractive optical element of eight steps in which the step difference in each step is 0.18 μm.

In the diffractive optical elements G1, G2 and G3, basic units are formed as a region having a pitch Px=Py=64 μm, and the basic units are arranged in parallel in the range of 4.5 mm×4.5 mm. The order (m, n) of diffraction generated in each diffractive optical element corresponds to m=−35, −25, −15, −5, 5, 15, 25 and 35 in the X direction, and n=−25, −15, −5, 5, 15 and 25 in the Y direction.

Figure 33:
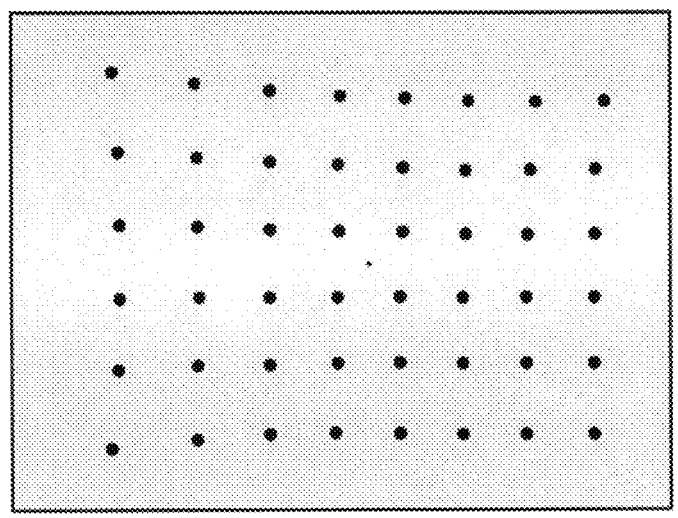
FIG. 33 is a diagram illustrating light spots generated by diffracted light from a diffractive optical element G1.

Here, FIG. 33 shows that light spots are displayed as black in a case where light flux having a wavelength of 0.66 μm is incident, in the diffractive optical element G1. The diffractive optical element G1 that provides such light spots may be designed by the repetitive Fourier transform or the like.

Further, FIG. 34 shows SEM images of planar structures in basic units with respect to the diffractive optical elements G1, G2 and G3. Specifically, FIG. 34(a) shows an SEM image of a planar structure in basic units of the diffractive optical element G1, FIG. 34(b) shows an SEM image of a planar structure in basic units of the diffractive optical element G2, and FIG. 34(c) shows an SEM image of a planar structure in basic units of the diffractive optical element G3.

Further, FIG. 35 shows that the portions of the fifth and higher steps among the eight steps (portions of which the height is 4/7 or higher) are considered as convex portions and are displayed as black, and the portions of the fourth and lower steps (portions of which the height is 3/7 or lower) are considered as concave portions and are displayed as gray, and boundary portions between the concave portions and the convex portions are displayed as white, with respect to the SEM images observed in the diffractive optical elements G1, G2 and G3. Specifically, FIG. 35(a) shows the case of the diffractive optical element G1, FIG. 35(b) shows the case of the diffractive optical element G2, and FIG. 35(c) shows the case of the diffractive optical element G3.

Figure 36:
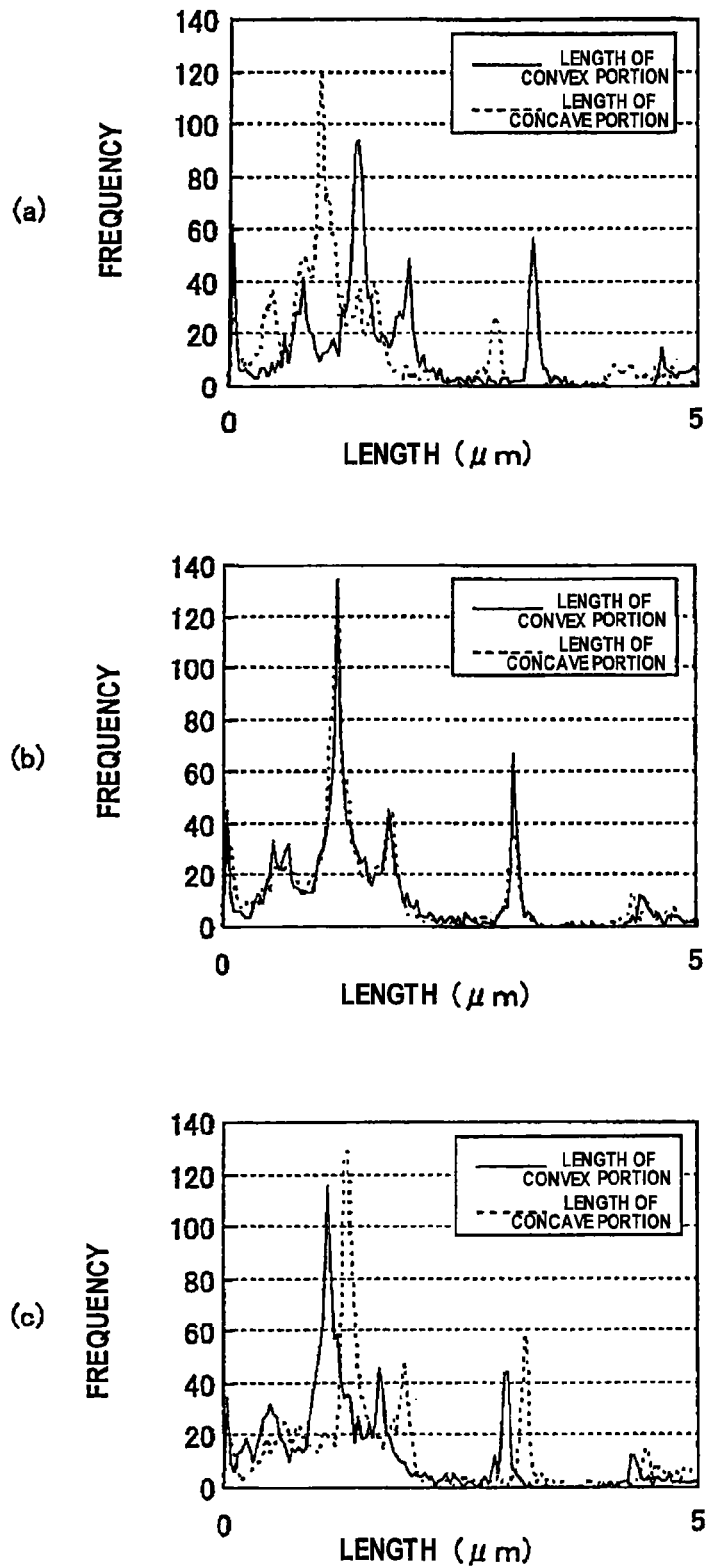
FIG. 36 is a histogram illustrating the lengths of the concave portions and the convex portions in the diffractive optical elements G1, G2 and G3.

Further, FIG. 36 shows histograms illustrating the lengths of a concave portion and a convex portion in the X axis direction, with respect to the diffractive optical elements G1, G2 and G3. Specifically, FIG. 36(a) is the histogram of the diffractive optical element G1, FIG. 36(b) is the histogram of the diffractive optical element G2, and FIG. 36(c) is the histogram of the diffractive optical element G3.

As a result, in a case where the wavelength λ of light flux incident onto each diffractive optical element is 0.64 μm, that is, in order to obtain $μ(d_1)$ and $μ(d_2)$, a range where the length $d_i$ can be obtained is set to a range of λ/8 to λ6, that is, a range of 0.08 μm to 3.84 μm. At this time, the value of D in the diffractive optical element G1 is 0.572, the value of D in the diffractive optical element G2 is 0.503, and the value of D in the diffractive optical element G3 is 0.463.

Figure 37:
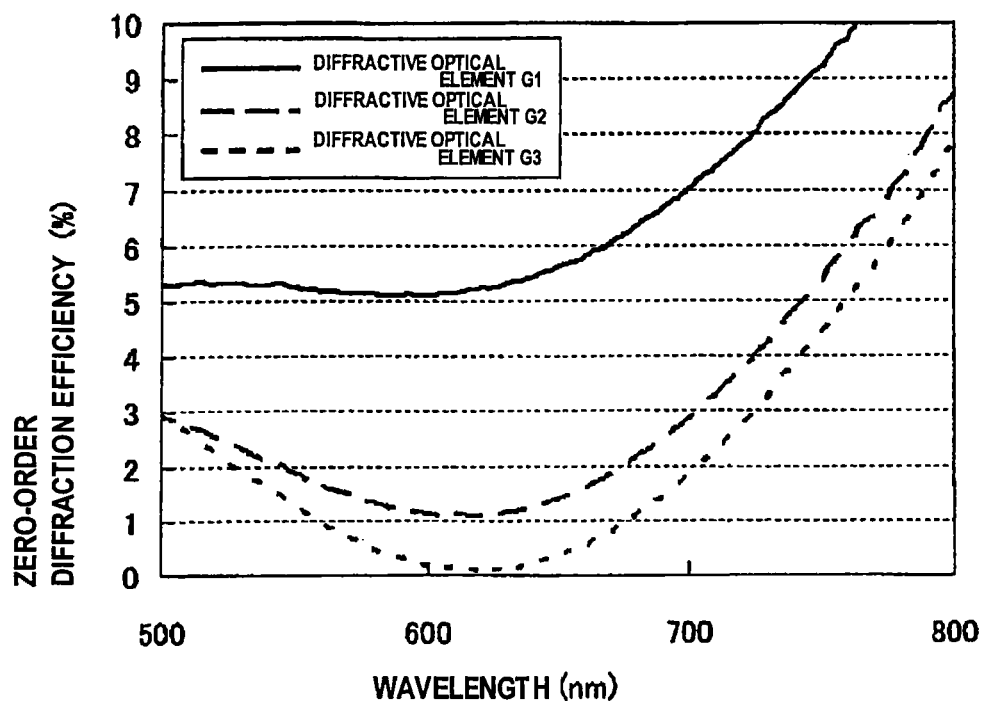
FIG. 37 is a diagram illustrating the relationship between wavelengths and diffraction efficiencies in the diffractive optical elements G1, G2 and G3.

FIG. 37 shows a result obtained by measuring wavelength dependency of the zero-order diffraction efficiency in the diffractive optical elements G1, G2 and G3 using a spectroscope. Here, in the diffractive optical element G1, the zero-order diffraction efficiency is the lowest value at a wavelength of 0.600 μm. At this time, the zero-order diffraction efficiency is 5.1%, and the diffraction angle range in the X direction is 19.2°. Further, in the diffractive optical element G2, the zero-order diffraction efficiency is the lowest value at a wavelength of 0.620 μm. At this time, the zero-order diffraction efficiency is 1.1%, and the diffraction angle range in the X direction is 19.8°. Further, in the diffractive optical element G3, the zero-order diffraction efficiency is the lowest value at a wavelength of 0.625 μm. At this time, the zero-order diffraction efficiency is 0.1%, and the diffraction angle range in the X direction is 20.0°.

(Example 8 of Diffractive Optical Element)

Next, diffractive optical elements H1, H2 and H3 to be illustrated are diffractive optical elements of eight steps (diffractive optical elements of three or more steps), capable of generating light spots of 200×150 points that are regularly arranged. The diffractive optical element is formed by using a quartz substrate as a substrate, and a diffractive optical element of eight steps in which the step difference in each step is 0.18 μm is formed on the basis of the same manufacturing method as that of Example 7.

In the diffractive optical elements H1, H2 and H3, basic units are formed as a region having a pitch Px=Py=330 μm, and the basic units are arranged in parallel in the range of 4.5 mm×4.5 mm. The order (m, n) of diffraction generated in each diffractive optical element corresponds to m=−199, −197, −195, . . . , 195, 197 and 199 in the X direction, and n=−149, −147, . . . , 147 and 149 in the Y direction.

Figure 38:
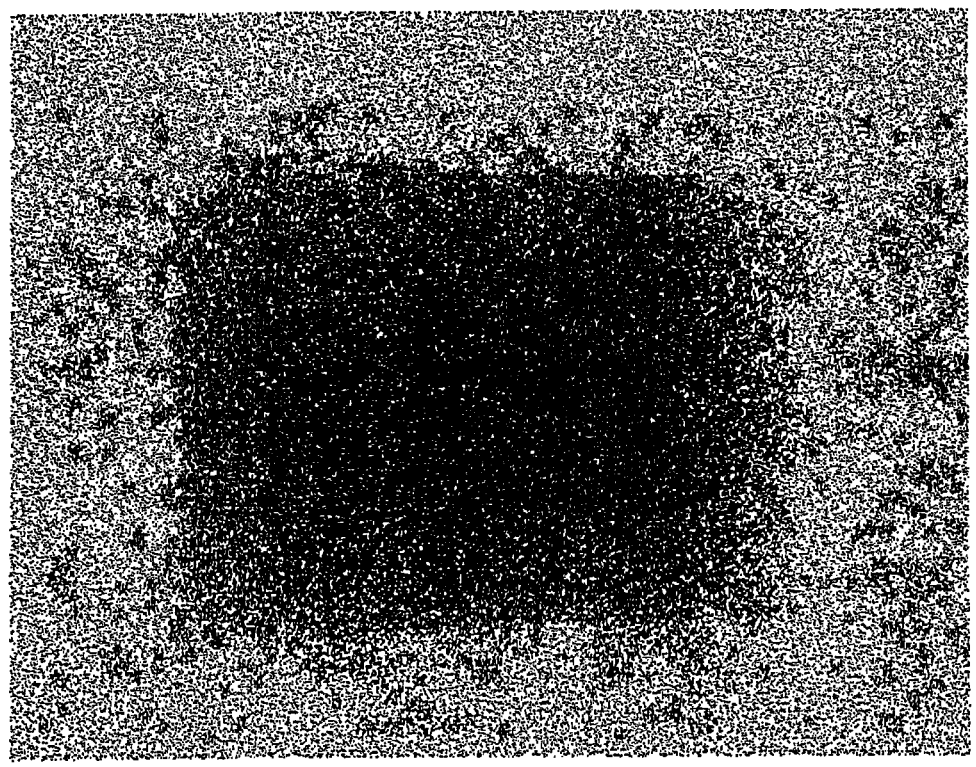
FIG. 38 is a diagram illustrating light spots generated by diffracted light of a diffractive optical element H3.

Here, FIG. 38 shows that light spots generated by diffracted light are displayed as black in a case where light flux having a wavelength of 0.66 μm is incident, in the diffractive optical element H3. The diffractive optical element H3 that provides such light spots may be designed by the repetitive Fourier transform or the like.

Further, FIG. 39 shows SEM images of planar structures in basic units with respect to the diffractive optical elements H1, H2 and H3. Specifically, FIG. 39(a) shows an SEM image of a planar structure in basic units of the diffractive optical element H1, FIG. 39(b) shows an SEM image of a planar structure in basic units of the diffractive optical element H2, and FIG. 39(c) shows an SEM image of a planar structure in basic units of the diffractive optical element H3.

Further, FIG. 40 shows that the portions of the fifth and higher steps among the eight steps (portions of which the height is 4/7 or higher) are considered as convex portions and are displayed as black, and the portions of the fourth and lower steps (portions of which the height is 3/7 or lower) are considered as concave portions and are displayed as gray, and boundary portions between the concave portions and the convex portions are displayed as white, with respect to the SEM images observed in the diffractive optical elements H1, H2 and H3. Specifically, FIG. 40(a) shows the case of the diffractive optical element H1, FIG. 40(b) shows the case of the diffractive optical element H2, and FIG. 40(c) shows the case of the diffractive optical element H3.

Figure 41:
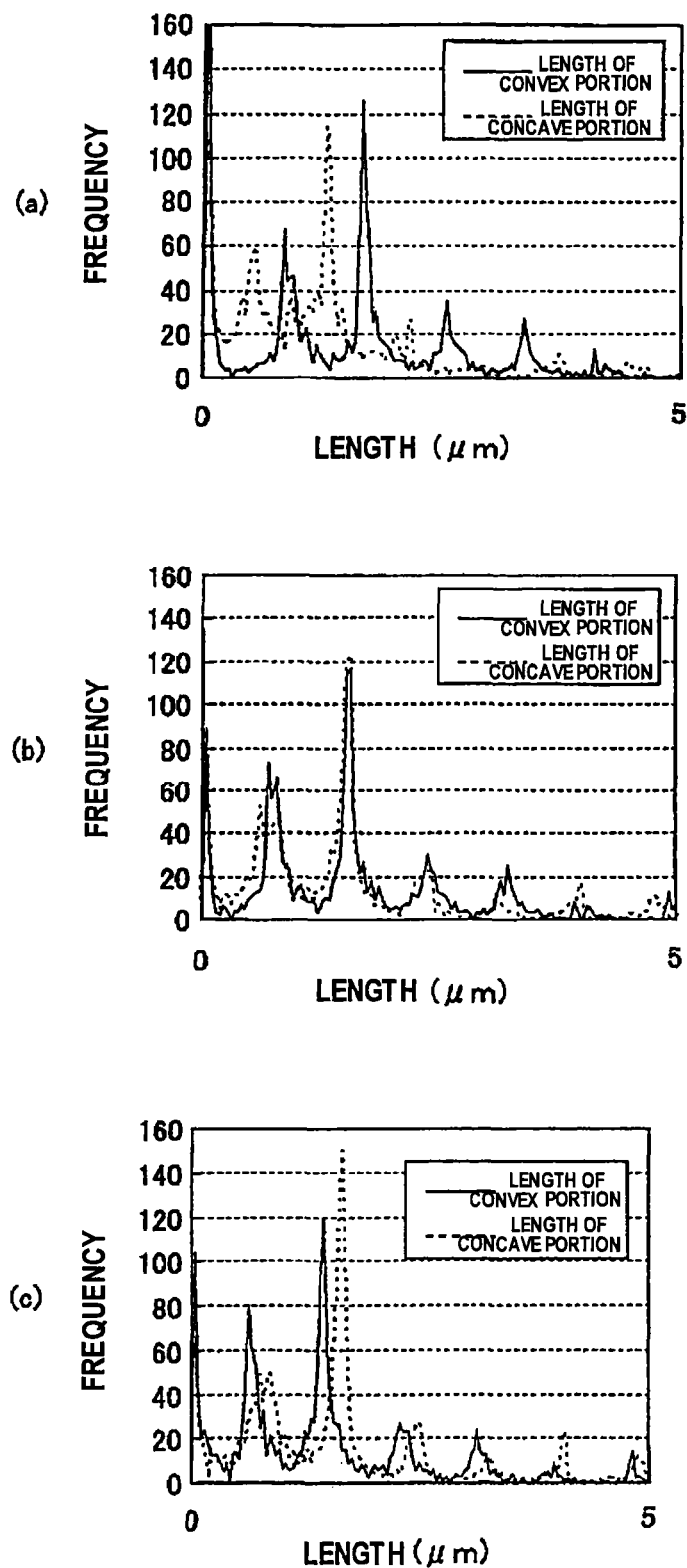
FIG. 41 is a histogram illustrating the lengths of the concave portions and the convex portions in the diffractive optical elements H1, H2 and H3.

Further, FIG. 41 shows histograms illustrating the lengths of a concave portion and a convex portion in the X axis direction, with respect to the diffractive optical elements H1, H2 and H3. Specifically, FIG. 41(a) is the histogram of the diffractive optical element H1, FIG. 41(b) is the histogram of the diffractive optical element H2, and FIG. 41(c) is the histogram of the diffractive optical element H3.

As a result, in a case where the wavelength λ of light flux incident onto each diffractive optical element is 0.64 μm, that is, in order to obtain $μ(d_1)$ and $μ(d_2)$, a range where the length $d_i$ can be obtained is set to a range of λ/8 to 26, that is, a range of 0.08 μm to 3.84 μm. At this time, the value of D in the diffractive optical element H1 is 0.587, the value of D in the diffractive optical element H2 is 0.525, and the value of D in the diffractive optical element H3 is 0.488.

Figure 42:
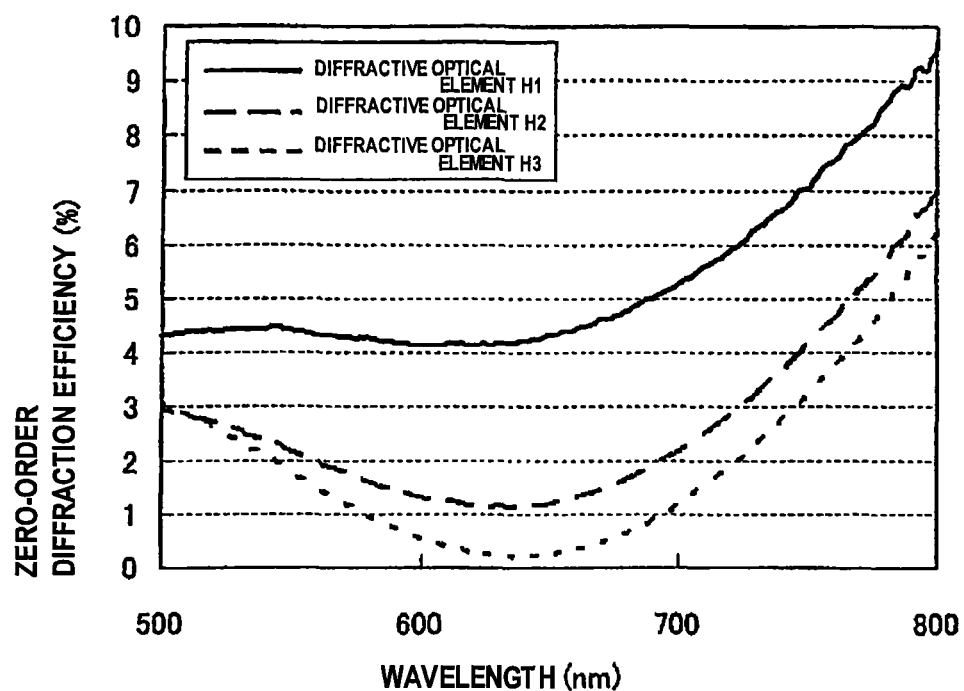
FIG. 42 is a diagram illustrating the relationship between wavelengths and diffraction efficiencies in the diffractive optical elements H1, H2 and H3.

FIG. 42 shows a result obtained by measuring wavelength dependency of the zero-order diffraction efficiency in the diffractive optical elements H1, H2 and H3 using a spectroscope. Here, in the diffractive optical element H1, the zero-order diffraction efficiency is the lowest value at a wavelength of 0.630 μm. At this time, the zero-order diffraction efficiency is 4.2%, and the diffraction angle range in the X direction is 22.3°. Further, in the diffractive optical element H2, the zero-order diffraction efficiency is the lowest value at a wavelength of 0.630 μm. At this time, the zero-order diffraction efficiency is 1.2%, and the diffraction angle range in the X direction is 22.3°. Further, in the diffractive optical element H3, the zero-order diffraction efficiency is the lowest value at a wavelength of 0.640 μm. At this time, the zero-order diffraction efficiency 0.2%, and the diffraction angle range in the X direction is 22.7°.

(Example 9 of Diffractive Optical Element)

Next, diffractive optical elements I1, I2 and I3 to be illustrated are diffractive optical elements of eight steps (diffractive optical elements of three or more steps), capable of generating light spots of 30000 points that are dispersedly arranged. The diffractive optical element is formed by using a quartz substrate as a substrate, and a diffractive optical element of eight steps in which the step difference in each step is 0.28 μm is formed on the basis of the same manufacturing method as that of Example 7.

In the diffractive optical elements I1, I2 and I3, basic units are formed as a region having a pitch Px=481.3 μm and Py=456.7 μm, and the basic units are arranged in parallel in the range of 4 mm×5 mm. The range of the diffraction order (m, n) of diffracted light generated in each diffractive optical element corresponds to a range of m=−300 to 299 in the X direction, and a range of n=−225 to 224 in the Y direction.

Figure 43:
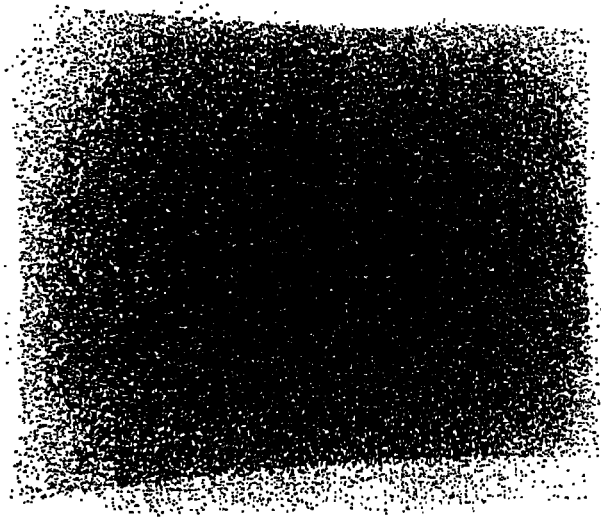
FIG. 43 is a diagram illustrating light spots generated by diffracted light from a diffractive optical element I1.

Here, FIG. 43 shows that light spots generated by diffracted light are displayed as black in a case where light flux having a wavelength of 0.66 μm is incident, in the diffractive optical element I1. The diffractive optical element I1 that provides such light spots may be designed by the repetitive Fourier transform or the like.

Further, FIG. 44 shows SEM images of planar structures in basic units with respect to the diffractive optical elements I1, I2 and I3. Specifically, FIG. 44(a) shows an SEM image of a planar structure in basic units of the diffractive optical element I1, FIG. 44(b) shows an SEM image of a planar structure in basic units of the diffractive optical element I2, and FIG. 44(c) shows an SEM image of a planar structure in basic units of the diffractive optical element I3.

Further, FIG. 45 shows that the portions of the fifth and higher steps among eight steps (portions of which the height is 4/7 or higher) are considered as convex portions and are displayed as black, and the portions of the fourth and lower steps (portions of which the height is 3/7 or lower) are considered as concave portions and are displayed as gray, and boundary portions between the concave portions and the convex portions are displayed as white, with respect to the SEM images observed in the diffractive optical elements I1, I2 and I3. Specifically, FIG. 45(a) shows the case of the diffractive optical element I1, FIG. 45(b) shows the case of the diffractive optical element I2, and FIG. 45(c) shows the case of the diffractive optical element I3.

Figure 46:
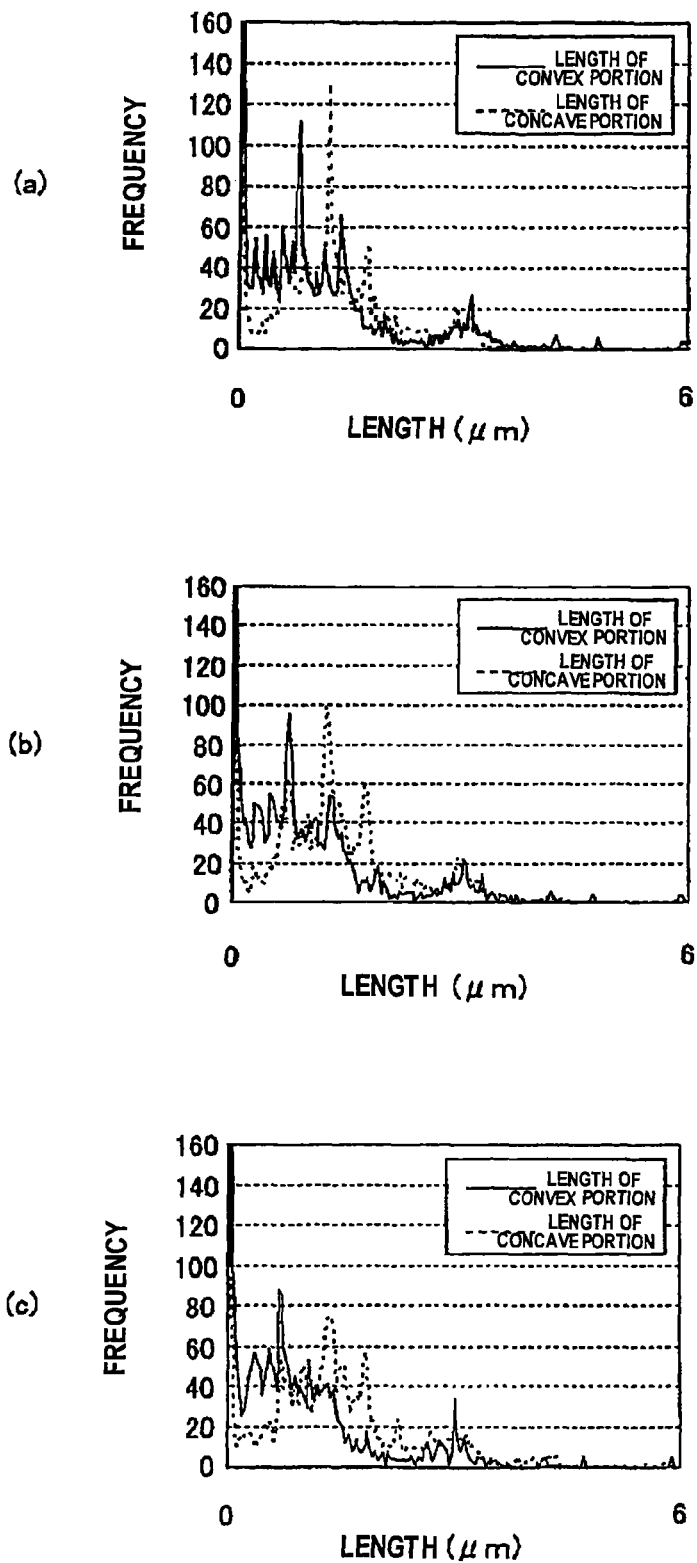
FIG. 46 is a histogram illustrating the lengths of the concave portions and the convex portions in the diffractive optical elements I1, I2 and I3.

Further, FIG. 46 shows histograms illustrating the lengths of a concave portion and a convex portion in the X axis direction, with respect to the diffractive optical elements I1, I2 and I3. Specifically, FIG. 46(a) is the histogram of the diffractive optical element I1, FIG. 46(b) is the histogram of the diffractive optical element I2, and FIG. 46(c) is the histogram of the diffractive optical element I3.

As a result, in a case where the wavelength λ of light flux incident onto each diffractive optical element is 0.75 μm, that is, in order to obtain $\mu(d_1)$ and $\mu(d_2)$, a range where the length $d_i$ can be obtained is set to a range of λ/8 to λ6, that is, a range of 0.094 μm to 4.5 μm. At this time, the value of D in the diffractive optical element I1 is 0.469, the value of D in the diffractive optical element I2 is 0.446, and the value of D in the diffractive optical element I3 is 0.424.

Figure 47:
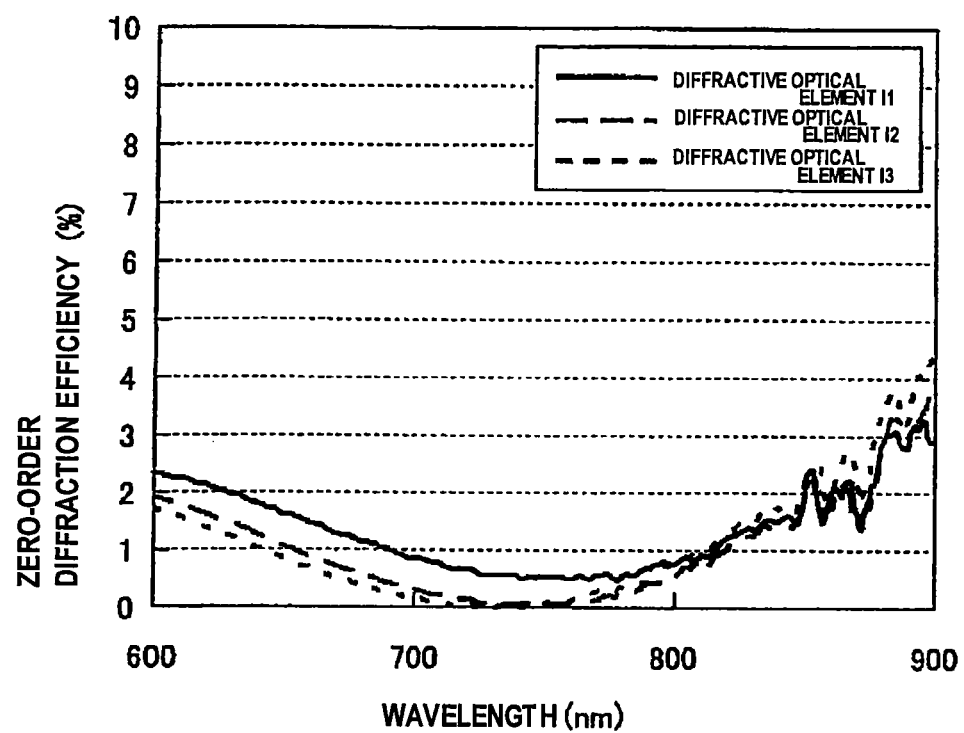
FIG. 47 is a diagram illustrating the relationship between wavelengths and diffraction efficiencies in the diffractive optical elements I1, I2 and I3.

FIG. 47 shows a result obtained by measuring wavelength dependency of the zero-order diffraction efficiency in the diffractive optical elements I1, I2 and I3 using a spectroscope. Here, in the diffractive optical element I1, the zero-order diffraction efficiency is the lowest value at a wavelength of 0.760 μm. At this time, the zero-order diffraction efficiency is 0.5%, and the diffraction angle range in the X direction is 28.3°. Further, in the diffractive optical element I2, the zero-order diffraction efficiency is the lowest value at a wavelength of 0.745 μm. At this time, the zero-order diffraction efficiency is 0.1%, and the diffraction angle range in the X direction is 27.7°. Further, in the diffractive optical element I3, the zero-order diffraction efficiency is the lowest value at a wavelength of 0.730 μm. At this time, the zero-order diffraction efficiency 0.0%, and the diffraction angle range in the X direction is 27.1°.

(Example 10 of Diffractive Optical Element)

Next, diffractive optical elements J1, J2 and J3 to be illustrated are diffractive optical elements of eight steps (diffractive optical elements of three or more steps), capable of generating light spots of 30000 points that are dispersedly arranged. The diffractive optical element is formed by using a quartz substrate as a substrate, and a diffractive optical element of eight steps in which the step difference in each step is 0.21 μm is formed on the basis of the same manufacturing method as that of Example 7.

In the diffractive optical elements J1, J2 and J3, basic units are formed as a region having a pitch Px=320.5 μm and Py=304.1 μm, and the basic units are arranged in parallel in the range of 4 mm×5 mm. The range of the diffraction order (m, n) of diffracted light generated in each diffractive optical element corresponds to a range of m=−200 to 199 in the X direction, and a range of n=−150 to 149 in the Y direction.

Figure 48:
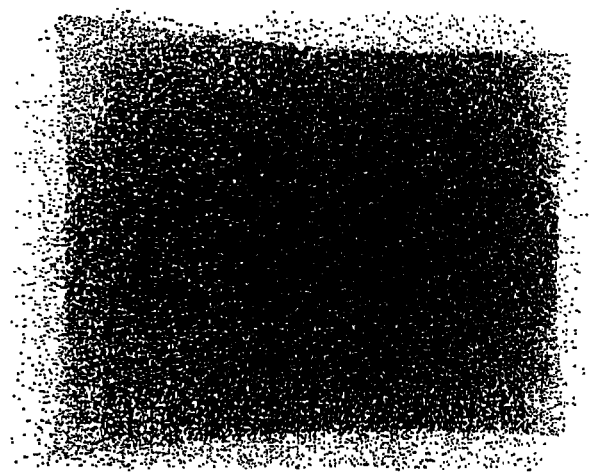
FIG. 48 is a diagram illustrating light spots generated by diffracted light from a diffractive optical element J1.

Here, FIG. 48 shows that light spots generated by diffracted light are displayed as black in a case where light flux having a wavelength of 0.66 μm is incident, in the diffractive optical element J1. The diffractive optical element J1 that provides such light spots may be designed by the repetitive Fourier transform or the like.

Further, FIG. 49 shows SEM images of planar structures in basic units with respect to the diffractive optical elements J1, J2 and J3. Specifically, FIG. 49(a) shows an SEM image of a planar structure in basic units of the diffractive optical element J1, FIG. 49(b) shows an SEM image of a planar structure in basic units of the diffractive optical element J2, and FIG. 49(c) shows n SEM image of a planar structure in basic units of the diffractive optical element J3.

Further, FIG. 50 shows that the portions of the fifth and higher steps among eight steps (portions of which the height is 4/7 or higher) are considered as convex portions and are displayed as black, and the portions of the fourth and lower steps (portions of which the height is 3/7 or lower) are considered as concave portions and are displayed as gray, and boundary portions between the concave portions and the convex portions are displayed as white, with respect to the SEM images observed in the diffractive optical elements J1, J2 and J3. Specifically, FIG. 50(a) shows the case of the diffractive optical element J1, FIG. 50(b) shows the case of the diffractive optical element J2, and FIG. 50(c) shows the case of the diffractive optical element J3.

Figure 51:
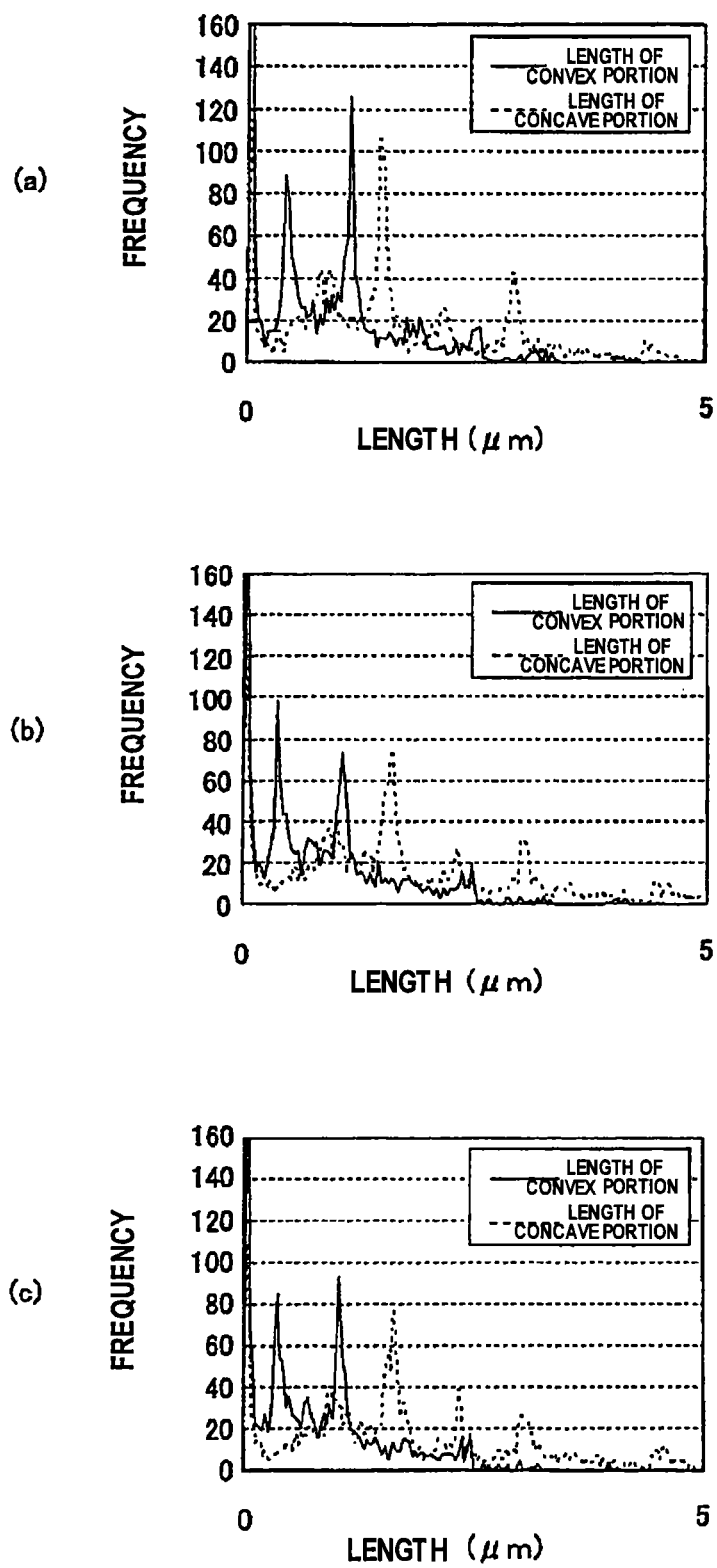
FIG. 51 is a histogram illustrating the lengths of the concave portions and the convex portions in the diffractive optical elements J1, J2 and J3.

Further, FIG. 51 shows histograms illustrating the lengths of a concave portion and a convex portion in the X axis direction, with respect to the diffractive optical elements J1, J2 and J3. Specifically, FIG. 51(a) is the histogram of the diffractive optical element J1, FIG. 51(b) is the histogram of the diffractive optical element J2, and FIG. 51(c) is the histogram of the diffractive optical element J3.

As a result, in a case where the wavelength λ of light flux incident onto each diffractive optical element is 0.66 μm, that is, in order to obtain $\mu(d_1)$ and $\mu(d_2)$, a range where the length $d_i$ can be obtained is set to a range of λ/8 to λ6, that is, a range of 0.083 μm to 3.96 μm. At this time, the value of D in the diffractive optical element J1 is 0.402, the value of D in the diffractive optical element J2 is 0.365, and the value of D in the diffractive optical element J3 is 0.357.

Figure 52:
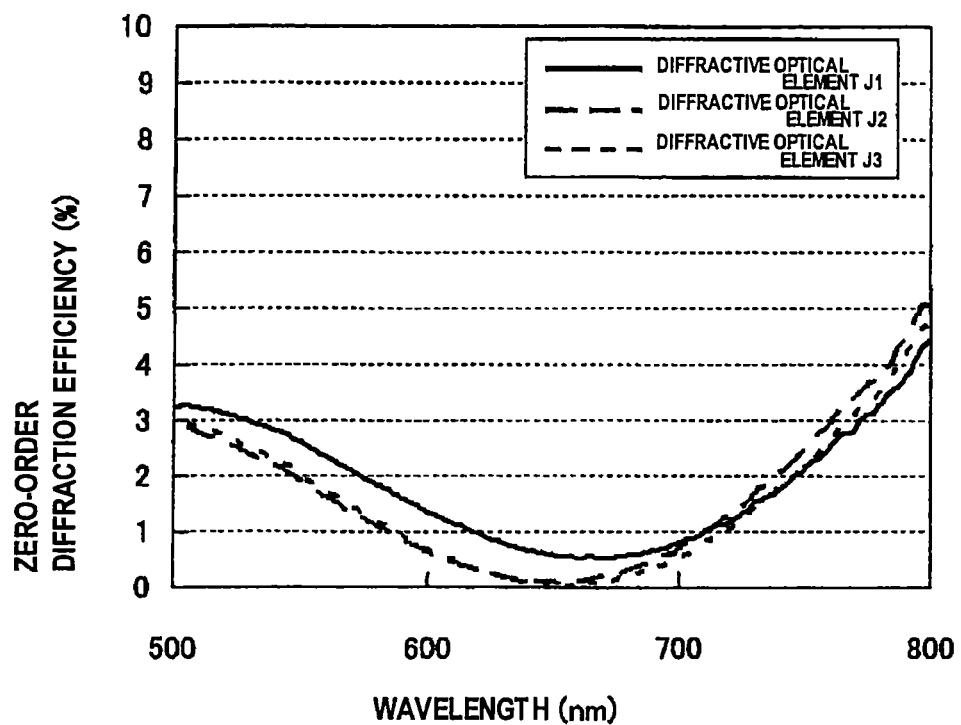
FIG. 52 is a diagram illustrating the relationship between wavelengths and diffraction efficiencies in the diffractive optical elements J1, J2 and J3.

FIG. 52 shows a result obtained by measuring wavelength dependency of the zero-order diffraction efficiency in the diffractive optical elements J1, J2 and J3 using a spectroscope. Here, in the diffractive optical element J1, the zero-order diffraction efficiency is the lowest value at a wavelength of 0.675 μm. At this time, the zero-order diffraction efficiency is 0.6%, and the diffraction angle range in the X direction is 24.9°. Further, in the diffractive optical element J2, the zero-order diffraction efficiency is the lowest value at a wavelength of 0.655 μm. At this time, the zero-order diffraction efficiency is 0.1%, and the diffraction angle range in the X direction is 24.1°. Further, in the diffractive optical element J3, the zero-order diffraction efficiency is the lowest value at a wavelength of 0.660 μm. At this time, the zero-order diffraction efficiency 0.0%, and the diffraction angle range in the X direction is 24.3°.

(Example 11 of Diffractive Optical Element)

Next, diffractive optical elements K1, K2 and K3 to be illustrated are diffractive optical elements of two steps, capable of generating light spots of 24212 points that are dispersedly arranged. The diffractive optical element is also formed by using a quartz substrate as a substrate, and a pattern thereof is formed on the basis of the same manufacturing method as that of Example 1.

In the diffractive optical elements K1, K2 and K3, basic units are formed as a region having a pitch Px=512 µm and Py=520.2 and the basic units are arranged in parallel in the range of 5 mm×4 mm. The diffraction order (m, n) of diffracted light generated in each of all the diffractive optical elements is distributed in a range of m=−319 to 319 in the X direction, and in a range of n=−256 to 256 in the Y direction. Further, in the diffractive optical elements K1, K2 and K3, the height of the convex portion is 0.93 µm.

Figure 56:
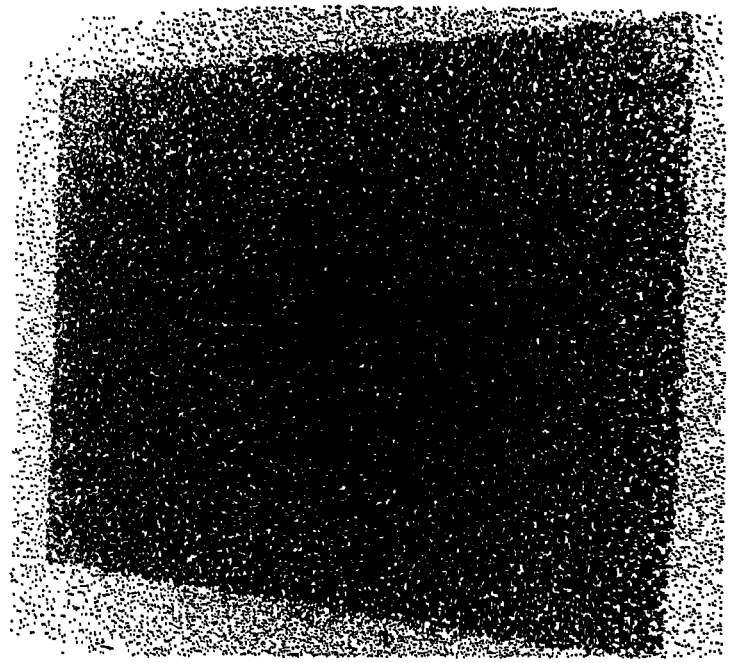
FIG. 56 is a diagram illustrating light spots generated by diffracted light from a diffractive optical element K1.

Here, FIG. 56 shows that light spots generated by diffracted light are displayed as black in a case where light flux having a wavelength of 0.83 µm is incident, in the diffractive optical element K1. The diffractive optical element K1 that provides such light spots may be designed by the repetitive Fourier transform or the like.

Further, FIG. 57 shows that convex portions are displayed as black, concave portions are displayed as gray, and tapered portions of boundary portions between the concave portions and the convex portions are displayed as white, with respect to SEM images observed in the diffractive optical elements K1, K2 and K3. Specifically, FIG. 57(a) shows the case of the diffractive optical element K1, FIG. 57(b) shows the case of the diffractive optical element K2, FIG. 57(c) shows the case of the diffractive optical element K3.

Further, FIG. 58 shows histograms illustrating the lengths of a concave portion and a convex portion in the X axis direction, with respect to the diffractive optical elements K1, K2 and K3. Specifically, FIG. 58(a) is the histogram of the diffractive optical element K1, FIG. 58(b) is the histogram of the diffractive optical element K2, and FIG. 58(c) is the histogram of the diffractive optical element K3.

As a result, in a case where the wavelength λ of light flux incident onto each diffractive optical element is 0.756 µm, that is, in order to obtain $\mu(d_1)$ and $\mu(d_2)$, a range where the length $d_i$ can be obtained is set to a range of λ/8 to λ6, that is, a range of 0.095 µm to 4.54 µm. At this time, the value of D in the diffractive optical element K1 is 0.436, the value of D in the diffractive optical element K2 is 0.364, and the value of D in the diffractive optical element K3 is 0.323.

Figure 59:
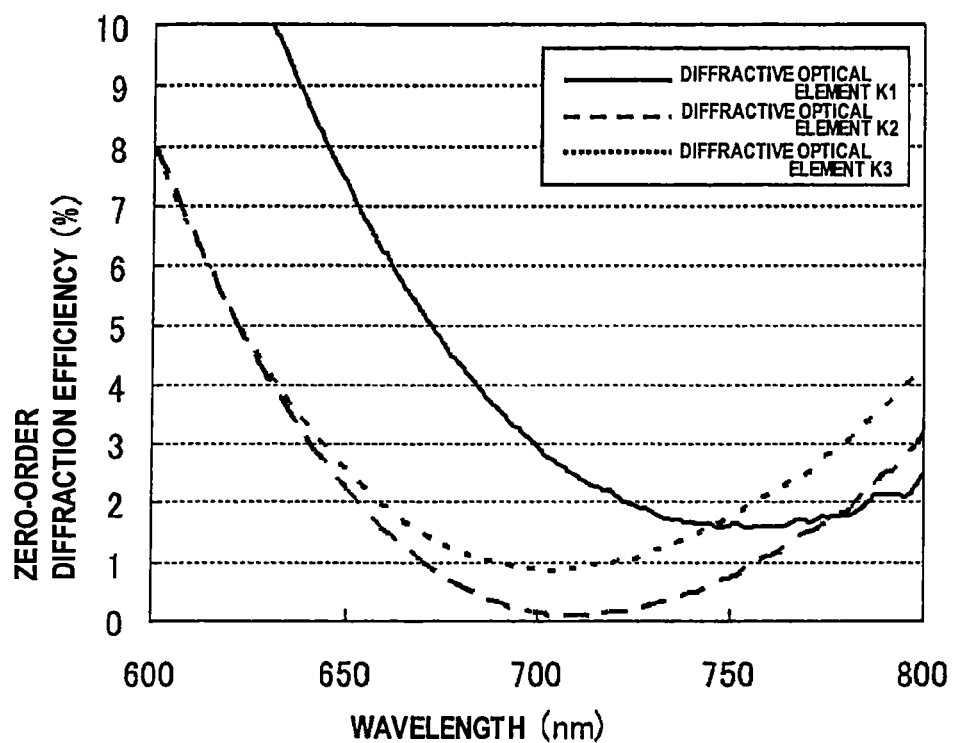
FIG. 59 is a diagram illustrating the relationship between wavelengths and diffraction efficiencies in the diffractive optical elements K1, K2 and K3.

FIG. 59 shows a result obtained by measuring wavelength dependency of the zero-order diffraction efficiency in the diffractive optical elements K1, K2 and K3 using a spectroscope. In the diffractive optical element K1, the zero-order diffraction efficiency is the lowest value at a wavelength of 0.756 µm. At this time, the zero-order diffraction efficiency is 1.6%, and the diffraction angle range in the X direction is 28.1°. Further, in the diffractive optical element K2, the zero-order diffraction efficiency is the lowest value at a wavelength of 0.711 µm. At this time, the zero-order diffraction efficiency is 0.1%, and the diffraction angle range in the X direction is 26.3°. Further, in the diffractive optical element K3, the zero-order diffraction efficiency is the lowest value at a wavelength of 0.703 µm. At this time, the zero-order diffraction efficiency 0.9%, and the diffraction angle range in the X direction is 26.0°.

(Example 12 of Diffractive Optical Element)

Next, diffractive optical elements L1, L2 and L3 to be illustrated are diffractive optical elements of two steps, capable of generating light spots of 24914 points that are dispersedly arranged. The diffractive optical element is also formed by using a quartz substrate as a substrate, and a pattern thereof is formed on the basis of the same manufacturing method as that of Example 1.

Figure 60:
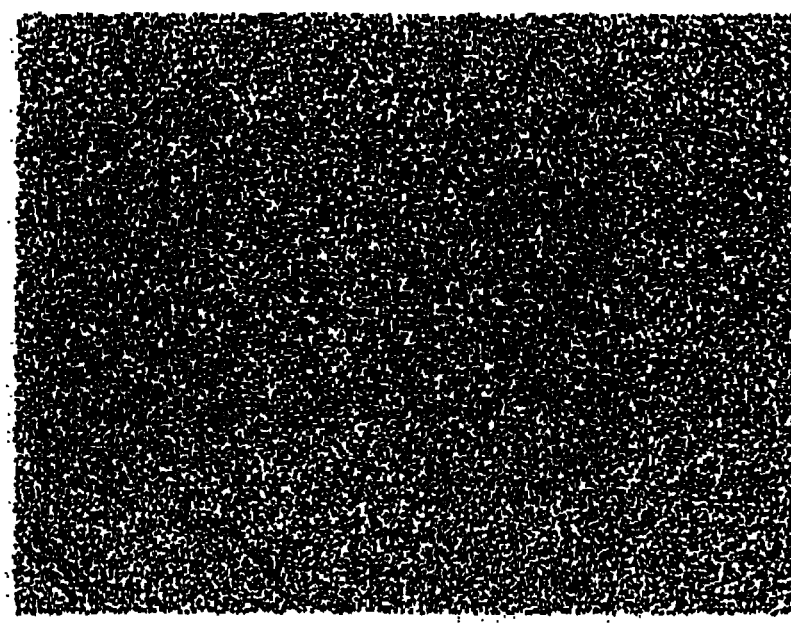
FIG. 60 is a diagram illustrating light spots generated by diffracted light from a diffractive optical element L1.

In the diffractive optical elements L1, L2 and L3, basic units are formed as a region having a pitch Px=409.6 µm and Py=358.4 µm, and the basic units are arranged in parallel in the range of 3.0 mm×2.5 mm. The diffraction order (m, n) of diffracted light generated in each diffractive optical element is distributed in a range of m=−399 to 399 in the X direction, and in a range of n=−300 to 300 in the Y direction. Further, in the diffractive optical elements L1, L2 and L3, the height of the convex portion is 1.15 µm Here, FIG. 60 shows that light spots generated by diffracted light are obtained by calculation in a case where light flux having a wavelength of 0.83 µm is incident, in the diffractive optical element L1. The diffractive optical element L1 that provides such light spots may be designed by the repetitive Fourier transform or the like.

Figure 61:
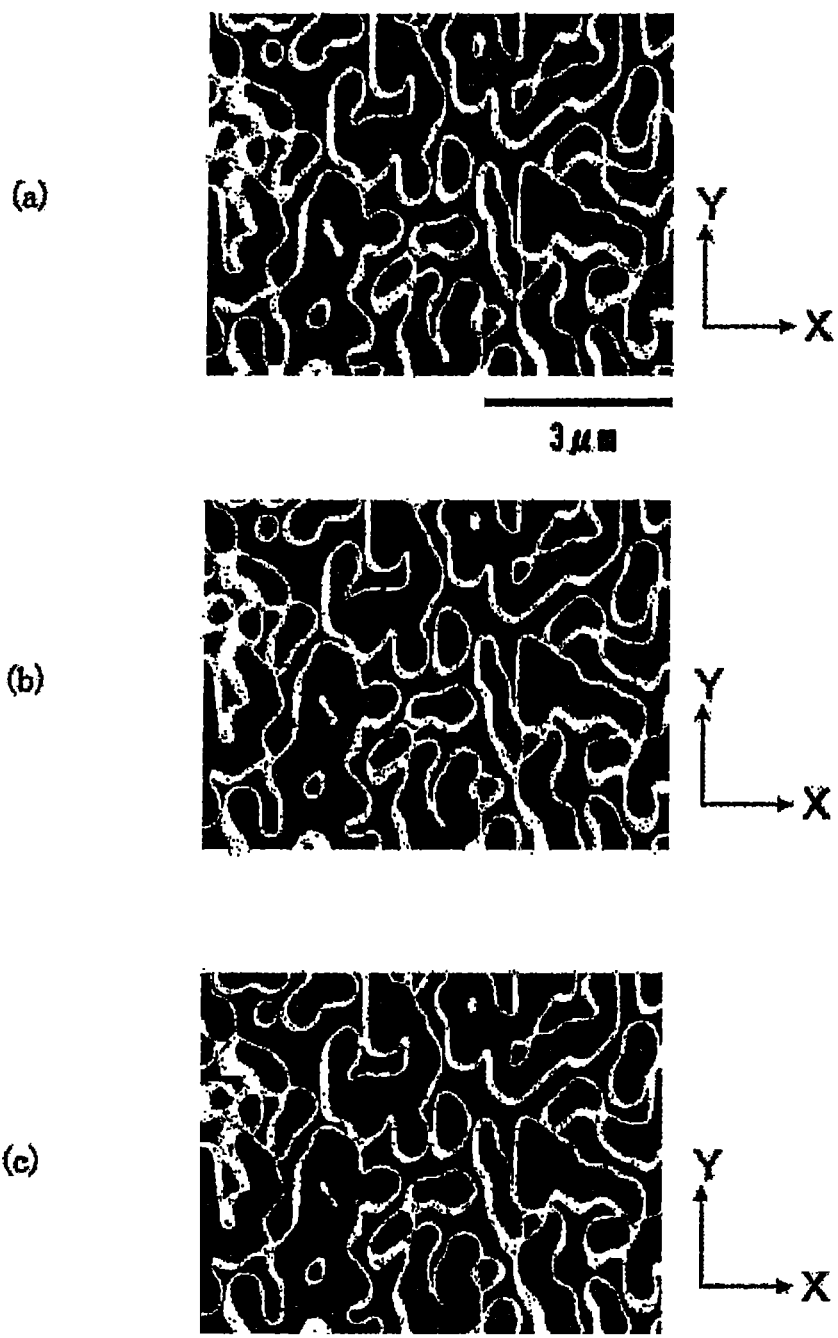
FIG. 61 is a diagram schematically illustrating concave portions and convex portions on the surfaces of diffractive optical elements L1, L2 and L3.

Further, FIG. 61 shows that convex portions are displayed as black, concave portions are displayed as gray, and tapered portions of boundary portions between the concave portions and the convex portions are displayed as white, with respect to SEM images observed in the diffractive optical elements L1, L2 and L3. Specifically, FIG. 61(a) shows the case of the diffractive optical element L1, FIG. 61(b) shows the case of the diffractive optical element L2, FIG. 61(c) shows the case of the diffractive optical element L3.

Further, FIG. 62 shows histograms illustrating the lengths of a concave portion and a convex portion in the X axis direction, with respect to the diffractive optical elements L1, L2 and L3. Specifically, FIG. 62(a) is the histogram of the diffractive optical element L1, FIG. 62(b) is the histogram of the diffractive optical element L2, and FIG. 62(c) is the histogram of the diffractive optical element L3.

As a result, in a case where the wavelength λ of light flux incident onto each diffractive optical element is 0.796 µm, that is, in order to obtain $\mu(d_1)$ and $\mu(d_2)$, a range where the length $d_i$ can be obtained is set to a range of λ/8 to λ6, that is, a range of 0.100 µm to 4.78 µm. At this time, the value of D in the diffractive optical element L1 is 0.407, the value of D in the diffractive optical element L2 is 0.373, and the value of D in the diffractive optical element L3 is 0.363.

Figure 63:
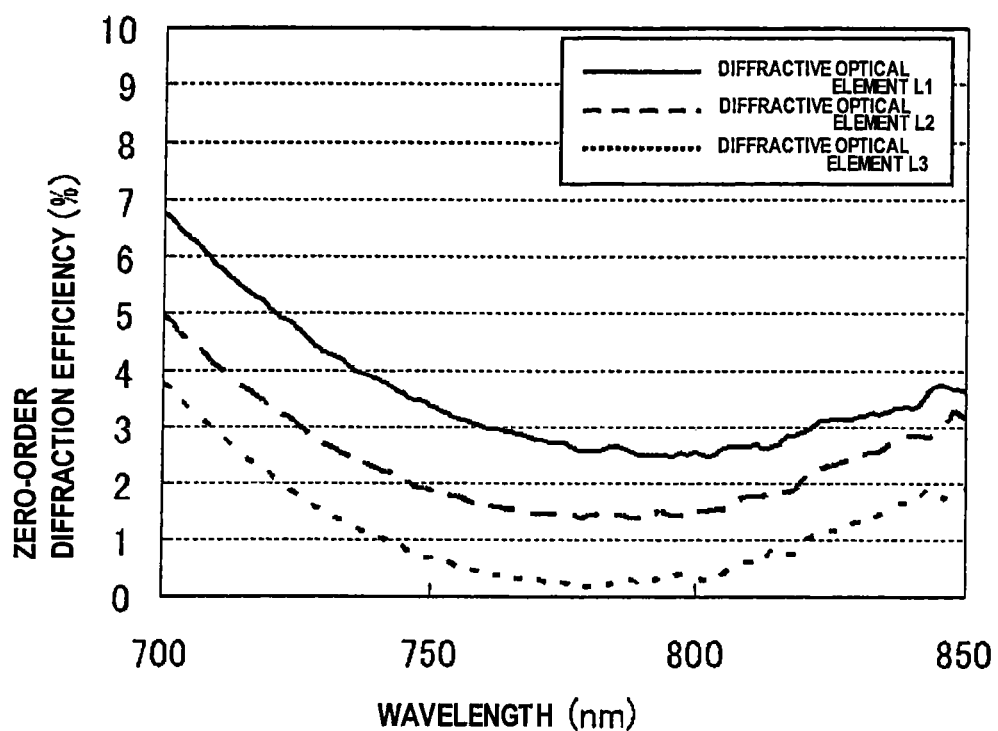
FIG. 63 is a diagram illustrating the relationship between wavelengths and diffraction efficiencies in the diffractive optical elements L1, L2 and L3.

FIG. 63 shows a result obtained by measuring wavelength dependency of the zero-order diffraction efficiency in the diffractive optical elements L1, L2 and L3 using a spectroscope. In the diffractive optical element L1, the zero-order diffraction efficiency is the lowest value at a wavelength of 0.796 µm. At this time, the zero-order diffraction efficiency is 2.5%, and the diffraction angle range in the X direction is 50.8°. Further, in the diffractive optical element L2, the zero-order diffraction efficiency is the lowest value at a wavelength of 0.779 µm. At this time, the zero-order diffraction efficiency is 1.4%, and the diffraction angle range in the X direction is 49.4°. Further, in the diffractive optical element L3, the zero-order diffraction efficiency is the lowest value at a wavelength of 0.781 µm. At this time, the zero-order diffraction efficiency is 0.2%, and the diffraction angle range in the X direction is 49.5°.

(Example 13 of Diffractive Optical Element)

Next, diffractive optical elements M1 and M2 to be illustrated are diffractive optical elements of two steps, capable of generating light spots of 4×4 points that are dispersedly arranged. The diffractive optical element is also formed by using a quartz substrate as a substrate, and a pattern thereof is formed on the basis of the same manufacturing method as that of Example 1.

In the diffractive optical elements M1 and M2, basic units are formed as a region having a pitch Px=4.1 µm and Py=4.6 µm, and the basic units are arranged in parallel in the range of 3.0 mm×2.5 mm. The order (m, n) of diffraction generated in each diffractive optical element corresponds to m=−3, −1, 1 and 3 in the X direction, and n=−3, 1, 1 and 3 in the Y direction. Further, in the diffractive optical elements M1 and M2, the height of the convex portion is 1.15 µm.

Figure 64:
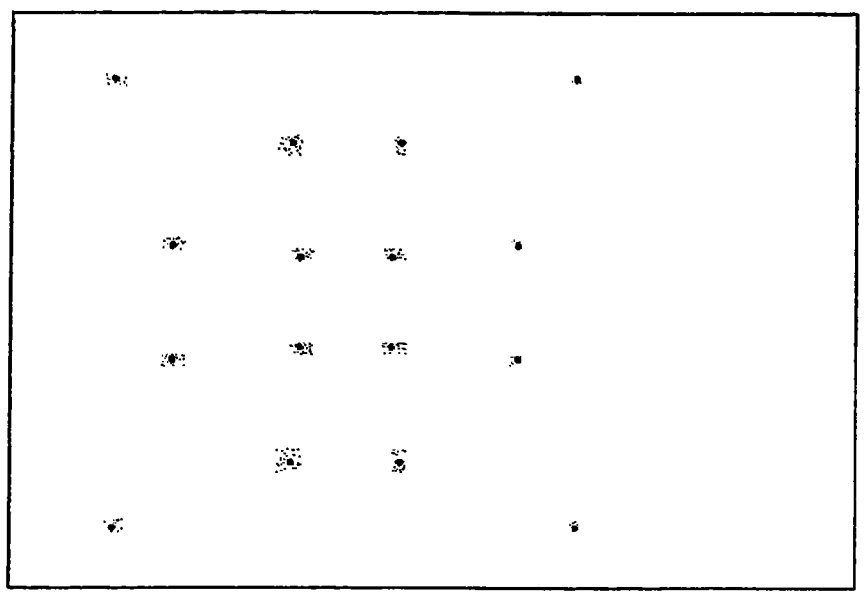
FIG. 64 is a diagram illustrating light spots generated by diffracted light of a diffractive optical element M1.

Here, FIG. 64 shows that light spots generated by diffracted light are displayed as black in a case where light flux having a wavelength of 0.83 µm is incident, in the diffractive optical element M1. The diffractive optical element M1 that provides such light spots may be designed by the repetitive Fourier transform or the like.

Figure 65:
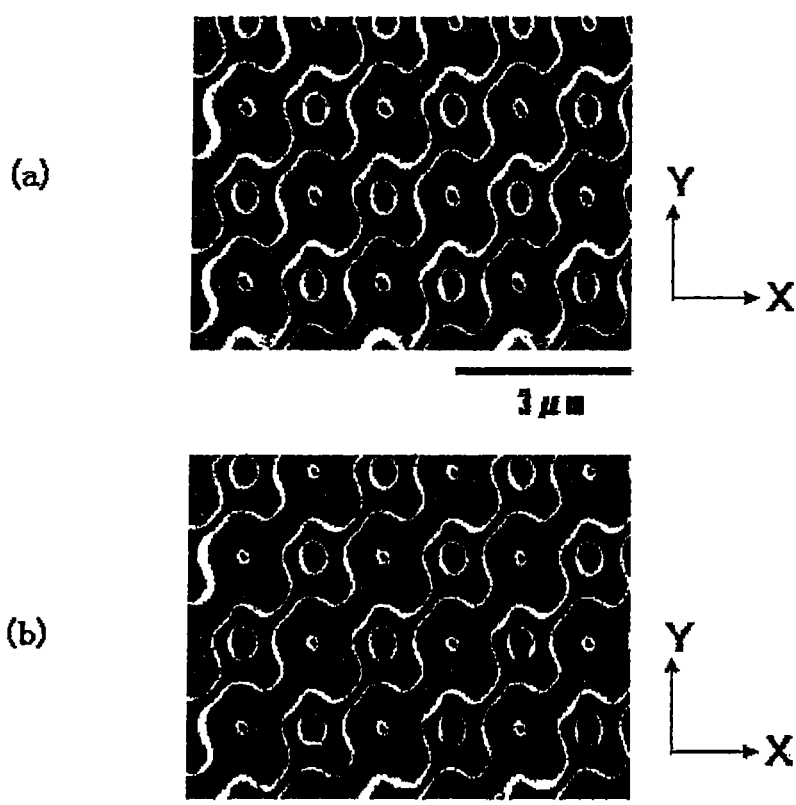
FIG. 65 is a diagram schematically illustrating concave portions and convex portions on the surfaces of diffractive optical elements M1 and M2.

Further, FIG. 65 shows that convex portions are displayed as black, concave portions are displayed as gray, and tapered portions of boundary portions between the concave portions and the convex portions are displayed as white, with respect to SEM images observed in the diffractive optical elements M1 and M2. Specifically, FIG. 65(a) shows the case of the diffractive optical element M1, and FIG. 65(b) shows the case of the diffractive optical element M2.

Further, FIG. 66 shows histograms illustrating the lengths of a concave portion and a convex portion in the X axis direction, with respect to the diffractive optical elements M1 and M2. Specifically, FIG. 66(a) is the histogram of the diffractive optical element M1, and FIG. 66(b) is the histogram of the diffractive optical element M2.

As a result, in a case where the wavelength λ of light flux incident onto each diffractive optical element is 0.806 µm, that is, in order to obtain $\mu(d_1)$ and $\mu(d_2)$, a range where the length $d_i$ can be obtained is set to a range of λ/8 to λ6, that is, a range of 0.101 µm to 4.84 µm. At this time, the value of D in the diffractive optical element M1 is 0.362, and the value of D in the diffractive optical element M2 is 0.332.

Figure 67:
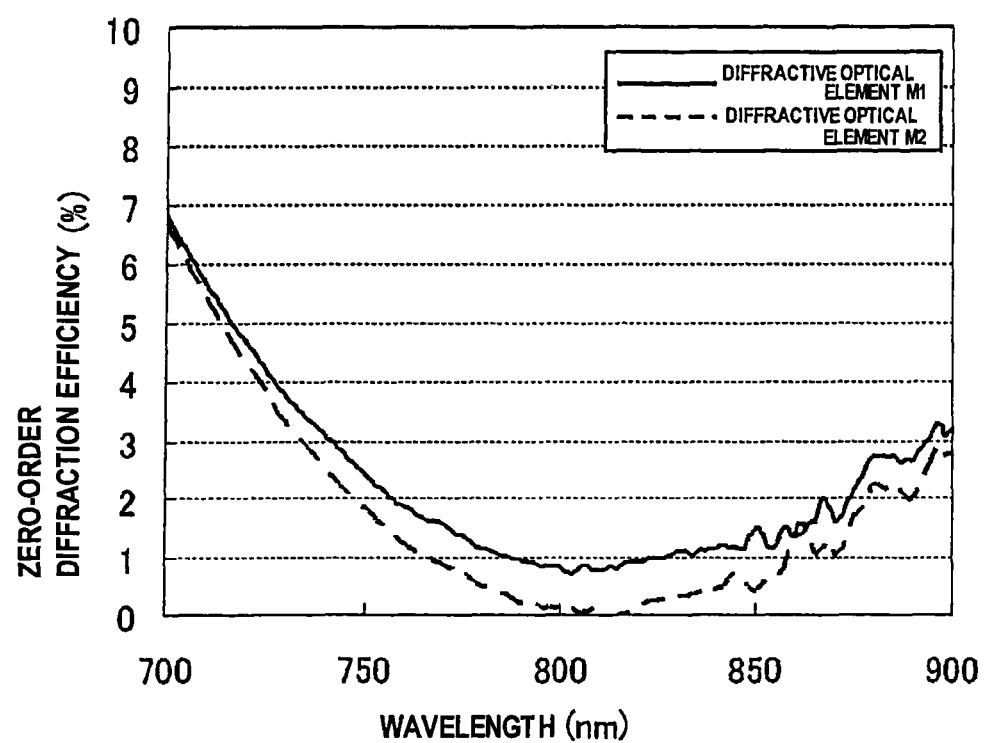
FIG. 67 is a diagram illustrating the relationship between wavelengths and diffraction efficiencies in the diffractive optical elements M1 and M2.

FIG. 67 shows a result obtained by measuring wavelength dependency of the zero-order diffraction efficiency in the diffractive optical elements M1 and M2 using a spectroscope. In the diffractive optical element M1, the zero-order diffraction efficiency is the lowest value at a wavelength of 0.806 µm. At this time, the zero-order diffraction efficiency is 0.9%, and the diffraction angle range in the X direction is 36.4°. Further, in the diffractive optical element M2, the zero-order diffraction efficiency is the lowest value at a wavelength of 0.8 µm. At this time, the zero-order diffraction efficiency is 0.1%, and the diffraction angle range in the X direction is 36.1°.

Figure 32:
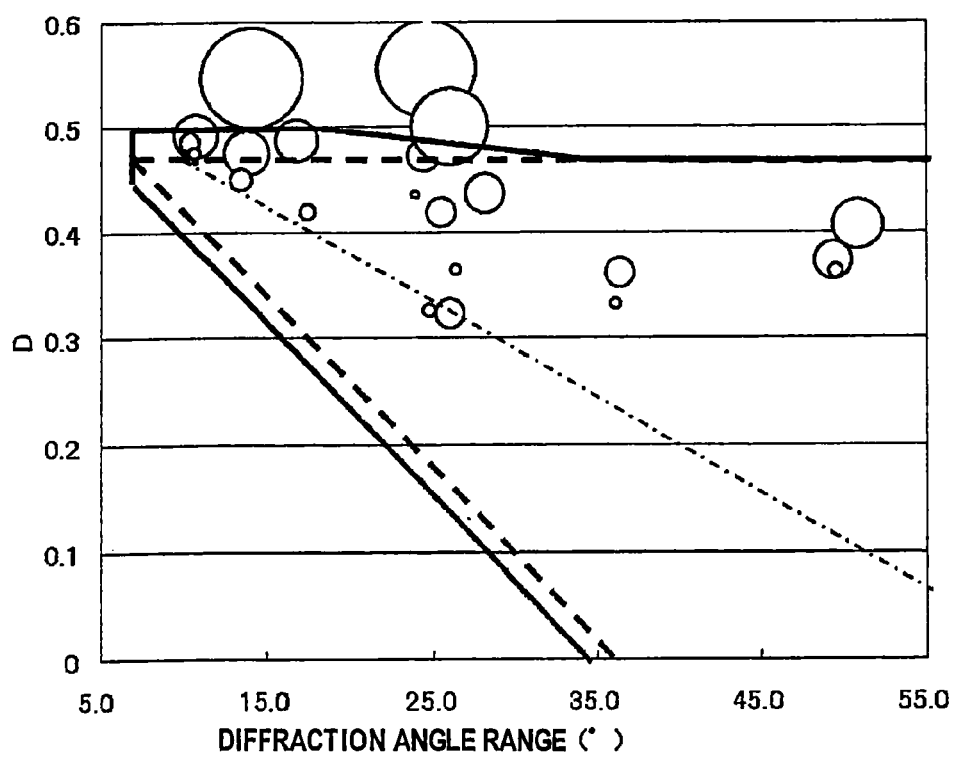
FIG. 32 is a diagram illustrating correlation between diffraction angle range and D in a diffractive optical element formed in the shape of two steps.

Here, FIG. 32 shows a distribution of the relationship between the diffraction angle range and D in Example 1 to Example 6 and in Example 11 to Example 13 of the diffractive optical element. The size of a circle in the figure represents a value of zero-order diffraction efficiency in a wavelength at which the zero-order diffraction efficiency is the minimum. That is, as the size of the circle in the figure is large, the value of the zero-order diffraction efficiency is high, and as the size of the circle in the figure is small, the value of the zero-order diffraction efficiency is low. In FIG. 32, a range of the formulas shown in the above-mentioned Expression 4 is indicated by a solid line, and a range of the formulas shown in the above-mentioned Expression 5 is indicated by a dashed line. Here, since the zero-order diffraction efficiency is low in the vicinity of a dotted chain line shown in FIG. 32, it can be considered that the zero-order diffraction efficiency is low in a region having a vertical width around the portion.

Figure 53:
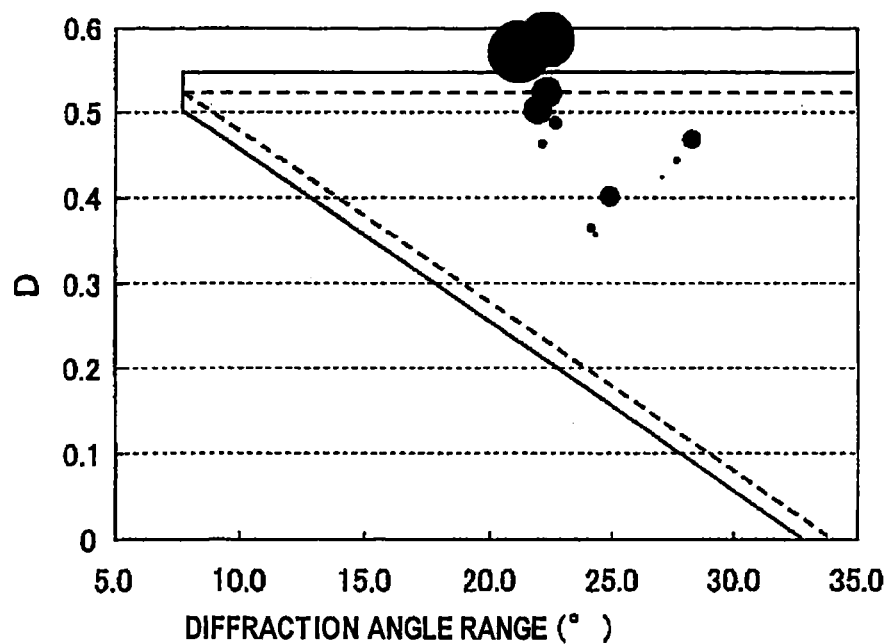
FIG. 53 is a diagram illustrating correlation between diffraction angle range and D in a diffractive optical element formed in the shape of eight steps.

Here, FIG. 53 shows distribution of the relationship between the diffraction angle range and D in Example 7 to Example 10 of the diffractive optical element. The size of a black circle represents a value of zero-order diffraction efficiency in a wavelength at which the zero-order diffraction efficiency is the minimum. That is, as the size of the black circle is large, the value of the zero-order diffraction efficiency is high, and as the size of the black circle is small, the value of the zero-order diffraction efficiency is low. In FIG. 53, a range of the formulas shown in the above-mentioned Expression 6 is indicated by a solid line, and a range of the formulas shown in the above-mentioned Expression 7 is indicated by a dashed line. Here, it can be considered that as the number of steps is set to three or more, it is possible to increase the value of D, compared with the case of two steps, and in the case of eight steps, it is possible to reduce the zero-order diffraction efficiency even in a case where the value of D is increased by 0.05.

[Second Embodiment]

Next, as a second embodiment, a reflective diffractive optical element will be described. In the first embodiment, the incident light passes through the transparent substrate to generate the diffracted light, but in the present embodiment, a reflection film is formed on a substrate and light is reflected by the reflection film to generate diffracted light.

Figure 54:
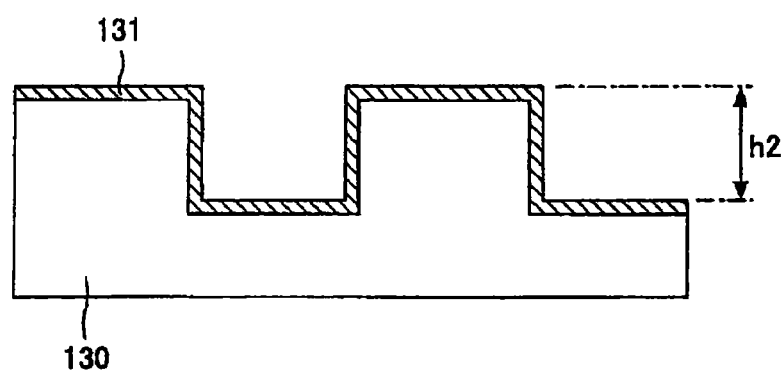
FIG. 54 is a structure diagram of a diffractive optical element according to a second embodiment.

An example of the present embodiment will be described with reference to FIG. 54. A diffractive optical element 110 has a configuration in which a concave portion and a convex portion are formed on the surface of a substrate 130 and a metallic film 131 that reflects light is formed on the surface of the concave portion and the convex portion. A substrate such as glass is used as the substrate 130, but a substrate that does not transmit light may be used. Further, the concave portion and the convex portion formed on the surface of the substrate 130 are formed at a predetermined height h2 so that the reflected light becomes the desired diffracted light. The metallic film 131 is formed by depositing a metallic material such as aluminum (Al) by vacuum deposition or sputtering.

The diffractive optical element according to the present embodiment is different from the diffractive optical element according to the first embodiment in that the light is transmitted or reflected, but by forming the concave portion and the convex portion with the predetermined height h2, it is possible to achieve the same effect. As described above, the metallic film may be formed on the surface of the concave portion and the convex portion as the reflection film, but instead, a multi-layer film having plural layers of inorganic material may be formed on the surface of the concave portion and the convex portion, or a reflection film formed of metal or a multi-layer film may be formed on a planar surface and the concave portion and the convex portion may be formed thereon.

[Third Embodiment]

Figure 55:
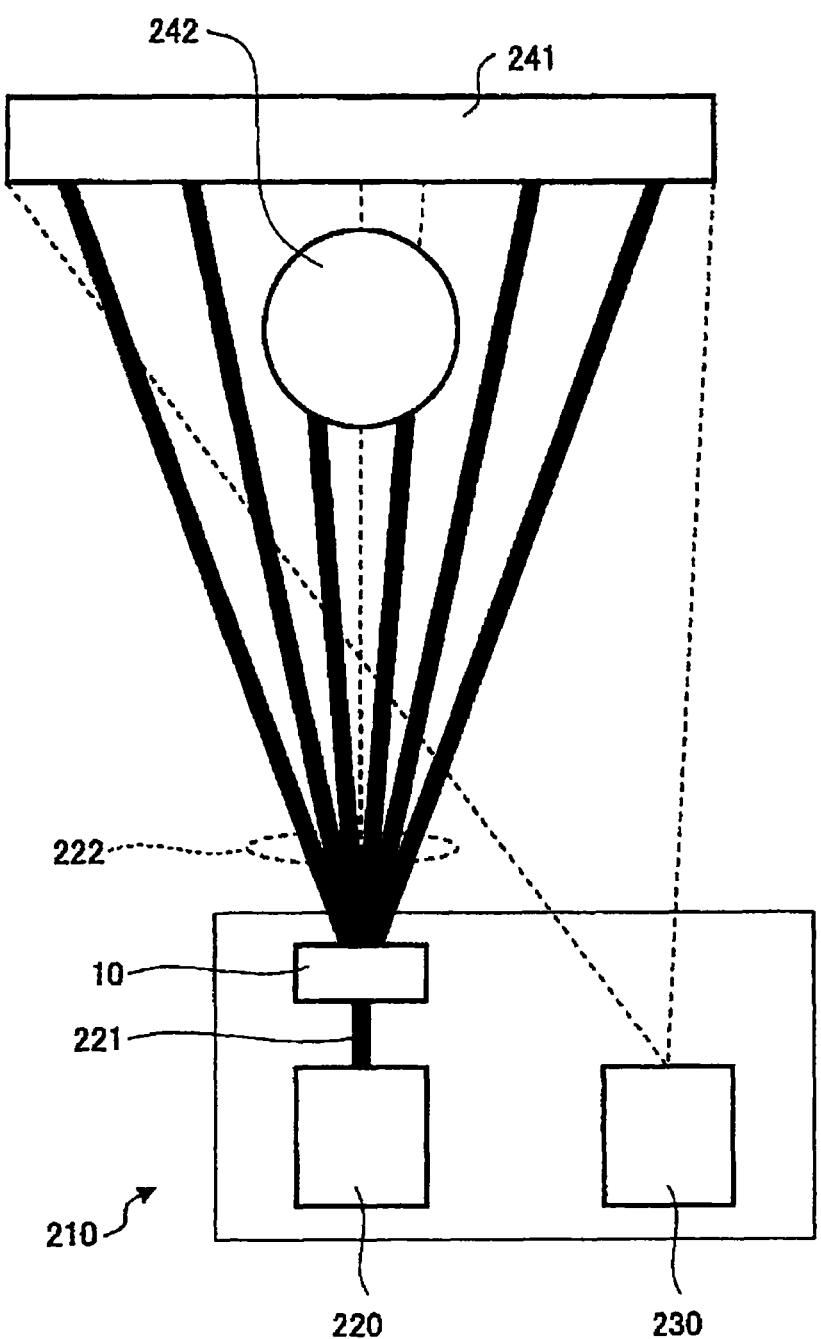
FIG. 55 is a structure diagram of a measurement device according to a third embodiment.

Next, a third embodiment will be described. The present embodiment relates to a measuring device that uses the diffractive optical element according to the first embodiment. The measuring device according to the present embodiment will be described with reference to FIG. 55. As the measuring device, for example, a three-dimensional measuring device that measures a three-dimensional shape or the like of a measuring object may be considered.

A measuring device 210 according to the present embodiment includes a light source 220, the diffractive optical element 10 according to the first embodiment, an imaging unit 230, and an image processing unit (not shown) that processes an image captured by the imaging unit 230.

Light (incident light) 221 output from the light source 220 enters into the diffractive optical element 10, and is diffracted in the diffractive optical element 10 to generate plural diffracted light beams 222. Then, a projection pattern formed of plural light spots is irradiated onto measurement objects 241 and 242. Since the projection pattern has a predetermined spatial distribution and is formed by the diffracted light in the diffractive optical element 10, the positions of the light spots in the projection pattern, the distance between the light spots and the like may vary at a position where the distance from the diffractive optical element 10 varies. Further, in a case where the shapes of the measurement objects 241 and 242 are changed or in a case where the measurement objects 241 and 242 are moved, since the positions of the light spots in the projection pattern, the distance between the light spots and the like varies, such a change in information about the projection pattern is acquired by the imaging unit 230, and thus, it is possible to obtain information, for example, about the three-dimensional shape of the measurement objects 241 and 242.

In the measuring device according to the present embodiment, since the diffractive optical element according to the first embodiment is used, it is possible to reliably reduce occurrence of the zero-order diffracted light beam, and to safely and accurately perform measurement. Further, at this time, the spots of the diffracted light generated in the diffractive optical element are generated in two dimensions and the number thereof is large, and thus, it is possible to perform measurement with high accuracy, which is preferable. Although affected by the measurement object, the number of spots of the diffracted light generated in two dimensions is preferably 10 or more points, more preferably 100 or more points, much more preferably 1000 or more points, and most preferably 10000 or more points.

In the measuring device according to the present embodiment, it is possible to use the diffractive optical element according to the second embodiment. In this case, the positions of the light source 220, the measurement objects 241 and 242 and the imaging unit 230 are arranged at positions suitable for the diffractive optical element according to the second embodiment.

Further, the embodiments of the invention have been described, but the above content does not limit the content of the invention.

The invention has been described in detail and with reference to the specific embodiments, but it is obvious to those skilled in the art that various modifications and changes may be made in a range without departing from the spirit and scope of the invention.

The present application is based on Japanese Patent Application No. 2010-177944, filed on Aug. 6, 2010, the content of which is incorporated herein by reference.

DESCRIPTION OF REFERENCE NUMERALS

10 DIFFRACTIVE OPTICAL ELEMENT
20 BASIC UNIT
30, 311 SUBSTRATE
31, 31a, 31b, 312 CONVEX PORTION
32, 32a, 32b, 313 CONCAVE PORTION
40 LIGHT FLUX OF INCIDENT LIGHT
41 DIFFRACTED LIGHT
50 PROJECTION SURFACE
210 MEASUREMENT DEVICE
221 INCIDENT LIGHT
222 DIFFRACTED LIGHT
230 IMAGING UNIT
241, 242 MEASUREMENT OBJECT

The invention claimed is:

1. A diffractive optical element, comprising:
a transparent substrate having a concave and convex pattern comprising concave portions and convex portions such that the concave and convex pattern diffracts incident light in two dimensions and generates diffracted light having a maximum diffraction angle with reference to an optical axis of an incident light in an angle range of 7.5° or greater, and diffraction efficiency of 5% or less in a zero-order diffracted light beam,
wherein the concave and convex pattern has a distribution of the convex portions such that the convex portions have different shapes having different lengths measured in an X axis direction and a Y axis direction with respect to a Z axis direction representing a height direction of the convex and concave portions, and the lengths measured in the X axis and the Y axis are distributed in different frequencies within a range of $\lambda/8$ to $6\lambda$ where $\lambda$ represents a wavelength of the incident light.

2. The diffractive optical element according to claim 1, wherein the concave and convex portions are formed in a shape of two steps.

3. The diffractive optical element according to claim 1, wherein the concave and convex portions are formed in a shape of three steps or greater.

4. The diffractive optical element according to claim 3, wherein the concave and convex portions are formed in a shape of $2^m$ steps where m is an integer of 2 or greater.

5. The diffractive optical element according to claim 2, wherein the convex and concave portions satisfy $7.5°<\theta<90°$, $0<D<0.5$ and when $7.5°<\theta<36.3°$, $-0.02\theta+0.6<D<-0.00133\theta+0.5233$ or when $36.3°<\theta<90°$, $-0.02\theta+0.6<D<0.475$, where $\theta$ is a diffraction angle, and $D=\mu_1/(\mu_1+\mu_2)$ where $\mu_1$ and $\mu_2$ represent an average value of the lengths of the convex portions and an average value of lengths of the concave portions within the range of $\lambda/8$ to $6\lambda$, and the lengths of the concave portions are measured in the axis direction different from the height direction of the convex and concave portions.

6. The diffractive optical element according to claim 5, wherein the diffraction angle $\theta$ and D satisfy $7.5°<\theta<90°$, and $0<D<0.475$ and $D>-0.02\theta+0.625$.

7. The diffractive optical element according to claim 3, wherein the convex and concave portions satisfy $7.5°<\theta<90°$, and $0<D<0.55$ and $D>-0.02\theta+0.65$, where $\theta$ is a diffraction angle, and $D=\mu_1/(\mu_1+\mu_2)$ where $\mu_1$ and $\mu_2$ represent an average value of the lengths of the convex portions and an average value of lengths of the concave portions measured in the axis direction different from the height direction of the convex and concave portions, with reference to a height of an intermediate portion between the convex and concave portions, portions higher than the height of the intermediate portion being the convex portions and portions lower than the height of the intermediate portion being the concave portions.

8. The diffractive optical element according to claim 7, wherein the diffraction angle $\theta$ and D satisfy $7.5°<\theta<90°$, and $0<D<0.525$ and $D>-0.02\theta+0.675$.

9. The diffractive optical element according to claim 1, wherein the diffraction efficiency in the zero-order diffraction is 3% or less.

10. The diffractive optical element according to claim 1, further comprising:
a reflection layer made of a material that reflects light.

11. A measurement device, comprising:
a light source that emits light;
the diffractive optical element of claim 1; and
an imaging unit that captures an image of a measurement object to which the diffracted light is irradiated.

12. The diffractive optical element according to claim 1, wherein the concave and convex pattern of the transparent substrate comprises the concave and convex portions formed directly on a surface of the transparent substrate.

13. The diffractive optical element according to claim 1, wherein the concave and convex pattern of the transparent substrate comprises a transparent film forming the convex portions on a surface of the transparent substrate.

14. The diffractive optical element according to claim 1, wherein the concave and convex pattern of the transparent substrate comprises the concave and convex portions forming a curve pattern.

15. The diffractive optical element according to claim 1, wherein the transparent substrate has a plurality of basic units arrayed on a surface of the transparent substrate and each comprising the concave and convex pattern.

16. The diffractive optical element according to claim 2, wherein the concave and convex pattern of the transparent substrate comprises the concave and convex portions forming a curve pattern.

17. The diffractive optical element according to claim 3, wherein the concave and convex pattern of the transparent substrate comprises the concave and convex portions forming a curve pattern.

18. The diffractive optical element according to claim 4, wherein the concave and convex pattern of the transparent substrate comprises the concave and convex portions forming a curve pattern.

19. The diffractive optical element according to claim 5, wherein the concave and convex pattern of the transparent substrate comprises the concave and convex portions forming a curve pattern.

20. The diffractive optical element according to claim 1, wherein the convex and concave portions satisfy $7.5°<\theta<90°$, and $0<D<0.55$ and $D>-0.02\theta+0.65$, where $\theta$ is a diffraction angle, and $D=\mu_1/(\mu_1+\mu_2)$ where $\mu_1$ and $\mu_2$ represent an average value of the lengths of the convex portions and an average value of lengths of the concave portions measured in the axis direction different from the height direction of the convex and concave portions, with reference to a height of an intermediate portion between the convex and concave portions, portions higher than the height of the intermediate portion being the convex portions and portions lower than the height of the intermediate portion being the concave portions.

* * * * *